United States Patent
Uehara et al.

(10) Patent No.: US 7,660,038 B2
(45) Date of Patent: Feb. 9, 2010

(54) THREE-DIMENSIONAL IMAGE DISPLAY DEVICE, PORTABLE TERMINAL DEVICE, DISPLAY PANEL AND FLY EYE LENS

(75) Inventors: Shin-ichi Uehara, Tokyo (JP); Naoyasu Ikeda, Tokyo (JP); Nobuaki Takanashi, Tokyo (JP)

(73) Assignee: NEC Corporation (JP)

( * ) Notice: Subject to any disclaimer, the term of this patent is extended or adjusted under 35 U.S.C. 154(b) by 0 days.

(21) Appl. No.: 11/972,808

(22) Filed: Jan. 11, 2008

(65) Prior Publication Data
US 2008/0130107 A1      Jun. 5, 2008

Related U.S. Application Data

(62) Division of application No. 10/982,973, filed on Nov. 5, 2004, now Pat. No. 7,372,629.

(30) Foreign Application Priority Data
Nov. 6, 2003    (JP)    ............... 2003-377226

(51) Int. Cl.
*G02B 27/22*    (2006.01)
(52) U.S. Cl. ........................ 359/463; 348/59
(58) Field of Classification Search ................ 359/462, 359/463; 348/54, 59; 349/15, 95
See application file for complete search history.

(56) References Cited

U.S. PATENT DOCUMENTS

| 5,685,939 | A |   | 11/1997 | Wolk et al. | ................ 156/234 |
| 5,936,774 | A | * | 8/1999 | Street | ......................... 359/630 |
| 6,061,179 | A | * | 5/2000 | Inoguchi et al. | ............. 359/464 |
| 6,160,527 | A | * | 12/2000 | Morishima et al. | ............. 345/7 |
| 6,445,406 | B1 |   | 9/2002 | Taniguchi et al. | ............. 348/51 |
| 2002/0021492 | A1 | * | 2/2002 | Morishima et al. | ......... 359/463 |
| 2003/0107805 | A1 | * | 6/2003 | Street | ........................ 359/464 |
| 2003/0206343 | A1 | * | 11/2003 | Morishima et al. | ......... 359/463 |

FOREIGN PATENT DOCUMENTS

JP          09-149434          6/1997

OTHER PUBLICATIONS

Office Action issued by the Chinese Patent Office on Nov. 20, 2009 in connection with corresponding Chinese Patent Application No. 2008101340166.
English translation of Chinese Office Action issued in connection with Chinese Patent Application No. 2008101340166 on Nov. 20, 2009.

\* cited by examiner

*Primary Examiner*—Lee Fineman
(74) *Attorney, Agent, or Firm*—Ostrolenk Faber LLP

(57) ABSTRACT

In a three-dimensional image display device for displaying color three-dimensional images, a fly eye lens, a display panel, and a light source are provided in this order from the observer side. A display panel has four pixels arrayed in a (2×2) matrix correlated with one lens element of the fly eye lens. In the event that j is a natural number, a pixel magnifying projection width e in a second direction is set in a range of the following expression according to mean interpupillary distance Y of the observers.

$$\frac{e}{3} \neq \frac{Y}{2 \times j}$$

6 Claims, 35 Drawing Sheets

$$\frac{Y}{3} \leq \frac{e}{3} \quad (0 \leq Y \leq e)$$

$$\frac{Y}{6} \leq \frac{e}{3} \leq \frac{Y}{3} \quad (e \leq Y \leq 2e)$$

$e/3 = Y/2$

Y/4 = e/3

$Y \leq \frac{e}{3}$
$(0 \leq Y \leq \frac{e}{3})$ $\frac{Y}{2} \leq \frac{e}{3} \leq Y$
$(\frac{e}{3} \leq Y \leq \frac{2}{3}e)$ $\frac{Y}{3} \leq \frac{e}{3} \leq \frac{Y}{2}$
$(\frac{2}{3}e \leq Y \leq e)$ $\frac{Y}{4} \leq \frac{e}{3} \leq \frac{Y}{3}$
$(e \leq Y \leq \frac{4}{3}e)$ $\frac{Y}{5} \leq \frac{e}{3} \leq \frac{Y}{4}$
$(\frac{4}{3}e \leq Y \leq \frac{5}{3}e)$ $\frac{Y}{6} \leq \frac{e}{3} \leq \frac{Y}{5}$
$(\frac{5}{3}e \leq Y \leq 2e)$ $e/3 = Y/2$ $Y/4 = e/3$ (a)  (b)

F I G. 36
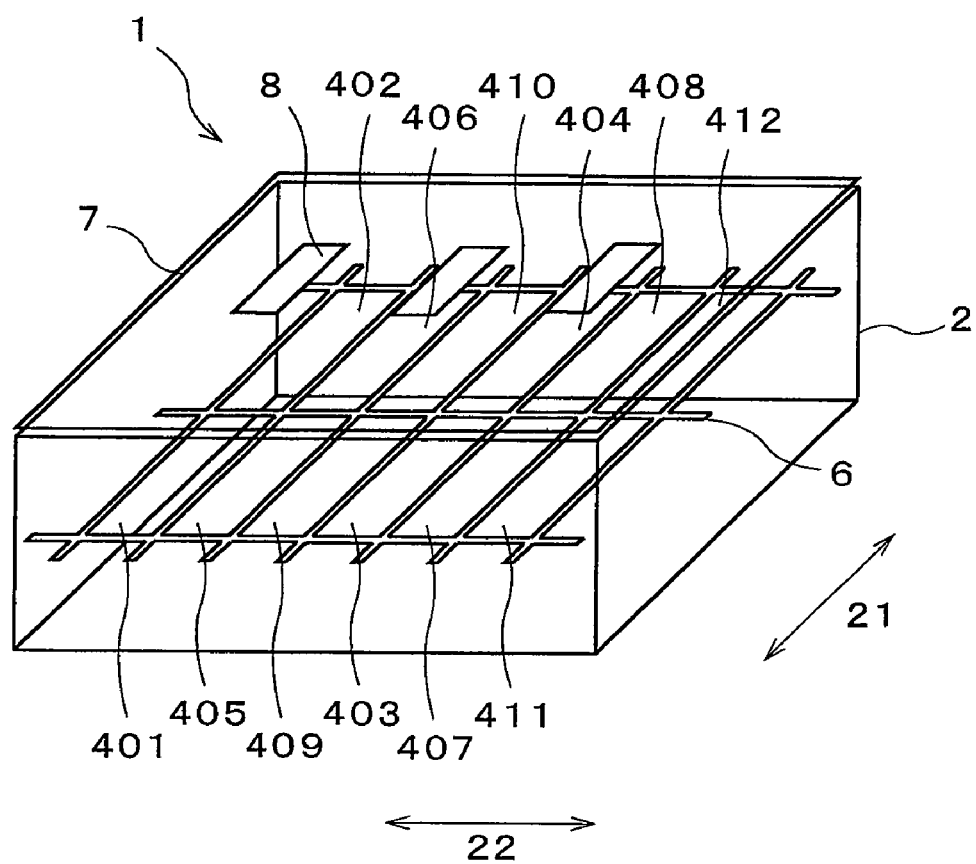

THREE-DIMENSIONAL IMAGE DISPLAY DEVICE, PORTABLE TERMINAL DEVICE, DISPLAY PANEL AND FLY EYE LENS

CROSS REFERENCE TO RELATED APPLICATION

This application is a divisional of U.S. application Ser. No. 10/982,973, filed Nov. 5, 2004, entitled THREE-DIMENSIONAL IMAGE DISPLAY DEVICE, PORTABLE TERMINAL DEVICE, DISPLAY PANEL AND FLY EYE LENS, which claims priority of Japanese Patent Application No. 2003-377226, filed Nov. 6, 2003, the disclosure of which has been incorporated herein by reference.

BACKGROUND OF THE INVENTION

1. Field of the Invention

The present invention relates to a color three-dimensional image display device capable of displaying three-dimensional images, a portable terminal device mounting the three-dimensional image display device, and a display panel and fly eye lens to be built in the three-dimensional image display device, and more specifically relates to a three-dimensional image display device, portable terminal device, display panel, and fly eye lens, which are capable of stereoscopic viewing even in the event that the three-dimensional image display device is disposed not only in one direction alone but also in another direction orthogonal to this one direction.

Examples of applications to which the present invention is applied include portable terminal devices such as handheld phones, PDAs, game devices, digital cameras, and digital video cameras.

2. Description of the Related Art

Conventionally, studies of a display device capable of displaying three-dimensional images have been made. The Greek Mathematician Euclid, in 280 BC, observed that depth perception is to perceive the same object with the left and right eyes, each simultaneously looking at different views of that one object in different directions (for example, see "Three-dimensional Display" (Chihiro Masuda, pub. Sangyo Tosho Publishing Co. Ltd.)). That is to say, three-dimensional image display devices need to function in showing images with parallax independently to each eye of an observer. As for a method for realizing this function specifically, while various kinds of methods for displaying three-dimensional images have been studied for a long time, these methods can be roughly basically categorized into a method using glasses and a method not using glasses. Among these, examples of the method using glasses include the anaglyph method using color difference and the polarization glasses method using polarization. However, since these methods cannot avoid being troublesome by requiring the wearing of glasses, in recent years, methods wherein wearing glasses is not necessary have been intensively studied. Examples of method not requiring wearing of glasses include the lenticular lens method and parallax barrier method.

Firstly, a description will be made regarding the lenticular lens method. As described in the aforementioned "Three-dimensional Display" (Chihiro Masuda, pub. Sangyo Tosho Publishing Co. Ltd.) for example, the lenticular lens method has been invented by Ives and others around 1910. FIG. 1 is a perspective view illustrating a lenticular lens, and FIG. 2 is an optical model diagram illustrating a conventional three-dimensional image display method using a lenticular lens. As illustrated in FIG. 1, a lenticular lens 121 has one side with a flat surface, and the other side on which a plurality of convex portions of rounded ridges extending in one direction (cylindrical lens 122) are formed such that the longitudinal directions thereof are parallel to each other.

Subsequently, as illustrated in FIG. 2, with a three-dimensional image display device using the lenticular lens method, a lenticular lens 121, display panel 106, and light source 108 are disposed in that order from the observer side, and the pixels of the display panel 106 are disposed on the focus surface of the lenticular lens 121. On the display panel 106, pixels 123 for displaying an image for the right eye 141 and pixels 124 for displaying an image for the left eye 142 are alternatively arrayed. At this time, a set made up of the pixels 123 and 124 adjacent to each other corresponds to each cylindrical lens (convex portion) of the lenticular lenses 121. Thus, the light emitted from the light source 108 passes through each pixel, and is distributed in the direction toward the left eye and in the direction toward the right eye by means of the cylindrical lens 122 of the lenticular lens 121. This enables the left and right eyes to recognize a different image mutually, thereby enabling the observer to recognize a three-dimensional image. As described above, since this method is displaying a left-eye image on the left eye and a right-eye image on the right eye, enabling an observer to recognize a three-dimensional image is called a dual-viewpoint method for forming two viewpoints.

Next, the size of each component of a three-dimensional image display device will be described including a normal lenticular lens and display panel. FIG. 3 is a diagram illustrating an optical model of a dual-viewpoint three-dimensional image display device using the normal lenticular lens method, and FIG. 4 is a diagram illustrating a stereoscopic vision region of this dual-viewpoint three-dimensional image display device. As illustrated in FIG. 3, let us say that the distance between the apex of the lenticular lens 121 and the pixel of the display panel 106 is H, the index of refraction of the lenticular lens 121 is n, the focal distance is f, and the array cycle of lens elements, i.e., the lens pitch, is L. The display pixels of the display panel 106 are disposed as one set of each left-eye pixel 124 and each right-eye pixel 123. If the pitch of this pixel is P, the array pitch of the display pixels is accordingly made up of each left-eye pixel 124 and each right-eye pixel 123 is 2 P. One cylindrical lens 122 is disposed corresponding to the display pixels made up of the two pixels of each left-eye pixel 124 and each right-eye pixel 123.

Also, let us say that the distance between the lenticular lens 121 and the observer is an optimal observation distance OD, and the magnifying projection width of one pixel in this distance OD, i.e., the widths of the projection images of the left-eye pixel 124 and right-eye pixel 123 on an imaginary flat surface distanced from a lens by the distance OD and parallel to the lens are each e. Further, let us say that the distance between the center of the cylindrical lens 122 positioned at the center of the lenticular lens 121 and the center of the cylindrical lens 122 disposed on the end of the lenticular lens 121 in a horizontal direction 112 is $W_L$, and the distance between the center of the display pixels made up of the left-eye pixel 124 and right-eye pixel 123 positioned on the center of the display panel 106 and the center of the display pixels positioned on the end of the display panel 106 in the horizontal direction 112 is $W_P$. Further, let us say that the incident angle and exiting angle of light in the cylindrical lens 122 positioned on the center of the lenticular lens 121 are α and β respectively, and the incident angle and exiting angle of light in the convex portions 122 positioned on the end of the lenticular lens 121 in the horizontal direction 112 are γ and δ respectively. Further, let us say that the difference between the distance $W_L$ and the distance $W_P$ is C, and the number of pixels included in the distance $W_P$ is 2 m.

Since the array pitch L of the cylindrical lens 122 and the array pitch P of the pixels are mutually correlated, coordinating with one determines the other. However, normally, a lenticular lens is often designed by coordinating with a display panel, so the array pitch P of the pixels is handled as a constant. In addition, selecting the material of the lenticular lens 121 determines the index of refraction n. On the other hand, with regard to the observation distance OD between the lens and the observer, and the pixel magnifying projection width e at the observation distance OD, desired values are set. The distance H between the apex of the lens and the pixels and the lens pitch L will be determined using the aforementioned values. Due to Snell's law and geometrical relations, the following Expressions 1 through 6 are established. The following Expressions 7 through 9 are also established.

$n \times \sin a = \sin b$ (Expression 1)

$OD \times \tan b = e$ (Expression 2)

$H \times \tan a = P$ (Expression 3)

$n \times \sin g = \sin d$ (Expression 4)

$H \times \tan g = C$ (Expression 5)

$OD \times \tan d = W_L$ (Expression 6)

$W_P - W_L = C$ (Expression 7)

$W_P = 2 \times m \times P$ (Expression 8)

$W_L = m \times L$ (Expression 9)

From the aforementioned Expressions 1 through 3, the following Expressions 10 through 12 are established respectively.

$\beta = \arctan(e/OD)$ (Expression 10)

$\alpha = \arcsin(1/n \times \sin \beta)$ (Expression 11)

$H = P/\tan \alpha$ (Expression 12)

Also, the following Expression 13 is established from the above Expressions 6 and 9. Moreover, the following Expression 14 is established from the aforementioned Expressions 8 and 9. Furthermore, the following Expression 15 is established from the aforementioned Expression 5.

$\delta = \arctan(mL/OD)$ (Expression 13)

$C = 2 \times m \times P - m \times L$ (Expression 14)

$\gamma = \arctan(C/H)$ (Expression 15)

Since the distance H between the apex of the lenticular lens and the pixels is usually set so as to be identical to the focal distance f of the lenticular lens, the following Expression 16 is established. If we say that the curvature radius of the lenticular lens is r, the curvature radius is obtained from the following Expression 17.

$f = H$ (Expression 16)

$r = H \times (n-1)/n$ (Expression 17)

As illustrated in FIG. 4, let us say that a region where light reaches from all of the right-eye pixels 123 is a right-eye region 171, and a region where light reaches from all of the left-eye pixels 124 is a left-eye region 172. The observer can recognize a three-dimensional image by positioning the right eye 141 to the right-eye region 171, and the left eye 142 to the left-eye region 172. However, since the interpupillary distance of the observer is constant, the right eye 141 and left eye 142 cannot be positioned at an arbitrary position of the right-eye region 171 and left-eye region 172 respectively, and accordingly, the positions are restricted to a region where the interpupillary distance can be kept to a constant. In other words, only in the case wherein the midpoint of the right eye 141 and left eye 142 is positioned at a stereoscopic vision region 107, can stereoscopic viewing be obtained. Since a length along the horizontal direction 112 in the stereoscopic vision region 107 becomes the longest at the position where a distance from the display panel 106 is identical to the optimal observation distance OD, tolerance in deviation of the observer's position in the horizontal direction 112 reaches the maximal value. Accordingly, the position where the distance from the display panel 106 is the optimal observation distance OD is the most ideal observation position.

As described later, while the parallax barrier method is a method for hiding unnecessary light by a barrier, the lenticular lens method is a method for changing the direction where light advances, and accordingly, employing the lenticular lens does not reduce the brightness of a display screen in principle. Accordingly, the lenticular lens method is most likely to be applied to portable equipment and so forth in which high-luminance display and low consumption power performance are regarded as important factors.

A development example of three-dimensional image display devices using the lenticular lens method is described in Nikkei Electronics No. 838, Jan. 6, 2003 pp 26-27. A 7-inch liquid crystal panel making up a three-dimensional image display device includes 800×480 display dots. Three-dimensional image display and flat image display can be switched by changing the distance between the lenticular lens and the liquid crystal display panel by 0.6 mm. The number of lateral viewpoints is five, and accordingly, five different images can be viewed by changing the view angle in the horizontal direction. On the other hand, the number of vertical viewpoints is one, and accordingly, the image does not change even if the view angle is changed in the vertical direction.

Next, the parallax barrier method will be described. The parallax barrier method was conceived by Berthier in 1896, and demonstrated by Ives in 1903. FIG. 5 is an optical model diagram illustrating a conventional three-dimensional image display method using a parallax barrier. As illustrated in FIG. 5, a parallax barrier 105 is a barrier (shielding plate) on which numerous narrow slits 105a are formed. The display panel 106 is disposed near one surface of this parallax barrier 105. On the display panel 106, the right-eye pixels 123 and left-eye pixels 124 are arrayed in the direction orthogonal to the longitudinal direction of the slits. On the other hand, the light source 108 is disposed near the other surface of the parallax barrier 105, i.e., on the opposite side of the display panel 106.

The light, which is emitted from the light source 108, and passes through the slit 105a of the parallax barrier 105 and the right-eye pixel 123, is the optical flux 181. In the same way, the light, which is emitted from the light source 108, passes through the slit 105a and the left-eye pixel 124, is optical flux 182. At this time, the position where the observer can recognize a three-dimensional image is determined by means of the positional relation between the parallax barrier 105 and the pixels. In other words, the right eye 141 of an observer 104 needs to be within the regions of all of the optical flux 181 corresponding to the a plurality of right-eye pixels 123, and also the left eye 142 of the observer needs to be within the transmissive regions of all of the optical flux 182. This is the case wherein a midpoint 143 of the right eye 141 and left eye 142 of the observer is positioned within the stereoscopic vision region 107 of a square illustrated in FIG. 5.

Of the line segments extending in the array direction of the right-eye pixel 123 and left-eye pixel 124 in the stereoscopic vision region 107, the segment passing through a diagonal intersecting point 107a in the stereoscopic vision region 107 is the longest line segment. Accordingly, when the midpoint 143 is positioned at the intersecting point 107a, tolerance in a case wherein the position of the observer deviates in the horizontal direction reaches the maximal value, so this position is the most preferable as an observation position. Accordingly, with this three-dimensional image display method, it is recommended for observers to perform observation at the optimal observation distance OD, i.e., distance between the intersecting point 107a and the display panel 106. Note that an imaginary flat surface wherein the distance from the display panel 106 in the stereoscopic vision region 107 is the optimal observation distance OD is called as an optimal observation surface 107b. Thus, the light from the right-eye pixel 123 and left-eye pixel 124 reaches the right eye 141 and left eye 142 of the observer respectively. Accordingly, the observer can recognize an image displayed on the display panel 106 as a three-dimensional image.

Next, a three-dimensional image display device is described wherein a parallax barrier on which slits are formed is disposed on the front surface of a display panel, more specifically, regarding each component size thereof in detail. FIG. 6 is a diagram illustrating an optical model of a conventional dual-viewpoint three-dimensional image display device having a slit-shaped parallax barrier on the observer side of a display panel. Note that the slit width of the parallax barrier is minute, so it can be ignored for the sake of simplifying explanation. As illustrated in FIG. 6, let us say that the array pitch of the slits 105a of the parallax barrier 105 is L, the distance between the display panel 106 and the parallax barrier 105 is H, and also the array pitch of the pixels is P. As described above, with the display panel 106, since two pixels, i.e., each right-eye pixel 123 and each left-eye pixel 124 are disposed as a pixel set on the display panel 106, the array pitch of the pixel set is 2 P. Since the array pitch L of the slits 105a and the array pitch P of the pixel set are mutually correlated, coordinating with one determines the other, however, normally, a parallax barrier is often designed by coordinating with a display panel, so the array pitch P of the pixel set is handled as a constant.

Also, let us say that a region where light reaches from all of the right-eye pixels 123 is the right-eye region 171, and a region where light reaches from all of the left-eye pixels 124 is the left-eye region 172. The observer can recognize a three-dimensional image by positioning the right eye 141 to the right-eye region 171, and the left eye 142 to the left-eye region 172. However, since the interpupillary distance of the observer is constant, the right eye 141 and left eye 142 cannot be positioned to an arbitrary position of the right-eye region 171 and left-eye region 172 respectively, and accordingly, the positions are restricted to a region where the interpupillary distance can be kept constant. In other words, only in the case wherein the midpoint 143 of the right eye 141 and left eye 142 is positioned at the stereoscopic vision region 107, stereoscopic viewing can be obtained. Since a length along the horizontal direction 112 at the stereoscopic vision region 107 is the longest at the position where a distance from the display panel 106 is identical to the optimal observation distance OD, tolerance in a case wherein the position of the observer deviates toward the horizontal direction 112 reaches the maximal value. Accordingly, the position where the distance from the display panel 106 is the optimal observation distance OD is the most ideal observation position. Also, let us say that an imaginary flat surface wherein the distance from the display panel 106 in the stereoscopic vision region 107 is the optimal observation distance OD is the optimal observation surface 107b, and the magnifying projection width of one pixel in the optimal observation surface 107b is e.

Next, the distance H between the parallax barrier 105 and the display pixels of the display panel 106 will be determined using the aforementioned values. Due to geometrical relations as illustrated in FIG. 6, the following Expressions 18 is established, and thus, the distance H is obtained as illustrated in the following Expression 19.

$$P:H=e:(OD-H) \quad \text{(Expression 18)}$$

$$H=OD \times P/(P+e) \quad \text{(Expression 19)}$$

Further, if we say that the distance between the center of the pixel set positioned at the center of the display panel 106 in the horizontal direction 112 and the center of the pixel set positioned on the end in the horizontal direction 112 is $W_P$, and the distance between the centers of the slits 105a corresponding to these pixel sets respectively is $W_L$, the difference C between the distance $W_P$ and distance $W_L$ is obtained by the following Expression 20. Also, if we say that the number of pixels included in the distance $W_P$ on the display panel 106 is 2 m, the following Expression 21 is established. Further, since the following Expression 22 is established due to geometrical relations, the pitch L of the slits 105a of the parallax barrier 105 is obtained by the following Expression 23.

$$W_P - W_L = C \quad \text{(Expression 20)}$$

$$W_P = 2 \times m \times Pm, \ W_L = m \times L \quad \text{(Expression 21)}$$

$$W_P : OD = W_L : (OD-H) \quad \text{(Expression 22)}$$

$$L = 2 \times P \times (OD-H)/OD \quad \text{(Expression 23)}$$

Next, a three-dimensional image display device is described wherein a parallax barrier is disposed on the rear surface of the display panel, more specifically, regarding each component size thereof in detail. FIG. 7 is a diagram illustrating an optical model of a conventional dual-viewpoint three-dimensional image display device having a slit-shaped parallax barrier on the rear surface of a display panel. Note that the slit width of the parallax barrier is minute, so this can be ignored for the sake of simplifying explanation. As with the aforementioned case wherein the parallax barrier is disposed on the front surface of the display panel, let us say that the array pitch of the slits 105a of the parallax barrier 105 is L, the distance between the display panel 106 and the parallax barrier 105 is H, and also the array pitch of the display pixels is P. As described above, with the display panel 106, since two pixels, i.e., each right-eye pixel 123 and each left-eye pixel 124 are disposed as a pixel set on the display panel 106, the array pitch of the pixel set is 2 P. Since the array pitch L of the slits 105a and the array pitch P of the pixel set are mutually correlated, coordinating with one determines the other, however, normally, a parallax barrier is often designed by coordinating with a display panel, so the array pitch P of the pixel set is handled as a constant.

Also, let us say that a region where light reaches from all of the right-eye pixels 123 is the right-eye region 171, and a region where light reaches from all of the left-eye pixels 124 is the left-eye region 172. The observer can recognize a three-dimensional image by positioning the right eye 141 to the right-eye region 171, and the left eye 142 to the left-eye region 172. However, since the interpupillary distance of the observer is constant, the right eye 141 and left eye 142 cannot be positioned to an arbitrary position of the right-eye region 171 and left-eye region 172 respectively, and accordingly, the positions are restricted to a region where the interpupillary distance can be kept constant. In other words, only in the case wherein the midpoint 143 of the right eye 141 and left eye 142 is positioned at the stereoscopic vision region 107, stereoscopic viewing can be obtained. Since the length along the horizontal direction 112 at the stereoscopic vision region 107 is the longest at the position where a distance from the display panel 106 is identical to the optimal observation distance OD, tolerance in a case wherein the position of the observer deviates toward the horizontal direction 112 reaches the maximal value. Accordingly, the position where the distance from the display panel 106 is the optimal observation distance OD is the most ideal observation position. Also, let us say that an imaginary flat surface wherein the distance from the display panel 106 in the stereoscopic vision region 107 is the optimal observation distance OD is the optimal observation surface 107b, and the magnifying projection width of one pixel in the optimal observation surface 107b is e.

Next, the distance H between the parallax barrier 105 and the pixels of the display panel 106 will be determined using the aforementioned values. Due to geometrical relations as illustrated in FIG. 7, the following Expressions 24 is established, and thus, the distance H is obtained as illustrated in the following Expression 25.

$$P:H=e:(OD+H) \quad \text{(Expression 24)}$$

$$H=OD \times P/(e-P) \quad \text{(Expression 25)}$$

Further, if we say that the distance between the center of the pixel set positioned at the center of the display panel 106 in the horizontal direction 112 and the center of the pixel set positioned on the end in the horizontal direction 112 is $W_P$, and the distance between the centers of the slits 105a corresponding to these pixel sets respectively is $W_L$, the difference C between the distance $W_P$ and distance $W_L$ is obtained by the following Expression 26. Also, if we say that the number of pixels included in the distance $W_P$ on the display panel 106 is 2 m, the following Expression 27 and Expression 28 are established. Further, since the following Expression 29 is established due to geometrical relations, the pitch L of the slits 105a of the parallax barrier 105 is obtained by the following Expression 30.

$$W_L - W_P = C \quad \text{(Expression 26)}$$

$$W_P = 2 \times m \times P \quad \text{(Expression 27)}$$

$$W_L = m \times L \quad \text{(Expression 28)}$$

$$W_P:OD=W_L:(OD+H) \quad \text{(Expression 29)}$$

$$L=2 \times P \times (OD+H)/OD \quad \text{(Expression 30)}$$

Since the parallax barrier method originally had the parallax barrier disposed between the pixel and the eye, this has led to a problem wherein the parallax barrier is conspicuous and visibility is poor. However, with realization of liquid crystal display panels, an arrangement has been made wherein the parallax barrier 105 can be disposed on the rear side of the display panel 106 as illustrated in FIG. 5, thereby improving visibility. Thus, three-dimensional image display devices using the parallax barrier method are now being studied intensively.

An example of actual production using the parallax barrier method in reality is described within Table 1 of the aforementioned Nikkei Electronics No. 838, Jan. 6, 2003 pp 26-27. This is a portable phone mounting a liquid crystal panel corresponding to 3D, wherein the liquid crystal panel making up a three-dimensional image display device includes 176× 220 display dots in diagonal 2.2-inch size. In addition, a liquid crystal panel serving as a switch for turning on/off the effects of a parallax barrier is provided, whereby three-dimensional image display and flat image display can be switched and displayed. As described above, two images of a left-eye image and right-eye image are displayed at the time of displaying a three-dimensional image. In other words, this is a dual-viewpoint three-dimensional image display device.

Meanwhile, attempts for improving stereoscopic sensation have been performed using images more than two images. For example, as described above, a pair of a left-eye image and right-eye image is displayed not only in the horizontal direction but also in the vertical direction. The shape of the slits of a parallax barrier is a pinhole shape. Thus, in the event that the position of the observer moves in the vertical direction, different three-dimensional images can be recognized. A pair of the images disposed in the vertical direction are images wherein a substance to be displayed is observed in the vertical direction. Thus, the observer can obtain stereoscopic sensation in the vertical direction by changing his/her position in the vertical direction, resulting in improving stereoscopic sensation.

A development example of three-dimensional image display devices for displaying an image two-dimensionally in the vertical direction is described in "3D Display" (Optical and electro-optical engineering contact, Vol. 41, No. 3, Mar. 20, 2003 pp. 21-32. This is a multi-viewpoint three-dimensional image display device using 7 viewpoints in the horizontal direction, 4 viewpoints in the vertical direction, for 28 viewpoints in total, and a liquid crystal display device making up the three-dimensional image display device includes QUXGA-W (3840×2400) display dots in a diagonal 22-inch size. Thus, the observer can observe three-dimensional images changing consecutively in the event of changing the observation position not only in the horizontal direction but also in the vertical direction.

However, with the aforementioned conventional three-dimensional image display device, it is assumed that the direction for disposing a display screen is to be set in one direction as to the observer at all times. Accordingly, in the event of changing the direction of the display monitor as to the observer, it is impossible for the observer to recognize a three-dimensional image. For example, upon the aforementioned display device being rotated by 90° in either direction from the normal direction, the observer observes the same image with both eyes, and cannot recognize a three-dimensional image.

To solve this problem, a technique is disclosed in Japanese Unexamined Patent Application Publication No. 06-214323 wherein two lenticular lenses are overlapped such that the longitudinal directions of the lenses are orthogonal to each other, and the focal point of each lens is disposed on the same flat surface, and the light from a plurality of pixels arrayed in matrix fashion is distributed into in the vertical direction and in the horizontal direction of a screen. Thus, Japanese Unexamined Patent Application Publication No. 06-214323 states that even in the event that the direction of the display screen relative to the observer rotates by 90°, such as in a case wherein the observer lies down, the observer can recognize a three-dimensional image.

However, the aforementioned conventional technique includes the following problems. As a result of the efforts made by the present inventor and others studying this technique, with the display device disclosed in Japanese Patent Publication No. Hei 06-214323, in the event of a display of a color image changing the direction for disposing the display device to the observer, it has been proven that three-dimensional display cannot be correctly made in some cases. This phenomenon is described in detail below.

First, a case wherein a lens is employed will be described. In order to observe a three-dimensional image even if the display device is disposed in either the vertical or horizontal direction, with Japanese Unexamined Patent Application Publication No. 06-214323, while two lenticular lenses disposed such that the longitudinal directions of the lenses are orthogonal to each other are employed, a fly eye lens of which lens elements are two-dimensionally arrayed may be employed. FIG. 8 is a perspective view illustrating a fly eye lens 125.

As for a display device to be used in a three-dimensional image display device, a display device employing a striped color, which is currently most common, is used. For the sake of explanation, a first direction and a second direction are defined as follows. That is to say, the first direction is a direction where the same color pixels of each color pixel are consecutively disposed, and the second direction is a direction where each color pixel is alternatively repeatedly disposed. The first direction and the second direction are orthogonal to each other on a display surface. One display unit includes three colors of RGB, and each color pixel is arrayed in a striped shape. Also, the resolution in the first direction and the resolution in the second direction are equally mutually set, and accordingly, each color pixel pitch in the second direction is one third of the pitch in the first direction.

In order to observe a three-dimensional image by disposing left and right pixels not only in the first direction but also in the second direction, a method for disposing one lens element as to two same color pixels arrayed in the second direction and adjacent to each other can be conceived. In this case, since the pixel pitch in the second direction is one third of the pixel pitch in the first direction, the aforementioned Expression 3 is substituted with the following Expression 31.

$$H \times \tan \alpha' = P/3 \qquad \text{(Expression 31)}$$

At this time, the distance H between the lens and the pixel should be the same value as the distance H between the lens and the pixel in the aforementioned first direction for the sake of using one fly eye lens. In the same way, the index of refraction n should be the same. Also, the observation distance OD is preferably unchanged. Thus, Expression 1 is substituted with the following Expression 32. Also, Expression 2 is substituted with the following Expression 33.

$$n \times \sin \alpha' = \sin \beta' \qquad \text{(Expression 32)}$$

$$OD \times \tan \beta' = e' \qquad \text{(Expression 33)}$$

Note that the angles $\alpha$, $\beta$, $\alpha'$, and $\beta'$ are generally small, and are in a range wherein paraxial approximation is established, and accordingly, e' is generally the same as (e/3), and a pixel magnifying projection width is (e/3). For example, in the event that the pixel magnifying projection width e in the aforementioned first direction is 97.5 mm, the pixel magnifying projection width e/3 in the second direction is 32.5 mm. In other words, left and right images are magnified and projected in 32.5 mm pitch. Consequently, a general observer of which the interpupillary distance is 65 mm can observe only any one of the images, and accordingly, regardless of the display device displaying a three-dimensional image, the observer cannot recognize the three-dimensional image.

Such a problem occurs not only in the lens method but also in the three-dimensional image display device using the parallax barrier method. Description will be made below the phenomenon occurring when the angle of a three-dimensional image display device using the parallax barrier method relative to the observer is rotated by 90° from the normal observation position will be described below.

The conventional three-dimensional image display device illustrated in FIG. 5 is a three-dimensional image display device using a parallax barrier on which slits are formed. When this device is rotated by 90° from the normal position, the observer observes the same image with both eyes, and accordingly, cannot recognize a three-dimensional image. In order to observe a three-dimensional image even if the display device is disposed either vertically or horizontally, there is the need to employ a parallax barrier on which pinhole slits are two-dimensionally arrayed. Note that with the present device, as with the aforementioned device using a fly eye lens, the array of each color is defined in a striped shape, and the first and second directions are defined as the same as the aforementioned definition. Consequently, the pitch of color pixels in the second direction is one third of the pitch in the first direction.

In order to observe a three-dimensional image by disposing left and right images not only in the first direction but also in the second direction, a method for disposing one pinhole as to two color pixels arrayed in the second direction and adjacent to each other can be conceived. In this case, a pixel pitch is one third of the first direction, and accordingly, the aforementioned Expression 19 is substituted with the following Expression 34.

$$e' = ((OD-H)/H) \times P/3 \qquad \text{(Expression 34)}$$

At this time, the distance H between the barrier and the pixel should be the same value as the distance H between the barrier and the pixel in the aforementioned first direction for the sake of using one parallax barrier. Also, the observation distance OD is preferably unchanged. Thus, the following Expression 35 is established.

$$e' = e/3 \qquad \text{(Expression 35)}$$

This means that the pixel magnifying projection width is (e/3). As a result, in the same way as with a fly eye lens, a phenomenon occurs wherein regardless of the display device displaying a three-dimensional image, the observer cannot recognize the three-dimensional image.

Further, with a three-dimensional image display device equipped with a parallax barrier on the rear surface of the display panel, the same phenomenon occurs. In this case as well, the pixel pitch in the second direction is one-third in the first direction, and the aforementioned Expression 25 is substituted with the following Expression 36.

$$e' = ((OD+H)/H) \times P/3 \qquad \text{(Expression 36)}$$

At this time, the distance H between the barrier and the display pixel should be the same value as the distance H between the barrier and the pixel in the aforementioned first direction for the sake of using one parallax barrier. Also, the observation distance OD is preferably unchanged. Thus, the following Expression 37 is established.

$$e' = e/3 \qquad \text{(Expression 37)}$$

This means that the pixel magnifying projection width is (e/3), in the same way as with a fly eye lens, and a phenomenon occurs wherein, regardless of the display device displaying a three-dimensional image, the observer cannot recognize the three-dimensional image.

SUMMARY OF THE INVENTION

It is an object of the present invention to provide a three-dimensional image display device which allows an observer to recognize a color three-dimensional image with excellent visibility even in the event of rotating the three-dimensional image display device by 90° from the normal observation direction, a portable terminal device mounting the three-dimensional image display device, and a display panel and fly eye lens to be built in the three-dimensional image display device.

A three-dimensional image display device according to a first aspect of the present invention comprises: a display panel on which a plurality of display units including pixels for displaying a right-eye image and pixels for displaying a left-eye image are arrayed in a first direction, and in a second direction orthogonal to the first direction, in matrix fashion; and an optical unit for distributing light emitted from the pixels arrayed in the first direction into mutually different directions along the first direction, and also distributing light emitted from the pixels arrayed in the second direction into mutually different directions along the second direction.

The pixels for displaying a right-eye image and the pixels for displaying a left-eye image are colored in Z (Z represents a natural number) number of colors, and the pixels having the same color are arrayed consecutively along the first direction. And, when Y represents mean interpupillary distance, e represents the magnifying projection width of one pixel in the first direction, and j is a natural number, the following expression 38 holds.

$$\frac{e}{Z} \ne \frac{Y}{2 \times j} \quad \text{(Expression 38)}$$

According to the first aspect of the present invention, the display panel displays a right-eye image and a left-eye image, and the optical unit distributes the light emitted from the display panel into a first direction and a second direction. Subsequently, magnifying projection width e of one pixel is correlated with the mean interpupillary distance Y of an observer, and selected such as shown in the aforementioned Expression 38. Thus, in both cases wherein the direction where a line connecting both eyes of the observer extends (hereinafter, referred to as "direction of both eyes") is assumed to be the first direction or the second direction, the observer can position the right eye to the projection area of the right-eye image, and the left eye to the projection area of the left-eye image, thereby recognizing a three-dimensional image.

Also, when k is assumed to be a natural number, the mean interpupillary distance Y and the magnifying projection width e preferably satisfy the following Expression 39, and more preferably the following Expression 40.

$$\frac{Y}{Z \times (2 \times k - 1) + \frac{1}{2}} < \frac{e}{Z} < \frac{Y}{Z \times (2 \times k - 1) - \frac{1}{2}} \quad \text{(Expression 39)}$$

$$\frac{e}{Z} = \frac{Y}{Z \times (2 \times k - 1)} \quad \text{(Expression 40)}$$

Thus, when the observer randomly positions both eyes to a observation surface, the probability for the observer to recognize a three-dimensional image rises, whereby the observer can search a position of both eyes so as to obtain stereoscopic viewing immediately.

Also, when k is assumed to be a natural number, the mean interpupillary distance Y and the magnifying projection width e may satisfy the following Expression 41 or Expression 42.

$$\frac{e}{Z} = \frac{Y}{Z \times (2 \times k - 1) - \frac{Z}{2}} \quad \text{(Expression 41)}$$

$$\frac{e}{Z} = \frac{Y}{Z \times (2 \times k - 1) + \frac{Z}{2}} \quad \text{(Expression 42)}$$

Thus, even in either the case wherein the direction of both eyes is the first direction or the case wherein the direction of both eyes is the second direction, the probability for the observer to recognize a three-dimensional image becomes the same.

Further, it is preferable to satisfy Y/6<e/3. Thus, during mean interpupillary distance, the number of times for switching left-eye and right-eye images is reduced, and a stereoscopic vision region is prevented from segmentation, whereby the observer can easily obtain stereoscopic viewing.

Furthermore, the number of colors Z may be three. Thus, the display pixels can be made up of pixels with three primary colors of RGB.

Furthermore, The mean interpupillary distance may be in the range of 62-65 mm.

A three-dimensional image display device according to a second aspect of the present invention comprises: a display panel on which a plurality of display units including pixels for displaying a right-eye image and pixels for displaying a left-eye image are arrayed in a first direction, and in a second direction orthogonal to the first direction, in matrix fashion; and a fly eye lens of which a plurality of lens elements are arrayed in the first and second direction, in matrix fashion, for distributing light emitted from the pixels arrayed in the first direction into mutually different directions along the first direction, and also distributing light emitted from the pixels arrayed in the second direction into mutually different directions along the second direction.

And, the pixels for displaying a right-eye image and the pixels for displaying a left-eye image are colored in Z (Z represents a natural number) number of colors, the pixels having the same color are arrayed consecutively along the first direction, the array pitch of the lens elements in the first direction and the array pitch of the lens elements in the second direction are different each other.

According to the second aspect of the present invention, it is possible for the observer to position the right eye and the left eye to the projection area of the right-eye image and the projection area of the left-eye image, respectively, regardless of which direction both eyes of the observer are in, the first direction or the second direction. Consequently, color three-dimensional images can be observed favorably.

Moreover, the array pitch of the lens elements in the first direction may be Z times the array pitch of the lens elements in the second direction. Furthermore, the number of colors Z of the pixels on the display panel may be three.

A three-dimensional image display device according to a third aspect of the present invention comprises: a display panel on which a plurality of pixels colored in a plurality of colors are arrayed in a first direction and a second direction orthogonal to the first direction in matrix fashion; and an optical unit for distributing light emitted from the pixels arrayed in the first direction into mutually different directions along the first direction, and also distributing light emitted from the pixels arrayed in the second direction into mutually different directions along the second direction. The array pitch of the pixels in the first direction and the array pitch of the pixels in the second direction are equal to each other, the display panel is made up of a plurality of pixel matrixes wherein a plurality of pixels having the same color are mutually arrayed in matrix fashion, on which the pixel matrixes having mutually different colors are repeatedly arrayed in the first direction and in the second direction, and the optical unit is made up of a plurality of optical elements corresponding to the pixel matrixes.

According to the third aspect of the present invention, since the array pitch of the pixels in the first direction and that in the second direction are equal to each other, the magnifying projection width of the pixels in the first direction and that in the second direction can be equal to each other. Consequently, even in either the case wherein the direction of both eyes is the first direction or the case wherein the direction of both eyes is the second direction, visibility of three-dimensional images can be improved.

A three-dimensional image display device according to a fourth aspect of the present invention comprises: a display panel on which a plurality of display units including pixels for displaying a right-eye image and pixels for displaying a left-eye image are arrayed in a first direction, and in a second direction orthogonal to this first direction, in matrix fashion; a first lenticular lens on which a plurality of cylindrical lenses of which the longitudinal direction extends in the first direction are arrayed in the second direction; and a second lenticular lens disposed on a position sandwiching the first lenticular lens against the display panel, on which a plurality of cylindrical lenses of which the longitudinal direction extends in the second direction are arrayed in wider array pitch than the array pitch of the cylindrical lens in the first lenticular lens in the first direction. The pixels for displaying a right-eye image and the pixels for displaying a left-eye image are colored in Z (Z represents a natural number) number of colors, the pixels having the same color are arrayed consecutively along the first direction.

According to the fourth aspect of the present invention, since the array pitch of the cylindrical lenses in the first lenticular lens is narrower than that in the second lenticular lens, when the focal point of the first lenticular lens and the focal point of the second lenticular lens are disposed on the same flat surface, the array pitch of the pixels in the second direction on the display panel can be reduced narrower than the array pitch in the first direction. Accordingly, three colored pixels can be arrayed in the second direction. At this time, the lens surface of the first lenticular lens is closer to the display panel than that of the second lenticular lens, so the magnifying projection width of one pixel in the second direction can be increased wider than that in the first direction. Consequently, even in either the case wherein the direction of both eyes is the first direction or the case wherein the direction of both eyes is the second direction, visibility of three-dimensional images can be improved.

Also, at this time, the first lenticular lens of which the lens surface is preferably disposed so as to face the display panel, so the second lenticular lens of the opposite surface of the lens surface is preferably disposed so as to face the first lenticular lens. Thus, the array pitch of the pixels in the second direction can be easily reduced narrower than the array pitch in the first direction.

A three-dimensional image display device according to a fifth aspect of the present invention comprises: a display panel on which a plurality of display units including pixels for displaying a right-eye image and pixels for displaying a left-eye image are arrayed in a first direction, and in a second direction orthogonal to this first direction, in matrix fashion; a first parallax barrier on which a plurality of slits of which the longitudinal direction extends in the first direction are formed; and a second parallax barrier disposed on a position sandwiching the first parallax barrier along with the display panel, on which a plurality of slits of which the longitudinal direction extends in the second direction are formed. The pixels for displaying a right-eye image and the pixels for displaying a left-eye image are colored in Z (Z represents a natural number) number of colors, the pixels having the same color are arrayed consecutively along the first direction.

According to the fifth aspect of the present invention, the first parallax barrier is closer to the display panel than the second parallax barrier, so the magnifying projection width of one pixel in the second direction can be increased wider than that in the first direction. Consequently, even in either the case wherein the direction of both eyes is the first direction or the case wherein the direction of both eyes is the second direction, visibility of three-dimensional images can be improved.

With the aforementioned respective three-dimensional image display devices, an arrangement may be made wherein in the event that the first direction is disposed so as to coordinate with the direction from the right eye of an observer to the left eye, a pair of pixels on which a right-eye image and left-eye image are respectively displayed arrayed in the first direction within each display unit, also a plurality of pixels on which mutually different images are displayed arrayed in the second direction within each display unit, and in the event that the second direction is disposed so as to coordinate with the direction from the right eye of an observer to the left eye, a pair of pixels on which a right-eye image and left-eye image are respectively displayed arrayed in the second direction within each display unit, and also a plurality of pixels on which mutually different images are displayed arrayed in the first direction within each display unit. Thus, the observer can observe different images by simply changing an observation angle as to the three-dimensional image display device to the vertical direction.

A portable terminal device according to a sixth aspect of the present invention comprises: a main body; and a three-dimensional image display device according to any one of first through fifth aspects connected to the main body.

Also, the three-dimensional image display device is preferably connected to the main body so as to rotate, and further comprises detecting a unit for detecting the displacement direction of the three-dimensional image display device relative to the main body. The three-dimensional image display device preferably switches the array direction of the pixels for displaying a right-eye image and the pixels for displaying a left-eye image either in the first direction or in the second direction based on the detection results of the detecting unit. Thus, the observer can switch the direction for displaying an image without rotating the main body. Also, a method for displaying an image may be switched by synchronizing with the displacement direction of the three-dimensional image display device.

With a display panel according to a seventh aspect of the present invention on which a plurality of pixels colored in a plurality of colors are arrayed in a first direction and a second direction orthogonal to the first direction, the array pitch of the pixels in the first direction and the array pitch of the pixels in the second direction are equal to each other, and the display panel is made up of a plurality of pixel matrixes on which a plurality of pixels mutually colored in the same color are arrayed in matrix fashion, and the pixel matrixes colored in mutually different colors are repeatedly arrayed in the first and second directions.

According to the seventh aspect of the present invention, the array pitches of the pixels in the first and second directions are equal to each other, so when the light emitted from the pixels by the optical unit is distributed, the magnifying projection width in the first and second directions can be equal to each other. Consequently, even in either the case wherein the direction of both eyes is the first direction or the case wherein the direction of both eyes is the second direction, visibility of three-dimensional images can be improved.

With a fly eye lens according to a eighth aspect of the present invention on which a plurality of lens elements are disposed in matrix fashion, the array pitch of the lens elements in one direction of the matrix and the array pitch of the lens elements in another direction, orthogonal to the one direction, are different to each other.

According to the present invention, even in either the case wherein the direction of both eyes is the first direction or the case wherein the direction of both eyes is the second direction, the observer can position the right eye to the projection area of a right-eye image and the left eye to the projection area of a left-eye image by correlating the magnifying projection width e of one pixel with the spacing of both eyes Y of the observer, and setting the width e such as shown in Expression 38, whereby the observer can obtain excellent visibility of color three-dimensional images.

BRIEF DESCRIPTION OF THE DRAWINGS

FIGS. 15A and 15B are diagrams illustrating displacement of both ends, of displacements wherein when the direction of both eyes is set to be identical to a first direction 21, the observer can recognize a three-dimensional image by positioning a left-eye 61 to a left-eye magnifying projection region, and a right-eye 62 to a right-eye magnifying projection region, wherein FIG. 15A illustrates a case of $(Y/3) \leq (e/3)$, i.e., $0 \leq Y \leq e$, and FIG. 15B illustrates a case of $(Y/6) \leq (e/3) \leq (Y/3)$, i.e., $e \leq Y \leq (2 \times e)$;

FIGS. 18A through 18F are diagrams illustrating displacement of both ends, of displacements wherein when the direction of both eyes is set to be identical to a second direction 22, the observer can recognize a three-dimensional image by positioning a left-eye 61 to a left-eye magnifying projection region, and a right-eye 62 to a right-eye magnifying projection region, wherein FIG. 18A illustrates a case of $Y \leq (e/3)$, i.e., $0 \leq Y \leq (e/3)$, FIG. 18B illustrates a case of $(Y/2) \leq (e/3) \leq Y$, i.e., $(e/3) \leq Y \leq (2/3) \times e$, FIG. 18C illustrates a case of $(Y/3) \leq (e/3) \leq (Y/2)$, i.e., $(2/3) \times e \leq Y \leq e$, FIG. 18D illustrates a case of $(Y/4) \leq (e/3) \leq (Y/3)$, i.e., $e \leq Y \leq (2/3) \times e$, FIG. 18E illustrates a case of $(Y/5) \leq (e/3) \leq (Y/4)$, i.e., $(2/3) \times e \leq Y \leq (2/3) \times e$, and FIG. 18F illustrates a case of $(Y/6) \leq (e/3) \leq (Y/5)$, i.e., $(2/3) \times e \leq Y \leq (2 \times e)$;

FIG. 22A illustrates a case wherein a three-dimensional image display device is used on a normal arrangement, and FIG. 22B illustrates a case wherein the three-dimensional image display device is rotated by 90° prior to use;

FIG. 36 is a perspective view illustrating a three-dimensional image display device according to a seventh embodiment of the present invention.

DETAILED DESCRIPTION OF THE PREFERRED EMBODIMENTS

Preferred embodiments of the present invention are described below in detail with reference to the appended drawings.

First Embodiment

Figure 1:
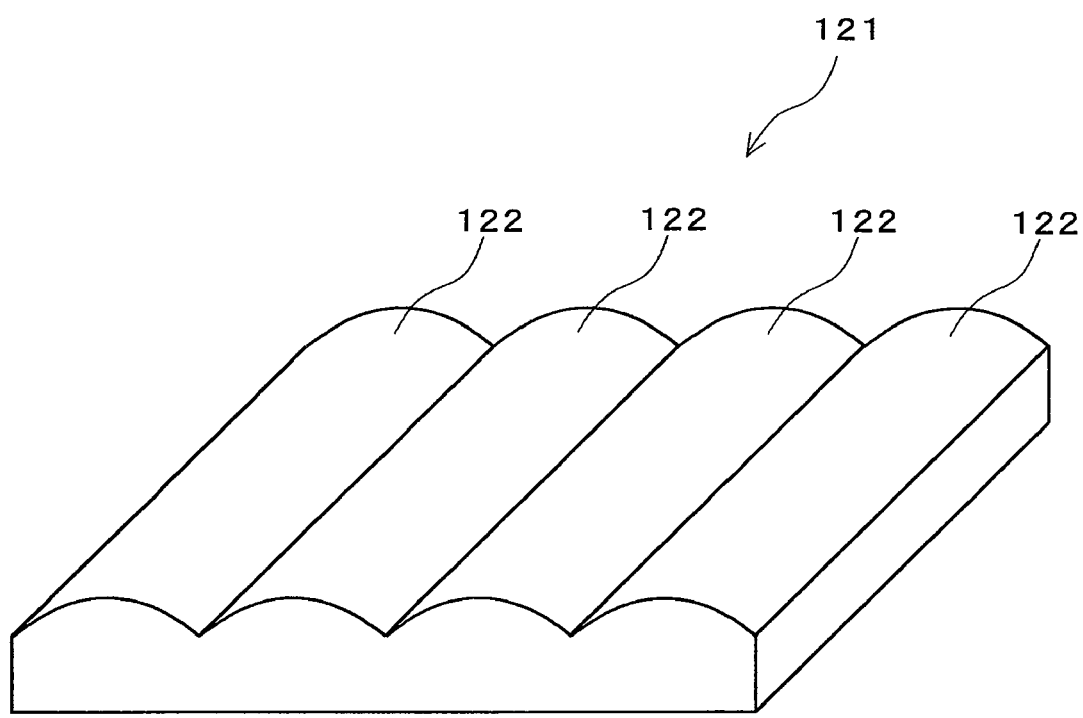
FIG. 1 is a perspective view illustrating a lenticular lens.
Figure 2:
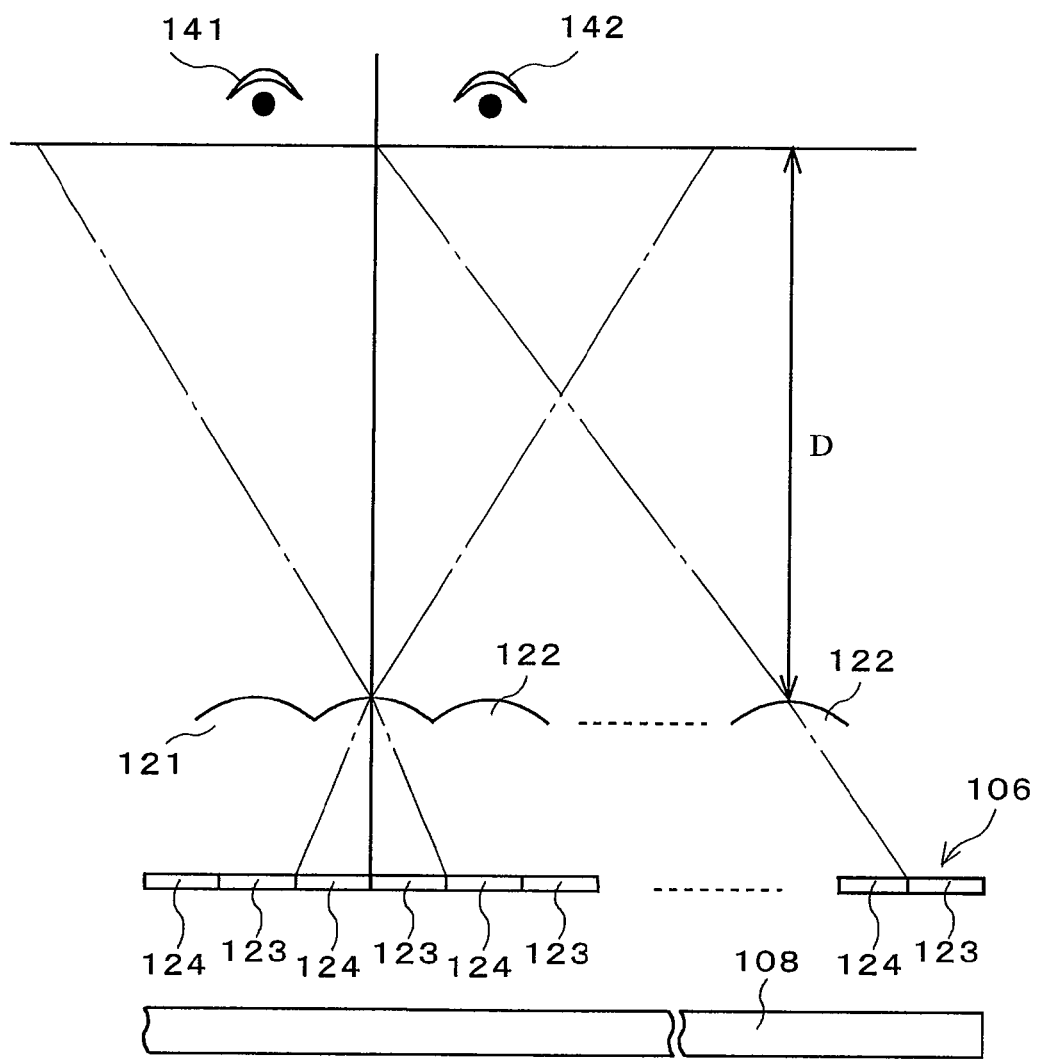
FIG. 2 is an optical model diagram illustrating a conventional three-dimensional image display method using a lenticular lens.
Figure 3:
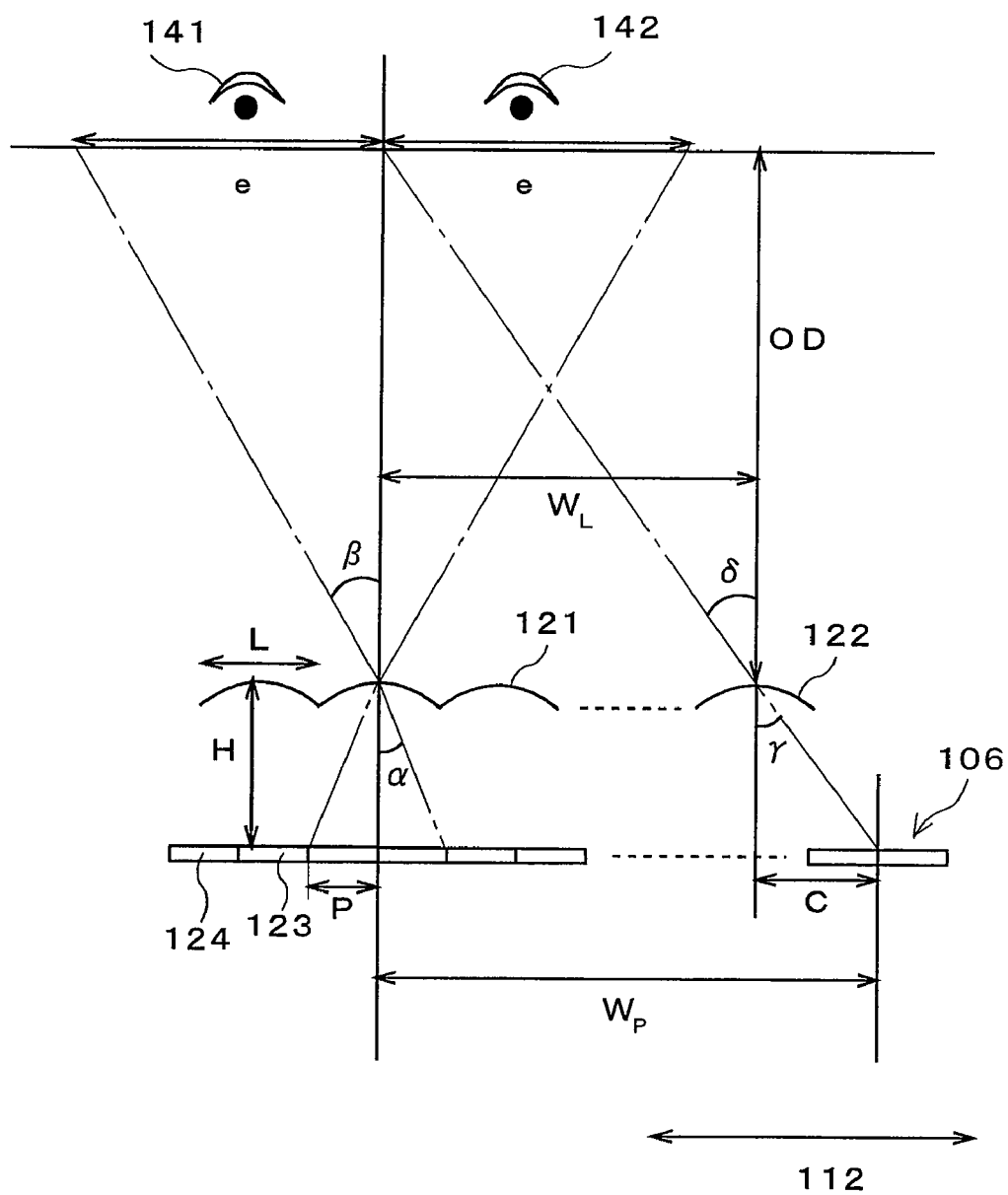
FIG. 3 is an optical model diagram of a conventional dual-viewpoint three-dimensional image display device using the lenticular lens method.
Figure 4:
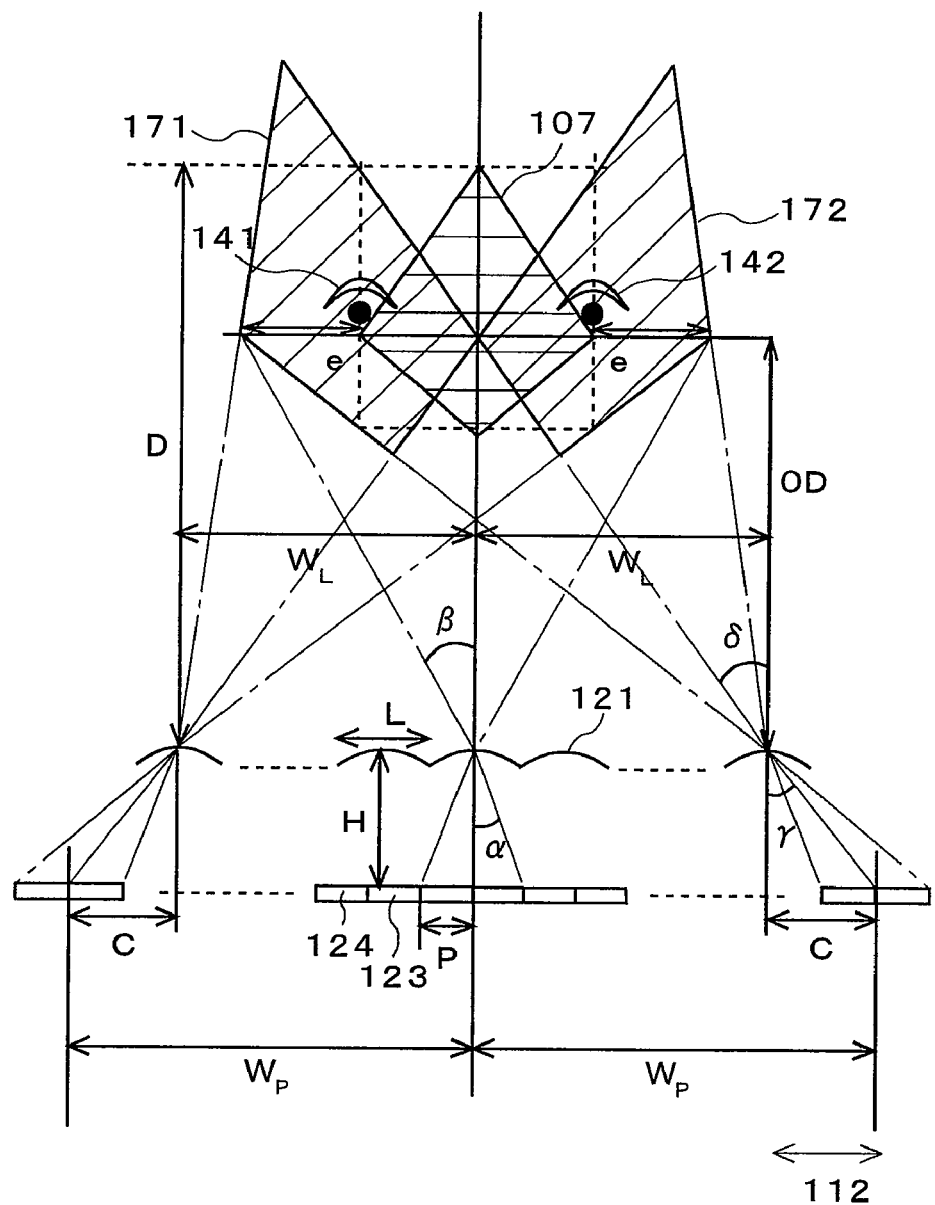
FIG. 4 is an optical model diagram illustrating an observation range of a conventional dual-viewpoint three-dimensional image display device using the lenticular lens method.
Figure 5:
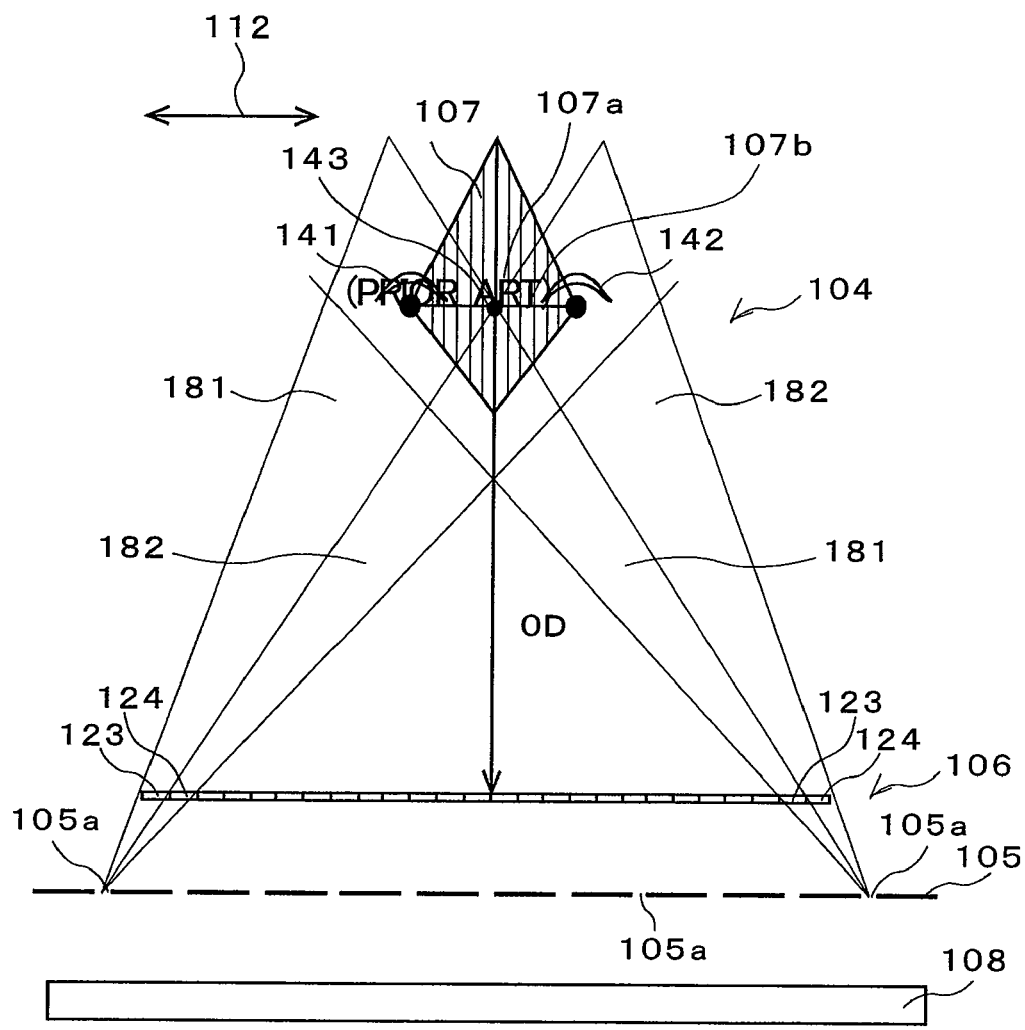
FIG. 5 is an optical model diagram illustrating a conventional three-dimensional image display method using a parallax barrier.
Figure 6:
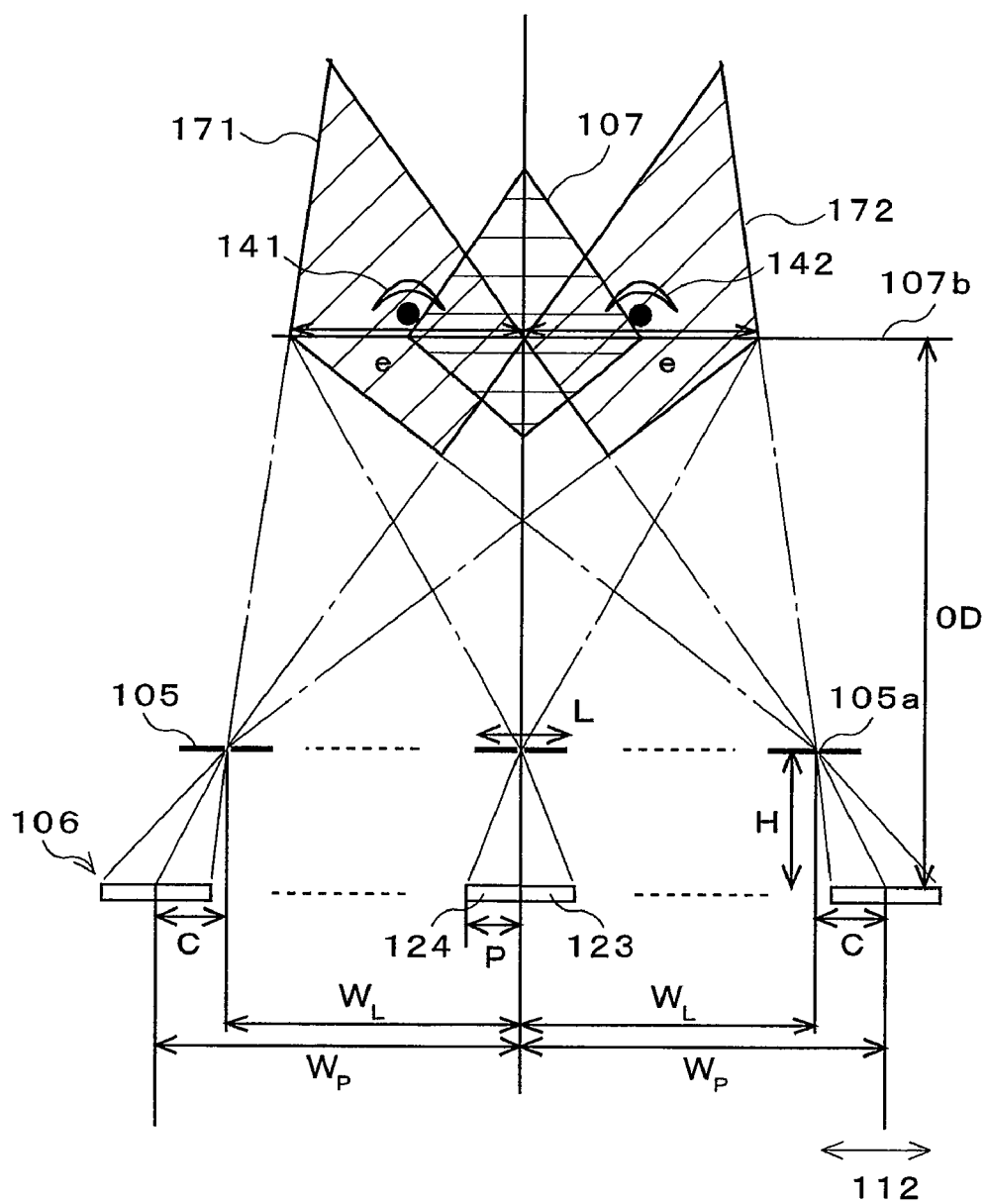
FIG. 6 is an optical model diagram of a conventional dual-viewpoint three-dimensional image display device equipped with a slit-shaped parallax barrier on the observer side of a display panel.
Figure 7:
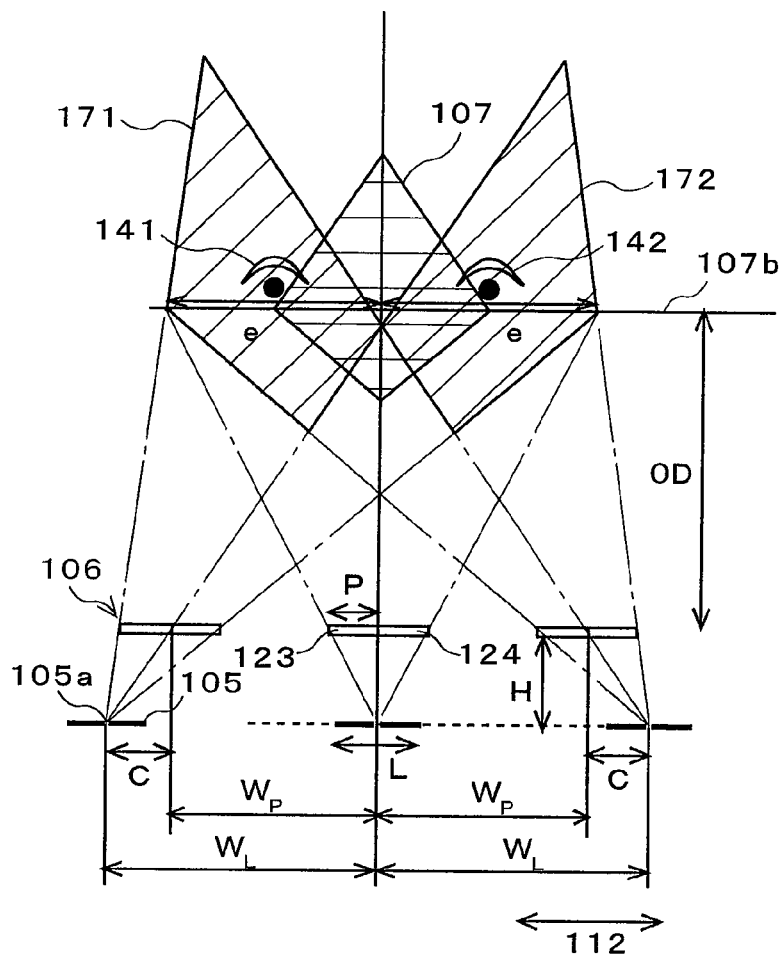
FIG. 7 is an optical model diagram of a conventional dual-viewpoint three-dimensional image display device equipped with a slit-shaped parallax barrier on the rear surface of a display panel.
Figure 8:
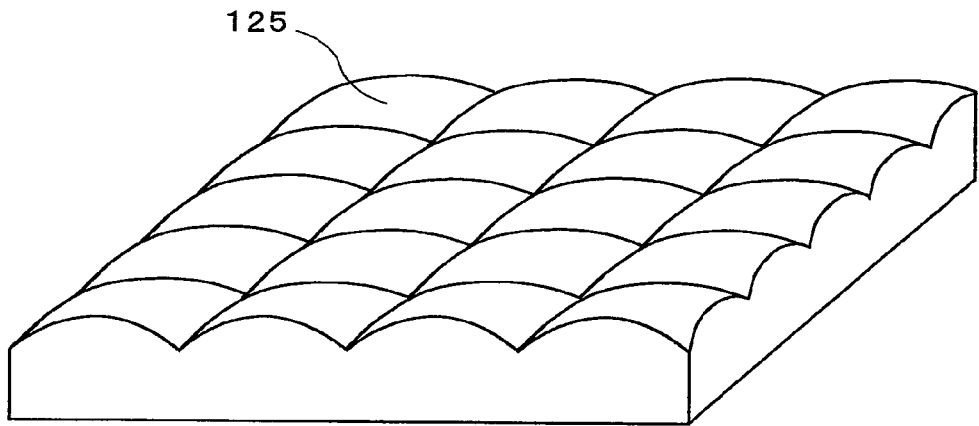
FIG. 8 is a perspective view illustrating a fly eye lens.
Figure 9:
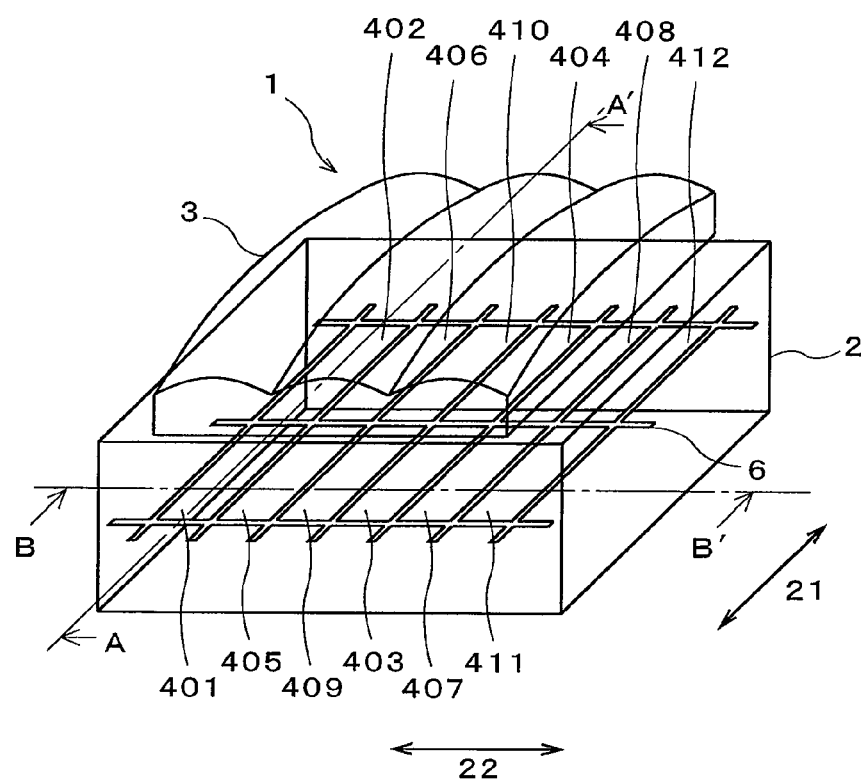
FIG. 9 is a perspective view illustrating one display pixel in a three-dimensional image display device according to a first embodiment of the present invention.
Figure 10:
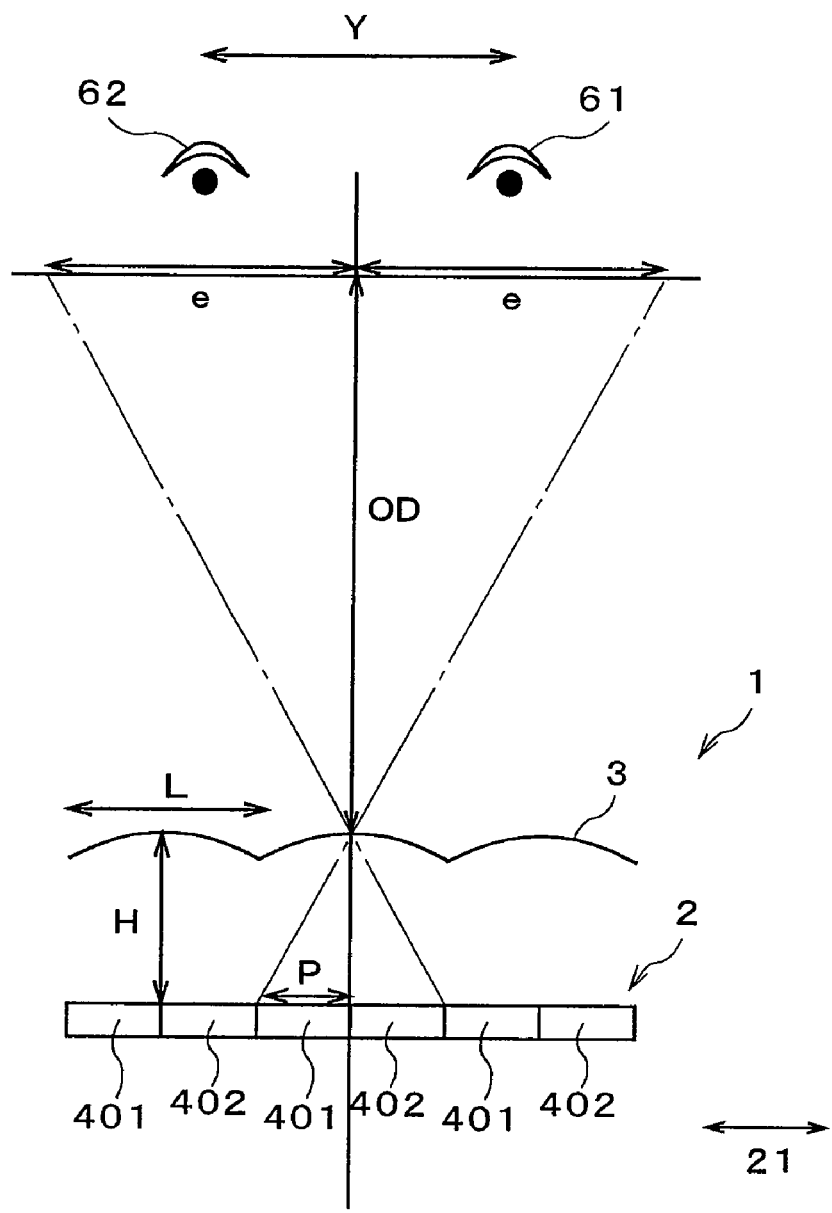
FIG. 10 is an optical model diagram illustrating a cross-section taken along line A-A' illustrated in FIG. 9.
Figure 11:
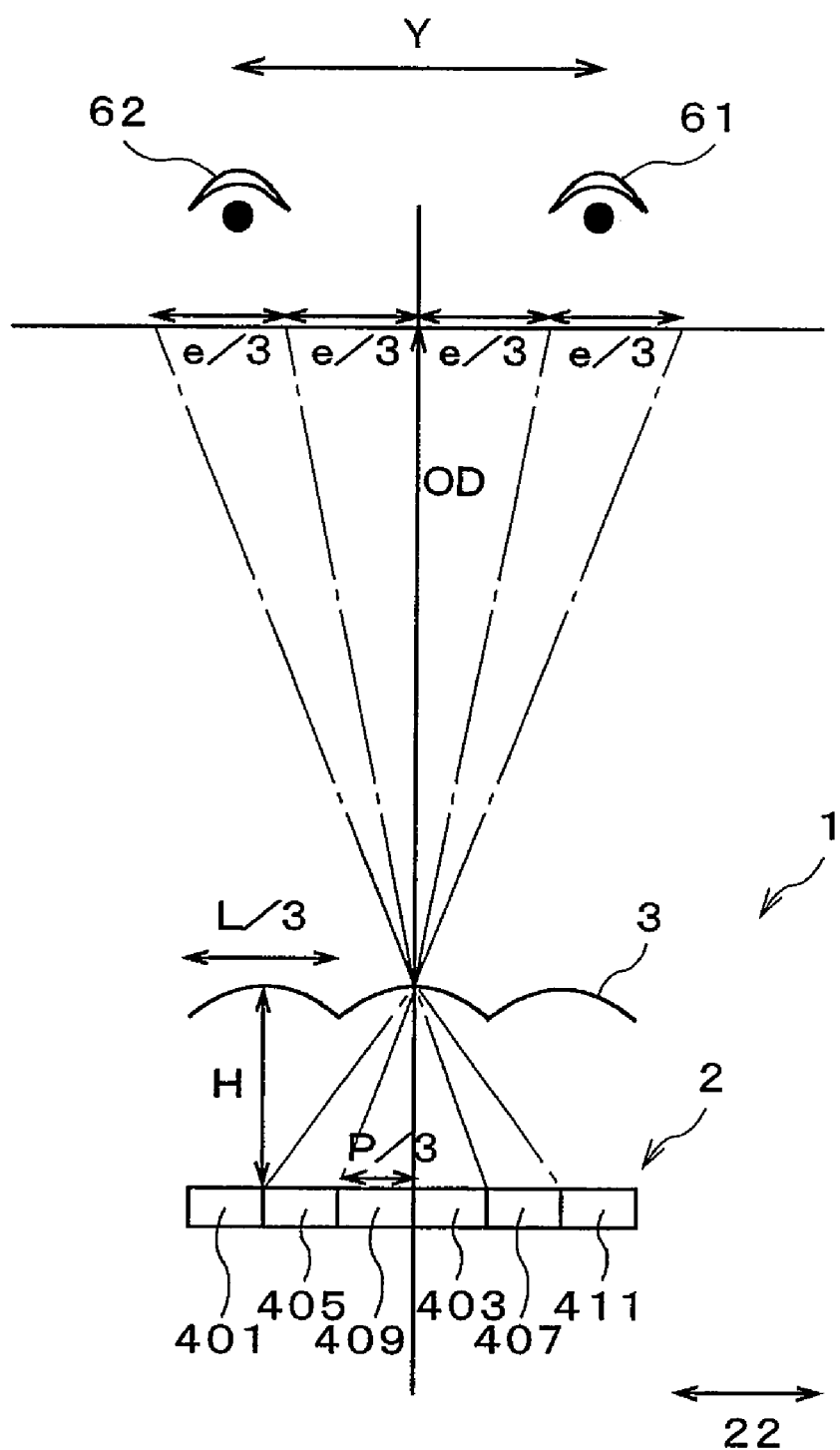
FIG. 11 is an optical model diagram illustrating a cross-section taken along line B-B' illustrated in FIG. 9.
Figure 12:
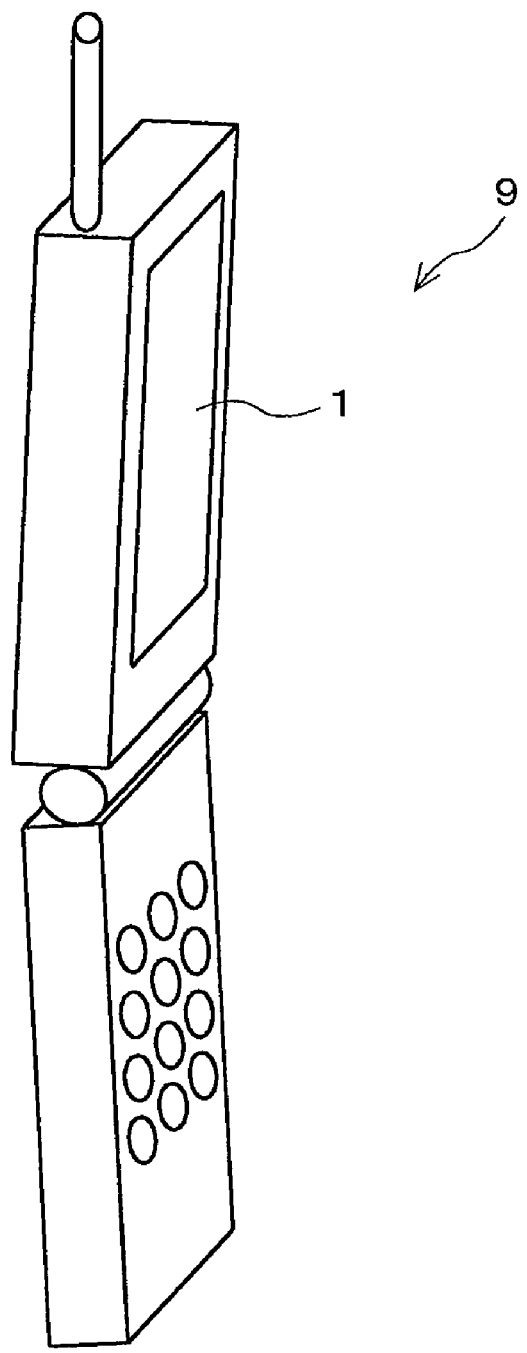
FIG. 12 is a perspective view illustrating a portable terminal device according to the present embodiment.

Firstly, a first embodiment of the present invention is described. FIG. 9 is a perspective view illustrating one display pixel in a three-dimensional image display device according to the first embodiment of the present invention, FIG. 10 is an optical model diagram illustrating a cross-section taken along line A-A' illustrated in FIG. 9, FIG. 11 is an optical model diagram illustrating a cross-section taken along line B-B' illustrated in FIG. 9, and FIG. 12 is a perspective view illustrating a portable terminal device according to the present embodiment.

As illustrated in FIG. 9, in a three-dimensional image display device 1 according to the present embodiment, a fly eye lens 3, a display panel 2, and light source (not shown) are provided in that order from the observer side. Examples of the display panel 2 include a transmissive liquid crystal panel. The display panel 2 is configured of numerous display pixels, and one display pixel is made up of pixels 401 through 412 with three primary colors, i.e., RGB arrayed in a striped shape. That is to say, a red pixel A401 and a red pixel B402 are adjacent to each other, and the red pixel A401 and a green pixel A405 are adjacent to each other. In the same way, the red pixel B402 and a green pixel B406 are adjacent to each other. Further, a blue pixel A409 is adjacent to the green pixel A405, and a blue pixel B410 is adjacent to the green pixel B406. The other pixels have the same color array relation, as illustrated in FIG. 9.

Subsequently, as illustrated in FIG. 9, let us say that the direction where the same colored pixels are arrayed consecutively is a first direction 21, and the direction where mutually different colored pixels are arrayed repeatedly is a second direction 22. The pitch of the colored pixels in the second direction 22 is one third (⅓) of the pitch in the first direction 21. With the fly eye lens 3, curvature in the first direction is the same as curvature in the second direction, and the lens pitch in the second direction 22 is one third (⅓) of the lens pitch in the first direction 21. In other words, four pixels in total arrayed in 2×2 matrix along the first direction 21 and second direction 22 (for example, red pixel A401, red pixel B402, green pixel A405, and green pixel B406) correspond to one lens element in the fly eye lens 3. Subsequently, one display unit is made up of 12 pixels 401 through 412. A shielding unit 6 is provided between respective pixels for preventing color mixture of images, and also hiding wiring for transmitting display signals to pixels.

At this time, in the event that the display panel is disposed such that the first direction 21 is parallel to the direction where a line connecting both eyes of the observer extends, two pixels arrayed in the first direction 21 serve as a left-eye pixel and a right-eye pixel respectively based on the positional relation as to the corresponding fly eye lens. For example, the red pixel A401 and green pixel A405 serve as left-eye pixels, and the red pixel B402 and green pixel B406 serve as right-eye pixels.

In the same way, in the event that the display panel is disposed such that the second direction 22 is identical to the direction of both eyes, two pixels arrayed in the second direction 22 serve as a left-eye pixel and a right-eye pixel respectively based on the positional relation as to the corresponding fly eye lens. For example, the red pixel A401 and red pixel B402 serve as left-eye pixels, and the green pixel A405 and green pixel B406 serve as right-eye pixels. With the adjacent lens element of the fly eye lens, in the same way, the blue pixel A409 and blue pixel B410 serve as left-eye pixels, and a red pixel C403 and red pixel D404 serve as right-eye pixels. With the adjacent but one lens element of the fly eye lens, in the same way, a green pixel C407 and green pixel D408 serve as left-eye pixels, and a blue pixel C411 and blue pixel D412 serve as right-eye pixels.

As illustrated in FIG. 10, the pixel pitch in the first direction 21 is P, and the distance between the fly eye lens 3 and the display panel 2 (hereinafter, referred to as "lens-pixel distance") is H. Let us say that a observation surface is set on a position with an observation distance OD from the lens surface, the magnifying projection width of one pixel is e, and mean interpupillary distance (the spacing between eyes of the average observer) is Y. Incidentally, the mean interpupillary distance of an adult male is 65 mm with standard deviations of ±3.7 mm, and the mean interpupillary distance of an adult female is 62 mm with standard deviations of ±3.6 mm (Neil A. Dodgson, "Variation and extrema of human interpupillary distance," Proc. SPIE vol. 5291). Therefore, it is suitable that the mean interpupillary distance Y is appropriately set in the range of 62-65 mm, in the case of designing the three-dimensional image display device according to the present embodiment for average adult persons. For example, Y=63 mm. When the direction of both eyes is identical to the first direction 21, the pixels for displaying a right-eye image and the pixels for displaying a left-eye image are alternatively arrayed. For example, when the red pixel A401 displays a left-eye image, the red pixel B402 displays a right-eye image.

Also, as illustrated in FIG. 11, the pixel pitch in the second direction 22 is (P/3), and accordingly, the magnifying projection width of one pixel is (e/3). With the present embodiment, the left eye 61 of the observer is positioned on the magnifying projection area of the green pixel A405, the right eye 62 of the observer is positioned on the magnifying projection area of the green pixel C407, and the magnifying projection area of the blue pixel A409 and magnifying projection area of the red pixel C403 are disposed between the magnifying projection area of the green pixel A405 and the green pixel C407. In other words, the magnifying projection area of the green pixel A405 and magnifying projection area of the blue pixel A409, and magnifying projection area of the red pixel C403 and the green pixel C407 are disposed between the left eye 61 and right eye 62 in that order from the left eye 61 side to the right eye 62 side. When the direction of both eyes of the observer is identical to the second direction 22, the pixels for displaying a right-eye image and the pixels for displaying a left-eye image are alternatively arrayed. For example, when the green pixel A405, red pixel C403, and blue pixel C411 display a left-eye image, the red pixel A401, blue pixel A409, and green pixel C407 display a right-eye image. That is to say, during the mean interpupillary distance of the observers, the left and right images are changed three times.

With the present embodiment, when j and k are natural numbers, in the observation surface, the mean interpupillary distance Y of the observer and the magnifying projection width e in the first direction 21 satisfy the following Expression 43, satisfy the following Expression 44 for example, and satisfy the following Expression 45 for example. Note that the following Expression 45 is in a case of k=1 in the following Expression 44.

$$\frac{e}{3} \neq \frac{Y}{2 \times j}$$ (Expression 43)

$$\frac{Y}{3 \times (2 \times k - 1) + \frac{1}{2}} < \frac{e}{3} < \frac{Y}{3 \times (2 \times k - 1) - \frac{1}{2}}$$ (Expression 44)

$$\frac{Y}{3.5} < \frac{e}{3} < \frac{Y}{2.5}$$ (Expression 45)

Note that in the event that the number of times for switching left and right images during the mean interpupillary distance of the observers is N, and also N is an odd number, the above Expressions 43 and 44 can be represented as the following Expressions 46 and 47 respectively.

$$Y/(N+1) < e/3 < Y/(N-1)$$ (Expression 46)

$$Y/(N+\tfrac{1}{2}) < e/3 < Y/(N-\tfrac{1}{2})$$ (Expression 47)

In FIG. 11, the number of times for switching left and right images during the mean interpupillary distance is 3, but this number of times becomes 2 depending on the position of both eyes of the observer. At this time, in the event of employing an odd number 3 as the value of N, the above Expression 47 is identical to the above Expression 45.

Also, as illustrated in FIG. 12, the three-dimensional image display device 1 according to the present embodiment can be mounted in a portable terminal device such as a handheld phone 9.

Figure 13:
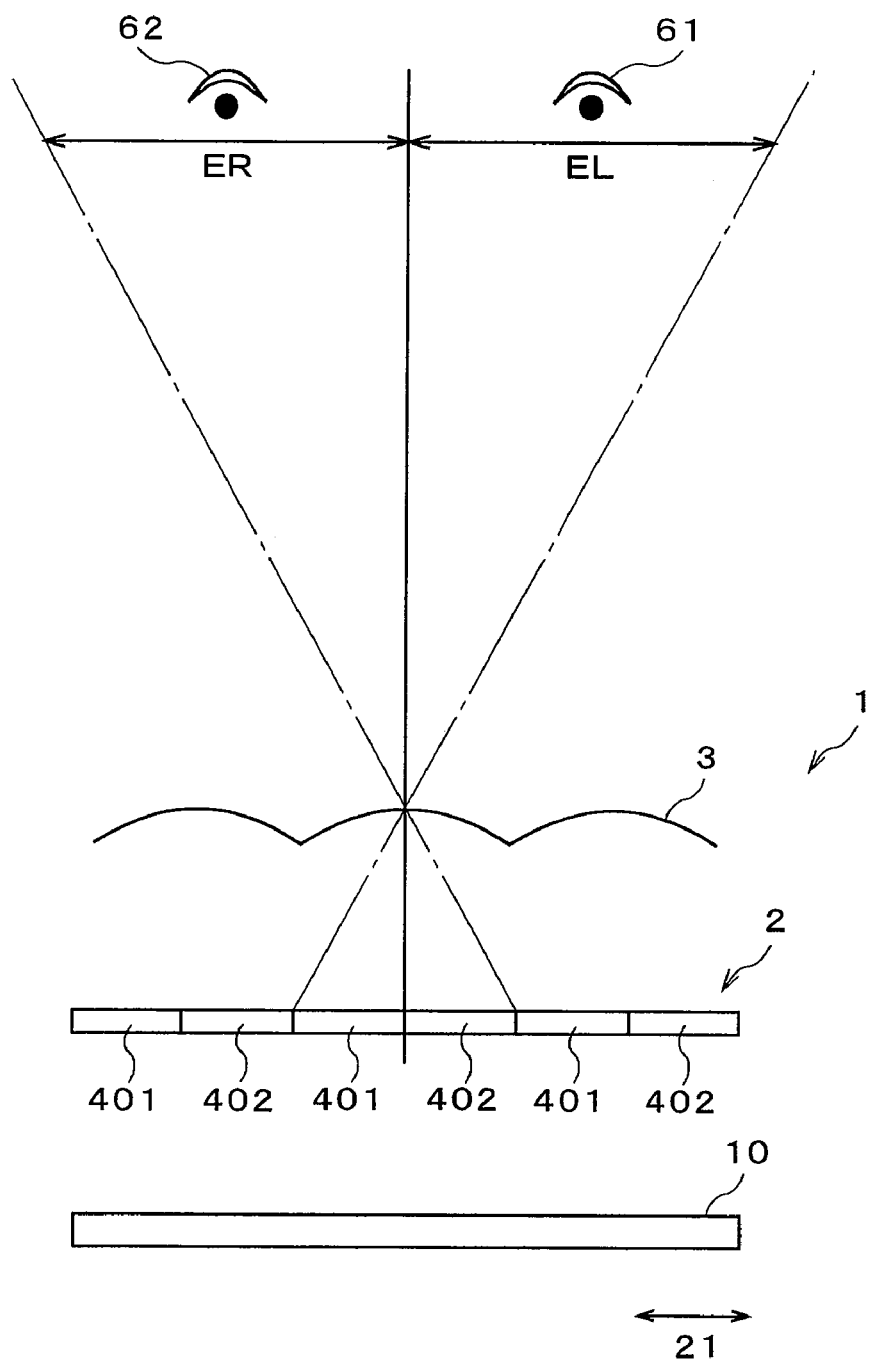
FIG. 13 is a cross-sectional view illustrating operation in a case wherein the three-dimensional image display device according to the present embodiment is disposed such that a first direction is identical to a direction of both eyes.

Next, operation of the three-dimensional image display device 1 according to the present embodiment having the aforementioned configuration, will be described, i.e., a three-dimensional image display method according to the present embodiment. First, a case wherein the three-dimensional image display device 1 is disposed such that the direction of both eyes of the observer is identical to the first direction 21 is described. FIG. 13 is an optical model diagram illustrating operation in a case wherein the three-dimensional image display device according to the present embodiment is disposed such that the first direction is identical to the direction of both eyes. As illustrated in FIG. 9 and FIG. 13, first, a light source 10 is turned on. Upon the light source 10 being turned on, the light emitted from the light source 10 is cast into the display panel 2. Meanwhile, a control device (not shown) drives the display panel 2, and controls each left-eye pixel and each right-eye pixel to display a left-eye image and right-eye image respectively. At this time, the display panel 2 displays a mutually-different-eye image on a pixel set (hereinafter, referred to as "first pixel set") made up of the pixels 401, 405, 409, 403, 407, and 411, and a pixel set (hereinafter, referred to as "second pixel set") made up of the pixels 402, 406, 410, 404, 408, and 412. For example, the display panel 2 displays a left-eye image on the first pixel set, and a right-eye image on the second pixel set.

Subsequently, the light cast into the left-eye pixels and right-eye pixels of the display panel 2 passes through these pixels, and proceeds to the fly eye lens 3. The light is refracted by the fly eye lens 3, the light passed through the first pixel set of the display panel 2 proceeds to a region EL1, and the light passed through the second pixel set proceeds to a region ER1. At this time, upon the observer positioning the left eye 61 to the region EL1, and the right eye 62 to the region ER1, a left-eye image is input to the left eye 61, and also a right-eye image is input to the right eye 62. In the event that there is parallax between images to be viewed with the left eye and with the right eye, the observer can recognize an image displayed by the display panel 2 as a three-dimensional image.

Figure 14:
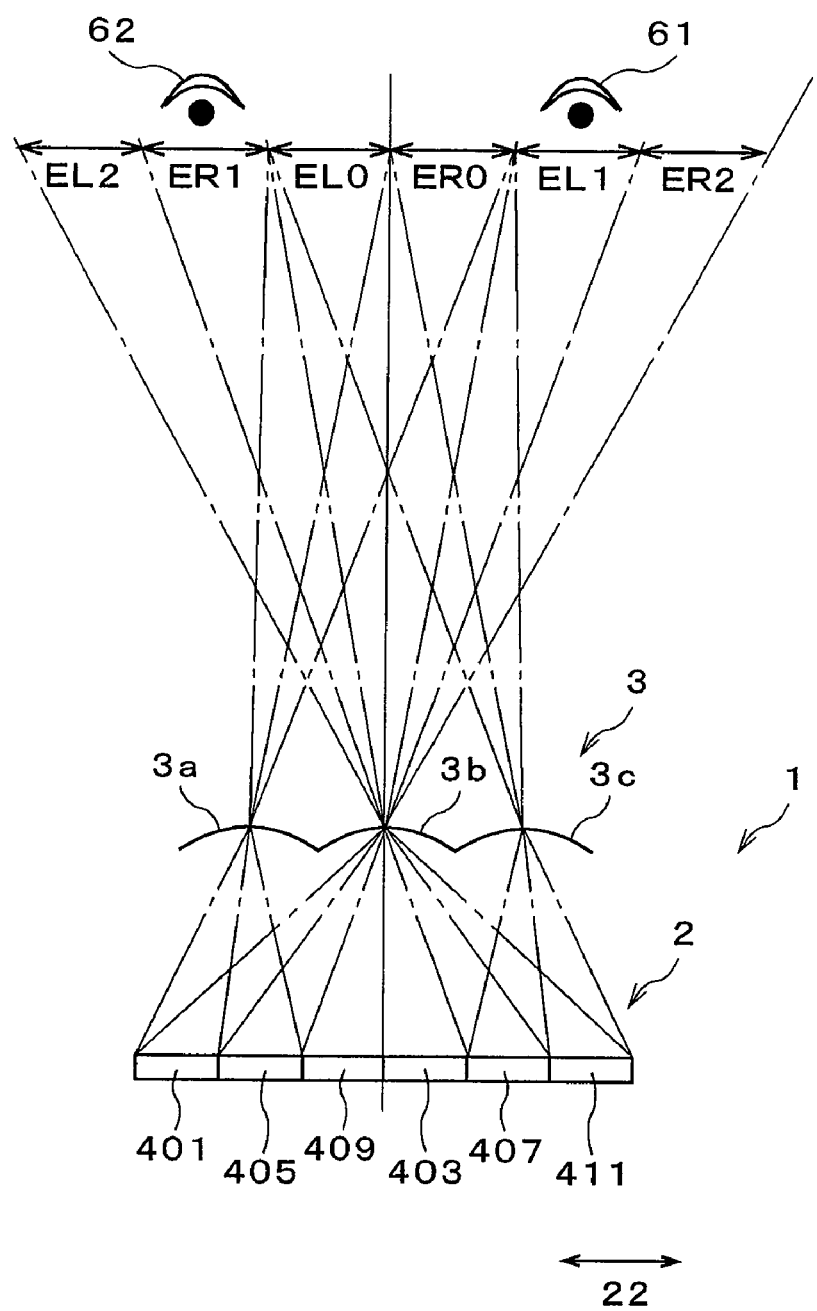
FIG. 14 is a cross-sectional view illustrating operation in a case wherein the three-dimensional image display device according to the present embodiment is disposed such that a second direction is identical to a direction of both eyes.

Next, description will be made regarding a case wherein the three-dimensional image display device 1 is disposed such that the direction of both eyes is identical to the second direction 22. FIG. 14 is an optical model diagram illustrating operation in a case wherein the three-dimensional image display device according to the present embodiment is disposed such that the second direction is identical to the direction of both eyes. As illustrated in FIG. 9 and FIG. 14, the control device (not shown) drives the display panel 2 to display a mutually-different-eye image on a pixel set (hereinafter, referred to as "third pixel set") made up of the pixels 401, 402, 409, 410, 407, and 408, and a pixel set (hereinafter, referred to as "fourth pixel set") made up of the pixels 405, 406, 403, 404, 411, and 412.

For example, the display panel 2 displays a right-eye image on the third pixel set, and a left-eye image on the fourth pixel set.

Subsequently, the light source 10 turns on, the light emitted from the light source 10 passes through each pixel on the display panel 2, and proceed to the fly eye lens 3. The light is refracted by the fly eye lens 3, and the light passed through the third pixel set and the light passed through the fourth pixel set, of the display panel 2, proceed in mutually different directions. More specifically, the light emitted from the blue pixel A409 and the light emitted from the red pixel C403 are projected onto a region ER0 and region EL0 respectively by the corresponding lens element 3b. In the same way, the light emitted from the red pixel A401 and the light emitted from the green pixel A405 are projected onto the region ER0 and region EL0 respectively by the corresponding lens element 3a, and the light emitted from the green pixel C407 and the light emitted from the blue pixel C411 are projected onto the region ER0 and region EL0 respectively by the corresponding lens element 3c. Also, the light emitted from the red pixel A401 and the light emitted from the green pixel A405 are passed through the lens element 3b adjacent to the corresponding lens element 3a, and then are projected onto the region ER2 and region EL1. In the same way, the light emitted from the green pixel C407 and the light emitted from the blue pixel C411 are passed through the lens element 3b adjacent to the corresponding lens element 3c, and then are projected onto the region ER1 and region EL2. Thus, the light emitted from the pixels for displaying a left-eye image is projected onto the region EL0, EL1, or EL2, and the light emitted from the pixels for displaying a right-eye image is projected onto the region ER0, ER1, or ER2.

At this time, upon the observer positioning the left eye 61 to the regions EL0, EL1, or EL2 where the light for the left eye is projected, and also positioning the right eye 62 to the regions ER0, ER1, or ER2 where the light for the right eye is projected, a left-eye image is input to the left eye 61, and also a right-eye image is input to the right eye 62. In the event that both left-eye image and right-eye image include parallax, the observer can recognize an image displayed by the display panel 2 as a three-dimensional image.

Next, the reason for restricting numerical values will be described, more specifically, the reason why the aforementioned Expressions 43 through 45 are established. That is, the probability of enabling stereoscopic viewing (hereinafter, referred to "stereoscopic viewing probability") when the observer randomly positions his/her own both eyes to the observation surface of the three-dimensional image display device will be described.

Figure 15A:
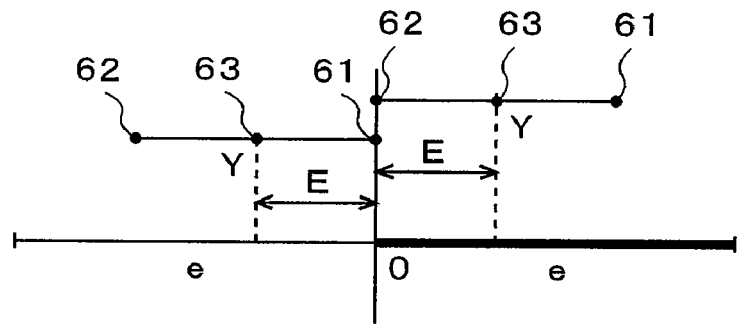
Figure 15B:
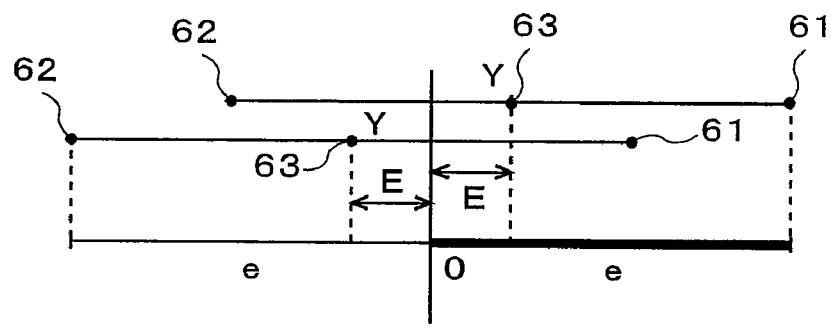
Figure 16:
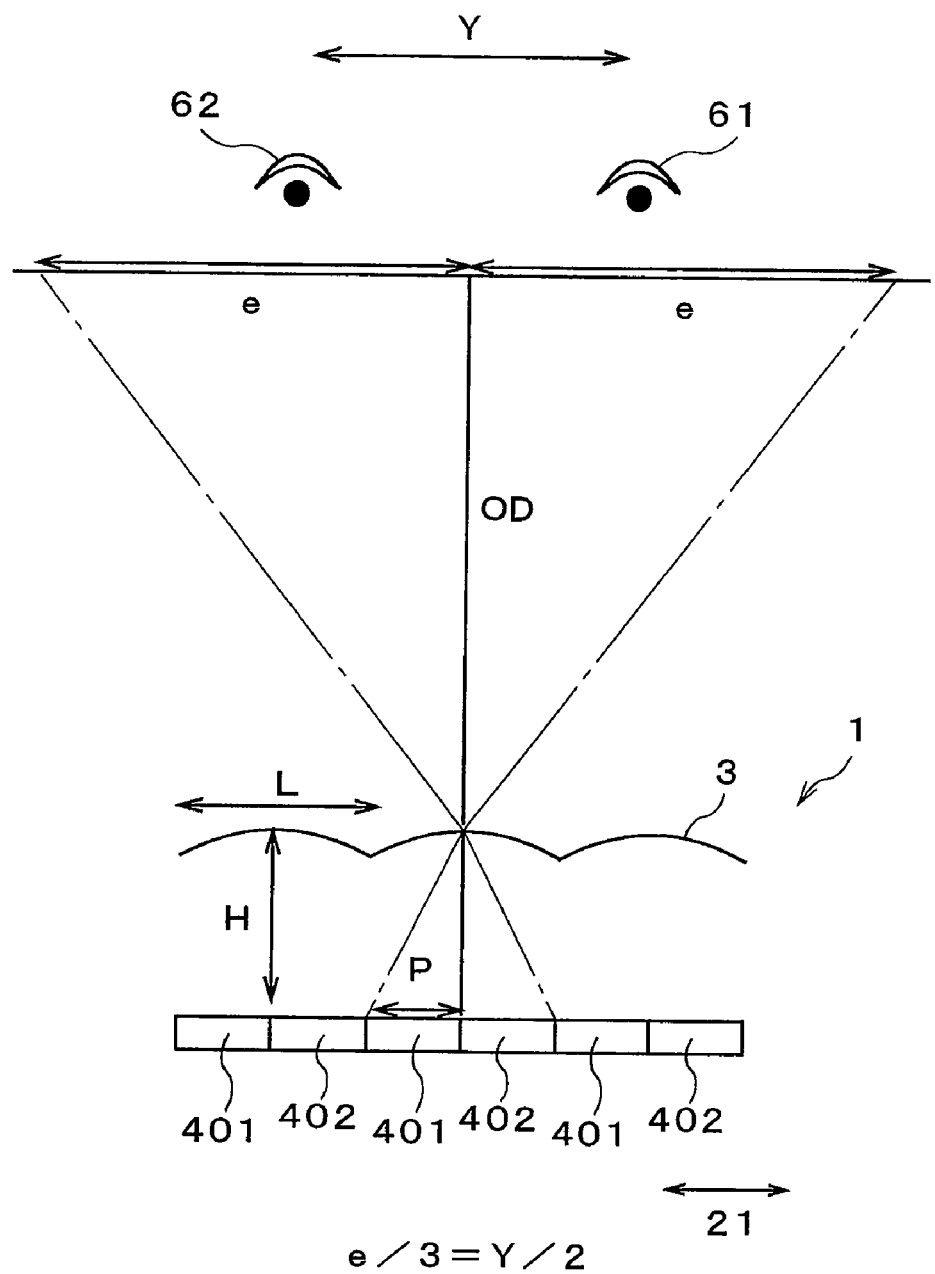
FIG. 16 is a diagram illustrating an optical model in a case of $(e/3)=(Y/2)$, i.e., $Y=(2/3) \times e$.
Figure 17:
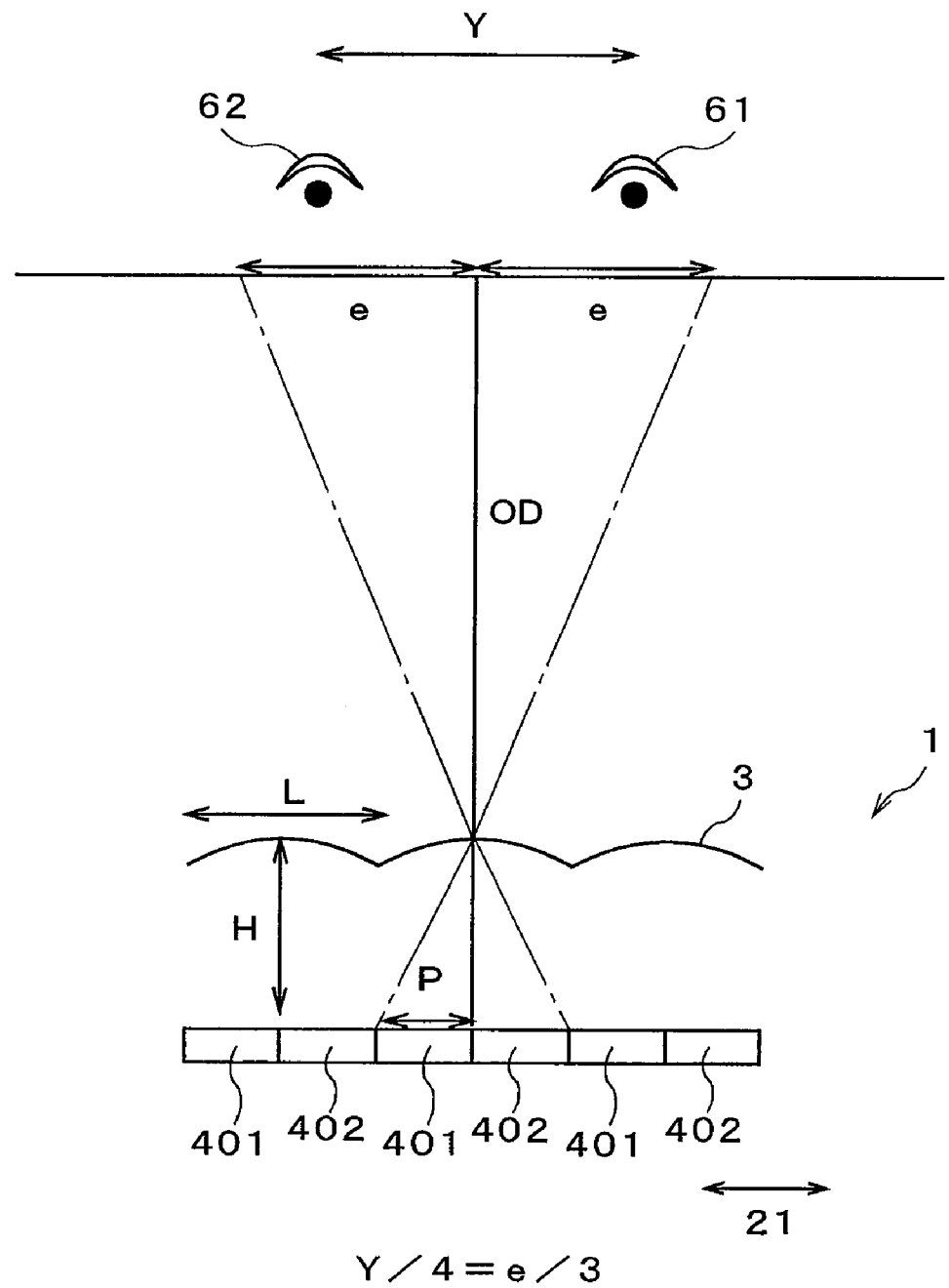
FIG. 17 is a diagram illustrating an optical model in a case of $(e/3)=(Y/4)$, i.e., $Y=(4/3) \times e$.

First, a case wherein the direction of both eyes is set to be identical to the first direction 21 will be described. FIGS. 15A and 15B are diagrams illustrating displacement of both ends, of displacements wherein when the direction of both eyes is set to be identical to a first direction 21, the observer can recognize a three-dimensional image by positioning the left eye 61 on a left-eye magnifying projection region, and the right eye 62 on a right-eye magnifying projection region, FIG. 15A illustrates a case of (Y/3)≦(e/3), i.e., 0≦Y≦e, and FIG. 15B illustrates a case of (Y/6)≦(e/3)≦(Y/3), i.e., e≦Y≦(2×e). In FIGS. 15A and 15B, on the observation surface, a region where a left-eye image is projected is represented with a heavy line, and a region where a right-eye image is projected is represented with a light line. Also, the boundary point between a left-eye magnifying projection region and a right-eye magnifying projection region is assumed to be the origin O. FIG. 16 is a diagram illustrating an optical model in a case of (e/3)=(Y/2), i.e., Y=(2/3)×e, and FIG. 17 is a diagram illustrating an optical model in a case of (e/3)=(Y/4), i.e., Y=(4/3)×e. As described above, in the event that the direction of both eyes is identical to the first direction 21, the magnifying projection region width of one pixel is e, so the magnifying projection region width of a pair of left and right pixels adjacent to each other is (2×e). Accordingly, let us say that a region of this length (2×e) is a basic unit region, and the position of a midpoint 63 between the left eye 61 and the right eye 62 to obtain stereoscopic viewing within this basic unit region will be described.

(1-1) Case of (Y/3)≦(e/3) (0≦Y≦e)

As illustrated in FIG. 15A, in a case wherein the distance E between the midpoint 63 between the left eye 61 and the right eye 62 and the origin O is (Y/2) or less, the observer can recognize a three-dimensional image. Accordingly, since the length of the displacement range of the midpoint 63 to allow the observer to recognize a three-dimensional image is (2×E), when the observer randomly positions his/her own both eyes to the observation surface of the three-dimensional image display device, stereoscopic viewing probability PR to enable stereoscopic viewing is obtained by the following Expression 48.

$$PR=(2\times E)/(2\times e)=2\times(Y/2)/(2\times e)=Y/(2\times e) \quad \text{(Expression 48)}$$

(1-2) Case of (Y/6)≦(e/3)≦(Y/3) (e≦Y≦(2×e))

As illustrated in FIG. 15B, in a case wherein the distance E between the midpoint 63 and the origin O is (e−(Y/2)) or less, the observer can recognize a three-dimensional image. Accordingly, since the length of the displacement range of the midpoint 63 to allow the observer to recognize a three-dimensional image is (2×E), the stereoscopic viewing probability PR is obtained by the following Expression 49.

$$PR=2\times E/(2\times e)=2\times(e-Y/2)/(2\times e)=1-Y/(2\times e) \quad \text{(Expression 49)}$$

As can be understood from Expressions 48 and 49, the stereoscopic viewing probability PR simply increases when the value of (e/3) is within the range of the aforementioned (1-1), reaches the maximal value when the value of (e/3) is (Y/3), and simply decreases when the value of (e/3) is within the range of the aforementioned (1-2).

Next, the value of the stereoscopic viewing probability PR is calculated regarding several values of (e/3). From Expression 48, in the case wherein (e/3) is infinite (∞), i.e., Y=0, PR becomes zero. Also, as illustrated in FIG. 16, in the case wherein (e/3)=(Y/2), i.e., Y=(2/3)×e, PR becomes one third, i.e., around 0.33. Moreover, in the case wherein (e/3)=(Y/3), i.e., Y=e, from Expression 48, PR becomes one half, i.e., 0.5. Furthermore, as illustrated in FIG. 17, in the case wherein (e/3)=(Y/4), i.e., Y=(4/3)×e, from Expression 49, PR becomes one third, i.e., around 0.33. Furthermore, in the case wherein (e/3)=(Y/6), i.e., Y=(2×e), from Expression 49, PR becomes zero.

Figure 18A:
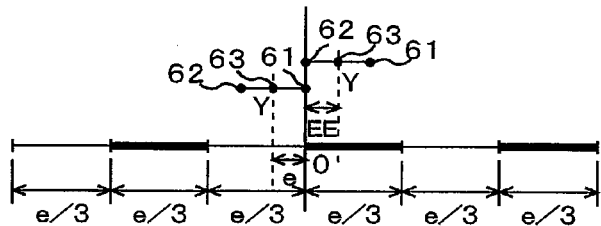
Figure 18B:
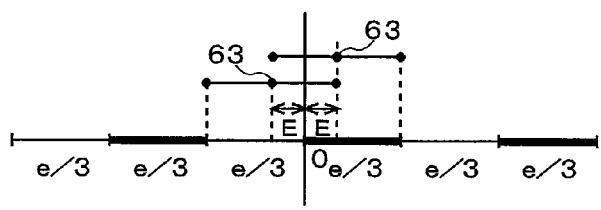
Figure 18C:
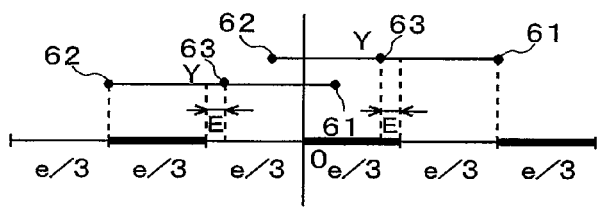
Figure 18D:
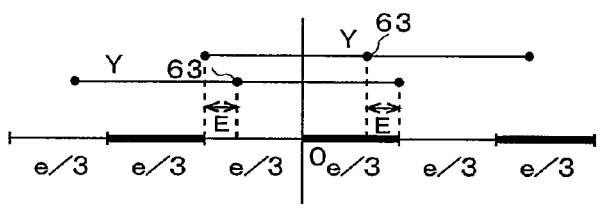
Figure 18E:
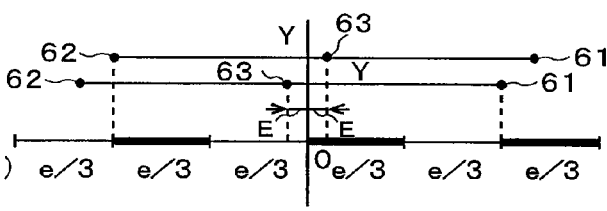
Figure 18F:
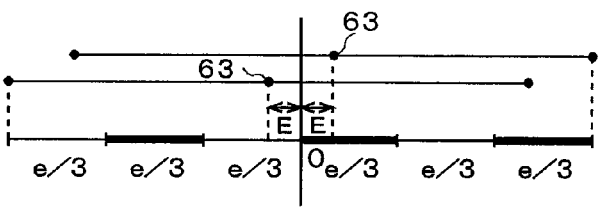

Next, stereoscopic viewing probability will be described in a case wherein the direction of both eyes is set to be identical to the second direction 22. FIGS. 18A through 18F are diagrams illustrating displacement of both ends, of displacements wherein when the direction of both eyes is set to be identical to the second direction 22, the observer can recognize a three-dimensional image by positioning the left eye 61 to a left-eye magnifying projection region, and the right eye 62 to a right-eye magnifying projection region, FIG. 18A illustrates a case of Y≦(e/3), i.e., 0≦Y≦(e/3), FIG. 18B illustrates a case of (Y/2)≦(e/3)≦Y. i.e., (e/3)≦Y≦(2/3)×e, FIG. 18C illustrates a case of (Y/3)≦(e/3)≦(Y/2), i.e., (2/3)×e≦Y≦e, FIG. 18D illustrates a case of (Y/4)≦(e/3)≦(Y/3), i.e., e≦Y≦(4/3)×e, FIG. 18E illustrates a case of (Y/5)≦(e/3)≦(Y/4), i.e., (4/3)×e≦Y≦(5/3)×e, and FIG. 18F illustrates a case of (Y/6)≦(e/3)≦(Y/5), i.e., (5/3)×e≦Y≦(2×e). In FIGS. 18A through 18F, of the observation surface, a region where a left-eye image is projected is represented with a heavy line, and a region where a right-eye image is projected is represented with a light line. Also, the boundary point between a left-eye magnifying projection region and a right-eye magnifying projection region is assumed to be the origin O.

Figure 19:
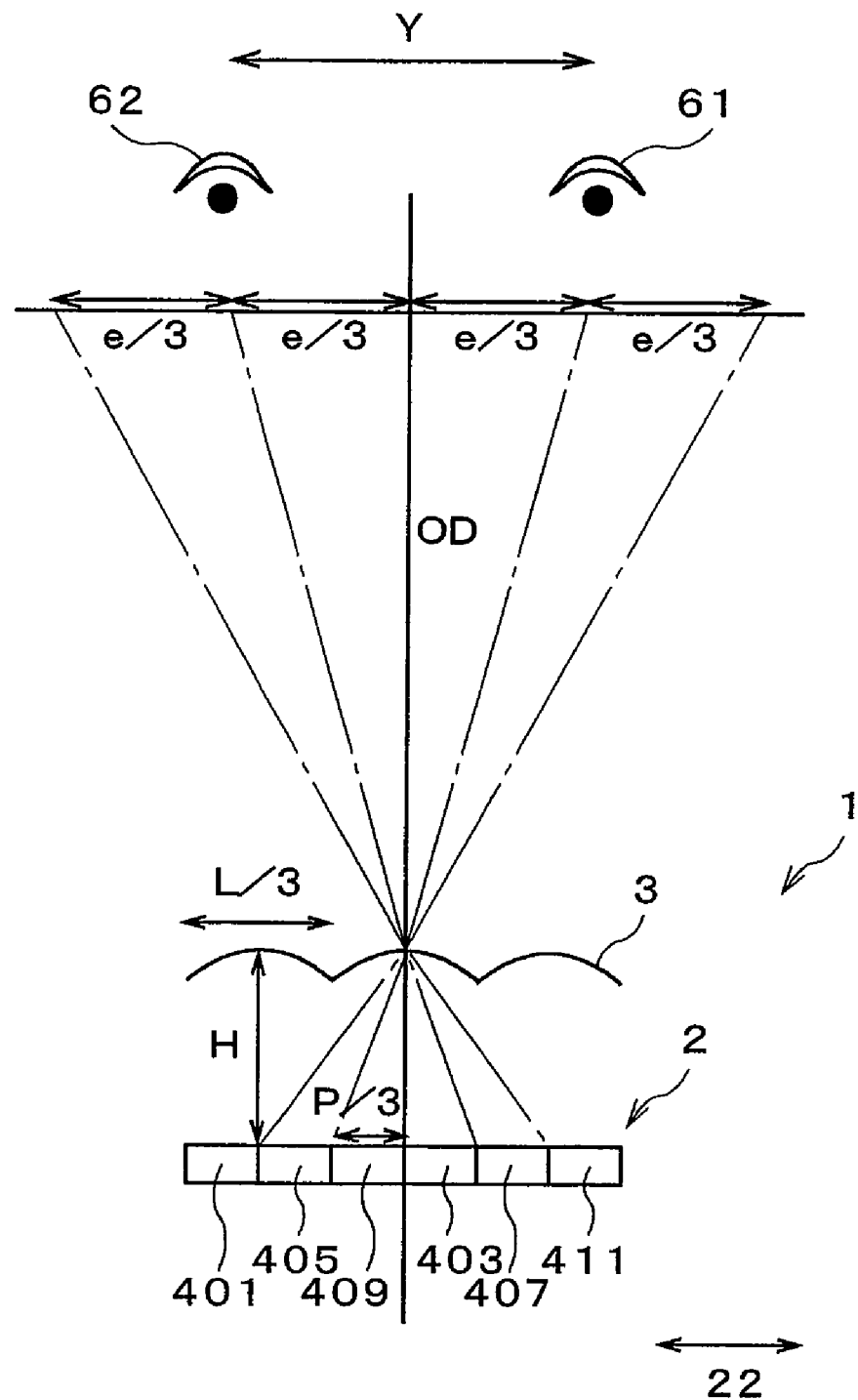
FIG. 19 is a diagram illustrating an optical model in a case of $(e/3)=(Y/2)$, i.e., $Y=(2/3) \times e$.
Figure 20:
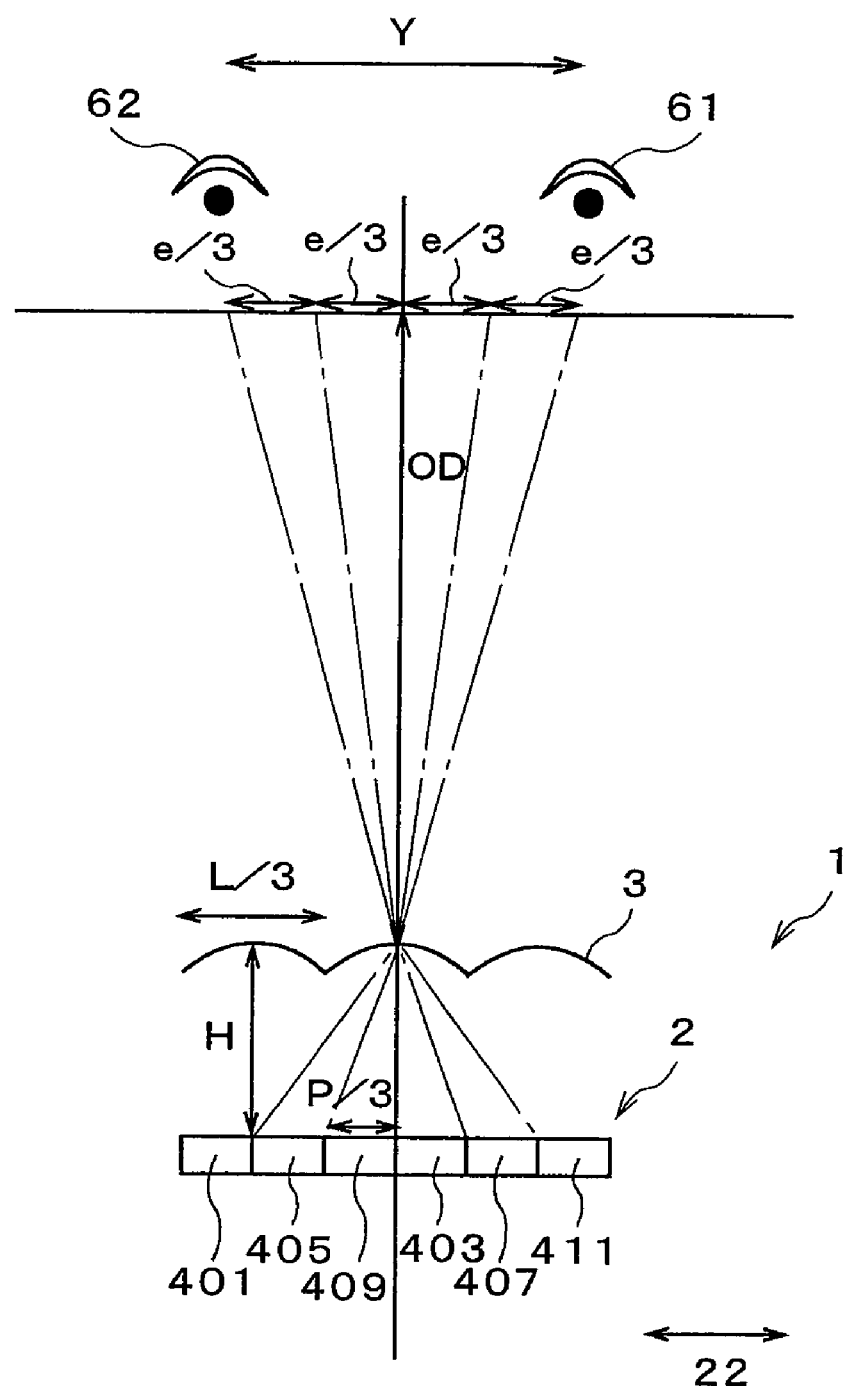
FIG. 20 is a diagram illustrating an optical model in a case of $(e/3)=(Y/4)$, i.e., $Y=(2/3) \times e$.

Also, FIG. 19 is a diagram illustrating an optical model in a case of (e/3)=(Y/2), i.e., Y=(2/3)×e, FIG. 20 is a diagram illustrating an optical model in a case of (e/3)=(Y/4), i.e., Y=(4/3)×e. As described above, in the event that the direction of both eyes is identical to the second direction 22, the magnifying projection region width of one pixel is (e/3), so the magnifying projection region width of a pair of left and right pixel adjacent to each other is (2/3)×e. Accordingly, let us say that a region of this length (2/3)×e is a basic unit region, and description will be made regarding the position of the midpoint 63 between the left eye 61 and the right eye 62 to obtain stereoscopic viewing within this basic unit region.

(2-1) Case of $Y \leqq (e/3)$ $(0 \leqq Y \leqq (e/3))$

As illustrated in FIG. 18A, in a case wherein the distance E between the midpoint 63 between the left eye 61 and the right eye 62 and the origin O is (Y/2) or less, the observer can recognize a three-dimensional image. Accordingly, since the length of the displacement range of the midpoint 63 to allow the observer to recognize a three-dimensional image is (2×E), when the observer randomly positions his/her own both eyes to the observation surface of the three-dimensional image display device, the stereoscopic viewing probability PR to enable stereoscopic viewing is obtained by the following Expression 50. Note that at this time, the number of times N for switching left and right images during the mean interpupillary distance is zero or 1.

$$PR=(2\times E)/(2\times e/3)=2\times (Y/2)/(2\times e)=(3\times Y)/(2\times e) \quad \text{(Expression 50)}$$

(2-2) Case of $(Y/2) \leqq (e/3) \leqq Y$ $((e/3) \leqq Y \leqq (2/3) \times e)$ As illustrated in FIG. 18B, in a case wherein the distance E between the midpoint 63 and the origin O is $((e/3)-(Y/2))$ or less, the observer can recognize a three-dimensional image. Accordingly, since the length of the displacement range of the midpoint 63 to allow the observer to recognize a three-dimensional image is (2×E), the stereoscopic viewing probability PR is obtained by the following Expression 51.

$$PR=(2\times E)/((2/3)\times e)=1-(3\times Y)/(2\times e) \quad \text{(Expression 51)}$$

(2-3) Case of $(Y/3) \leqq (e/3) \leqq (Y/2)$ $((2/3)\times e \leqq Y \leqq e)$

As illustrated in FIG. 18C, in a case wherein the distance E between the midpoint 63 and the outside edge of the basic unit region is $((Y/2)-(e/3))$ or more, the observer can recognize a three-dimensional image. Accordingly, since the length of the displacement range of the midpoint 63 to allow the observer to recognize a three-dimensional image is (2×E), the stereoscopic viewing probability PR is obtained by the following Expression 52. Note that at this time, the number of times N for switching left and right images during the mean interpupillary distance is 2 or 3.

$$PR=(2\times E)/((2/3)\times e)=-1+(3\times Y)/e \quad \text{(Expression 52)}$$

(2-4) Case of $(Y/4) \leqq (e/3) \leqq (Y/3)$ $((e \leqq Y \leqq (4/3) \times e)$ As illustrated in FIG. 18D, in a case wherein the distance E between the midpoint 63 and the outside edge of the basic unit region is $((2/3)\times e-(Y/2))$ or more, the observer can recognize a three-dimensional image. Accordingly, since the length of the displacement range of the midpoint 63 to allow the observer to recognize a three-dimensional image is (2×E), the stereoscopic viewing probability PR is obtained by the following Expression 53. Note that at this time, the number of times N for switching left and right images during the mean interpupillary distance is 3 or 4.

$$PR=(2\times E)/((2/3)\times e)=2-(3\times Y)/(2\times e) \quad \text{(Expression 53)}$$

(2-5) Case of $(Y/5) \leqq (e/3) \leqq (Y/4)$ $((4/3)\times e \leqq Y \leqq (5/3)\times e)$ As illustrated in FIG. 18E, in a case wherein the distance E between the midpoint 63 and the origin O is $((Y/2)-(2/3)\times e)$ or less, the observer can recognize a three-dimensional image. Accordingly, since the length of the displacement range of the midpoint 63 to allow the observer to recognize a three-dimensional image is (2×E), the stereoscopic viewing probability PR is obtained by the following Expression 54. Note that at this time, the number of times N for switching left and right images during the mean interpupillary distance is 4 or 5.

$$PR=(2\times E)/((2/3)\times e)=-2+(3\times Y)/(2\times e) \quad \text{(Expression 54)}$$

(2-6) Case of $(Y/6) \leqq (e/3) \leqq (Y/5)$ $((5/3)\times e \leqq Y \leqq (2\times e))$ As illustrated in FIG. 18F, in a case wherein the distance E between the midpoint 63 and the origin O is $(e-(Y/2))$ or less, the observer can recognize a three-dimensional image. Accordingly, since the length of the displacement range of the midpoint 63 to allow the observer to recognize a three-dimensional image is (2×E), the stereoscopic viewing probability PR is obtained by the following Expression 55. Note that at this time, the number of times N for switching left and right images during the mean interpupillary distance is 5 or 6.

$$PR=(2\times E)/((2/3)\times e)=3-(3\times Y)/(2\times e) \quad \text{(Expression 55)}$$

Expressions 50 through 55 are mutually consecutive functions, the stereoscopic viewing probability PR simply increases when the value of (e/3) is within the range of the aforementioned (2-1), (2-2), and (2-5), simply decreases when the value of (e/3) is within the range of the aforementioned (2-2), (2-4), and (2-6), reaches the maximal value when the value of (e/3) is (Y/5), (Y/3), and Y, and reaches the minimal value when the value of (e/3) is (Y/4) and (Y/2). The aforementioned Expressions 49 through 55 are summarized in Table 1.

TABLE 1

| | | | | | DIRECTION OF BOTH EYES | | |
| --- | --- | --- | --- | --- | --- | --- | --- |
| | | | FIRST DIRECTION 21 | | SECOND DIRECTION 22 | | |
| $\frac{e}{3}$ | | Y | E | PR | E | PR | N |
| $Y \leq \frac{e}{3}$ | | $0 \leq Y \leq \frac{1}{3} \times e$ | | | $\frac{1}{2} \times Y$ | $\frac{3}{2} \times \frac{Y}{e}$ | 0,1 |
| $\frac{Y}{2} \leq \frac{e}{3} \leq Y$ | | $\frac{1}{3} \times e \leq Y \leq \frac{2}{3} \times e$ | $\frac{1}{2} \times Y$ | $\frac{1}{2} \times \frac{Y}{e}$ | $\frac{1}{3} \times e - \frac{1}{2} \times Y$ | $1 - \frac{3}{2} \times \frac{Y}{e}$ | 1,2 |
| $\frac{Y}{3} \leq \frac{e}{3} \leq \frac{Y}{2}$ | | $\frac{2}{3} \times e \leq Y \leq e$ | | | $\frac{1}{2} \times Y - \frac{1}{3} \times e$ | $-1 + \frac{3}{2} \times \frac{Y}{e}$ | 2,3 |
| $\frac{Y}{4} \leq \frac{e}{3} \leq \frac{Y}{3}$ | | $e \leq Y \leq \frac{4}{3} \times e$ | | | $\frac{2}{3} \times e - \frac{1}{2} \times Y$ | $2 - \frac{3}{2} \times \frac{Y}{e}$ | 3,4 |

TABLE 1-continued

| | | DIRECTION OF BOTH EYES | | | | |
| | | FIRST DIRECTION 21 | | SECOND DIRECTION 22 | | |
| $\frac{e}{3}$ | Y | E | PR | E | PR | N |
|---|---|---|---|---|---|---|
| $\frac{Y}{5} \leq \frac{e}{3} \leq \frac{Y}{4}$ | $\frac{4}{3} \times e \leq Y \leq \frac{5}{3} \times e$ | $e - \frac{1}{2} \times Y$ | $1 - \frac{1}{2} \times \frac{Y}{e}$ | $\frac{1}{2} \times Y - \frac{2}{3} \times e$ | $-2 + \frac{3}{2} \times \frac{Y}{e}$ | 4,5 |
| $\frac{Y}{6} \leq \frac{e}{3} \leq \frac{Y}{5}$ | $\frac{5}{3} \times e \leq Y \leq 2 \times e$ | | | $e - \frac{1}{2} \times Y$ | $3 - \frac{3}{2} \times \frac{Y}{e}$ | 5,6 |

Next, the value of the stereoscopic viewing probability PR is calculated regarding several values of (e/3). From Expression 50, in the case wherein (e/3) is infinite (∞), i.e., Y=0, PR becomes zero. Also, in the case wherein (e/3)=Y, PR becomes one half, i.e., 0.5. Moreover, from Expressions 51 and 52, as illustrated in FIG. 19, in the case wherein (e/3)=(Y/2), i.e., Y=(2/3)×e, PR becomes zero. Furthermore, in the case wherein (e/3)=(Y/3), i.e., Y=e, from Expressions 52 and 53, PR becomes one half, i.e., 0.5. Furthermore, from Expressions 53 and 54, as illustrated in FIG. 20, in the case wherein (e/3)=(Y/4), i.e., Y (4/3)×e, PR becomes zero. Furthermore, from Expressions 54 and 55, in the case wherein (e/3)=(Y/5), i.e., Y=(5/3)×e, PR becomes one half, i.e., 0.5. Furthermore, from Expression 55, in the case wherein (e/3)=(Y/6), i.e., Y=(2×e), PR becomes zero.

Figure 21:
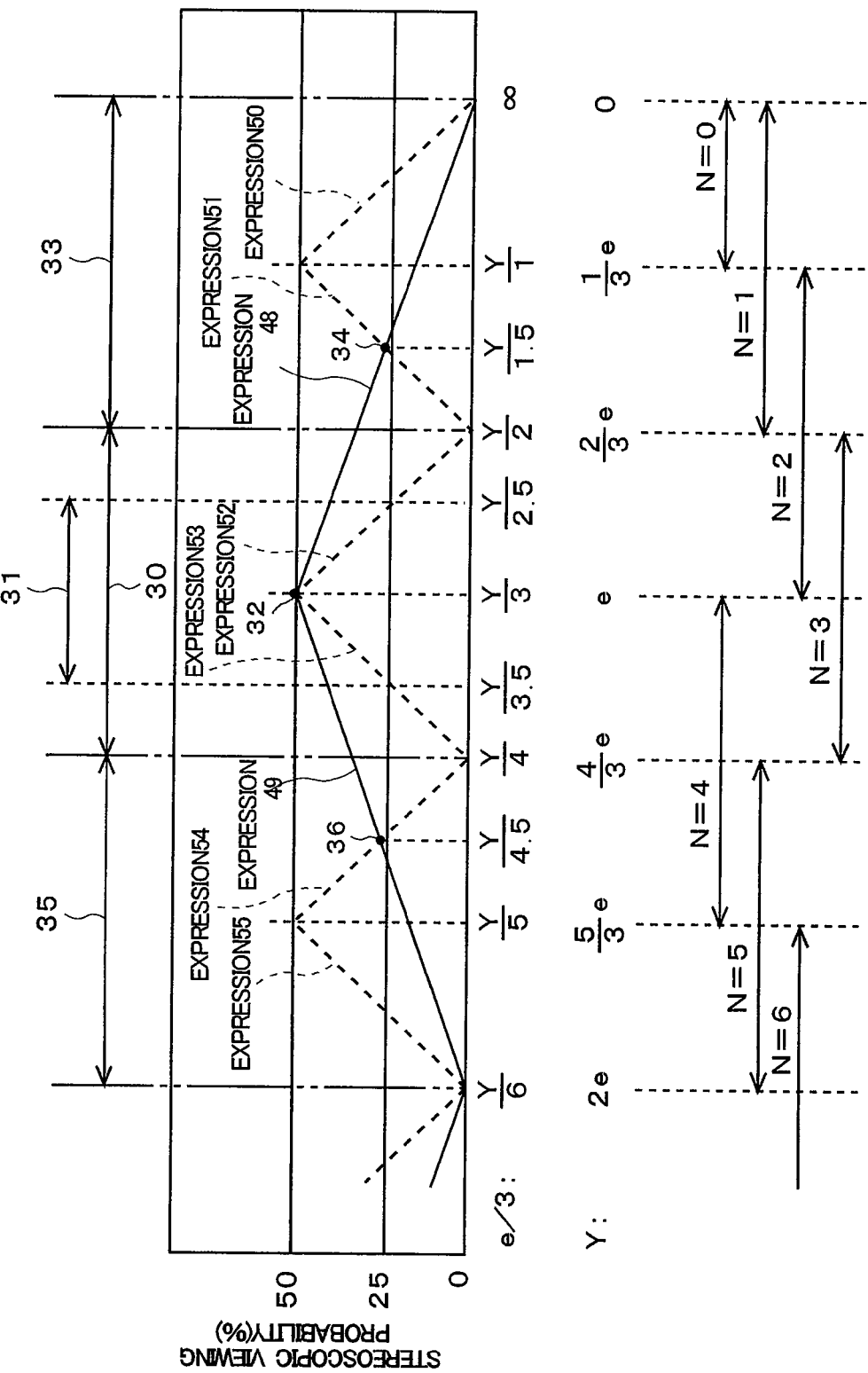
FIG. 21 is a graph-illustrating Expression 48 though Expression 55 wherein the horizontal axis represents the values of (e/3) and Y, and the vertical axis represents stereoscopic viewing probability PR.

FIG. 21 is a graph illustrating Expression 48 through Expression 55 wherein the horizontal axis represents the values of (e/3) and Y, and the vertical axis represents stereoscopic viewing probability PR. Note that the vertical axis in FIG. 21 is in percent (%). Also, stereoscopic viewing probability when the direction of both eyes is the first direction (Expressions 48 and 49) is represented with a solid line, and stereoscopic viewing probability when the direction of both eyes is the second direction (Expressions 50 through 55) is represented with a dashed line. As can be understood from FIG. 21, the cycle of stereoscopic viewing probability when the three-dimensional image display device is disposed such that the first direction 21 is the direction of both eyes of the observer is three times faster than the cycle of stereoscopic viewing probability when the three-dimensional image display device is disposed such that the second direction 22 becomes the direction of both eyes. Note that even in a range other than (Y/6)<(e/3), similar periodicity is recognized between stereoscopic viewing probability and the value of (e/3).

In other words, as illustrated in FIG. 21, as long as the cycle (e/3) of the magnifying projection region of the pixels in the second direction 22 satisfies the following Expression 56, even if the direction of both eyes is either the first direction 21 or the second direction 22, the observer can recognize a three-dimensional image with probability greater than zero. Note that the following Expression 56 is the same expression as Expression 43.

$$e/3 \neq Y/(2 \times j) \quad \text{(Expression 56)}$$

Also, if the value of (e/3) satisfies the following Expression 57, the value of (e/3) is included in a region 31 illustrated in FIG. 21. Note that the following Expression 57 is the same expression as Expression 44. Consequently, even if the direction of both eyes is set to either the first direction 21 or the second direction 22, high stereoscopic viewing probability can be obtained. That is to say, from Expression 48 and Expression 49, the stereoscopic viewing probability PR in the case wherein the direction of both eyes is set to the first direction 21 becomes 42 through 50%. On the other hand, from Expression 52 and Expression 53, the stereoscopic viewing probability PR in the case wherein the direction of both eyes is set to the second direction 22 becomes 25 through 50%. With the present embodiment, the value of (e/3) satisfies the following Expression 58, for example.

$$\frac{Y}{3 \times (2 \times k - 1) + \frac{1}{2}} < \frac{e}{3} < \frac{Y}{3 \times (2 \times k - 1) - \frac{1}{2}} \quad \text{(Expression 57)}$$

$$\frac{Y}{3.5} < \frac{e}{3} < \frac{Y}{2.5} \quad \text{(Expression 58)}$$

More preferably, as illustrated in FIG. 21, the value of (e/3) satisfies the following Expression 59. Note that with the following Expression 59, if k=1, (e/3)=(Y/3), i.e., Y becomes equal to e. This is equivalent to an intersecting point 32 illustrated in FIG. 21. In this case, even if the direction of both eyes is set to either the first direction 21 or the second direction 22, the stereoscopic viewing probability PR becomes 50%, whereby the observer can obtain the maximal visibility of three-dimensional images.

$$\frac{e}{3} = \frac{Y}{3 \times (2 \times k - 1)} \quad \text{(Expression 59)}$$

Note that the smaller the value of (e/3) as to the mean interpupillary distance Y, the more the number of times for switching left and right images during the mean interpupillary distance increases. Accordingly, even with the same stereoscopic viewing probability, the array cycle between a range for enabling stereoscopic viewing and a range for disabling stereoscopic viewing becomes short, leading to the difficulty for the observer to position his/her both eyes to a region for enabling stereoscopic viewing. Accordingly, satisfying Y/6<e/3 is preferable. Thus, the number of times N for switching left and right images during the mean interpupillary distance becomes 6 or less. Note that this range is equivalent to a range 35 (Y/6<e/3<Y/4), range 30 (Y/4<e/3<Y/2), and range 33 (Y/2<e/3) in FIG. 21.

According to the present embodiment, since the cycle of the magnifying projection region is set so as to satisfy Expression 56, even if the direction of both eyes is either the first direction 21 or the second direction 22, the observer can recognize three-dimensional images. In particular, if the cycle of the magnifying projection region is set so as to satisfy Expression 57, the visibility of three-dimensional images more improves, if the cycle is set so as to satisfy Expression 59, the visibility further improves.

Also, with the three-dimensional image display device according to the present embodiment, since a fly eye lens is employed as an optical unit, blacked striping due to a barrier does not occur, and light loss is small, as compared with the case of employing a parallax barrier.

Further, the three-dimensional image display device according to the present embodiment can be applied to portable equipment such as handheld phones appropriately, and can display good three-dimensional images. In the case wherein the three-dimensional image display device according to the present embodiment is applied to portable equipment, different from the case of applying this to a large-sized display device, since the observer can adjust the positional relation between his/her both eyes and a display screen arbitrarily, the most appropriate visible region can be found immediately.

Note that as shown in Expressions 16 and 17, the distance H between the apex of the lens and one pixel is usually set the same as the focal point f of the lens, but a different value may be set. In this case, while the magnifying projection width e of one pixel exhibits a great value due to blur, the value of the magnifying projection width e should be handled as the width of a blurred image to apply the present invention. The image of a non-display region is also blurred by blurring the image of one pixel, thereby preventing striping due to the non-display region from occurring.

Also, with the present embodiment, while a transmissive liquid crystal panel has been employed as the display panel, the display panel is not restricted to this, a reflective liquid crystal display panel, or a semi-transmissive liquid crystal display panel of which each pixel includes a transmissive region and a reflective region may be employed. Also, as for a method for driving a liquid crystal display panel, the active matrix method such as the TFT (Thin Film Transistor) method, and TFD (Thin Film Diode) method, or the passive matrix method such as the STN (Super Twisted Nematic liquid crystal) method may be employed. Further, as for a display panel, display panels other than liquid crystal display panels, e.g., an organic electro-luminescence display panel, plasma display panel, CRT (Cathode-Ray Tube) display panel, LED (Light Emitting Diode) display panel, field emission display panel, or PALC (Plasma Address Liquid Crystal) may be employed.

Moreover, while the aforementioned description is in the case of using dual viewpoints, the present invention does not restrict viewpoints to this, and may be applied to a plurality of viewpoints with three or more viewpoints as well.

Furthermore, the foregoing description has dealt with the case where the display pixels are made up of pixels with three primary colors of RGB arrayed in a stripe shape. However, the present invention is not limited thereto, and may be similarly applied to the cases with any number of colors other than three, that is, two colors or more than four colors.

Furthermore, the three-dimensional image display device according to the present embodiment can be applied to not only handheld phones, but also portable terminal devices such as portable terminals, PDAs, game devices, digital cameras, and digital video cameras.

Modification of First Embodiment

Figures 22A, 22B:
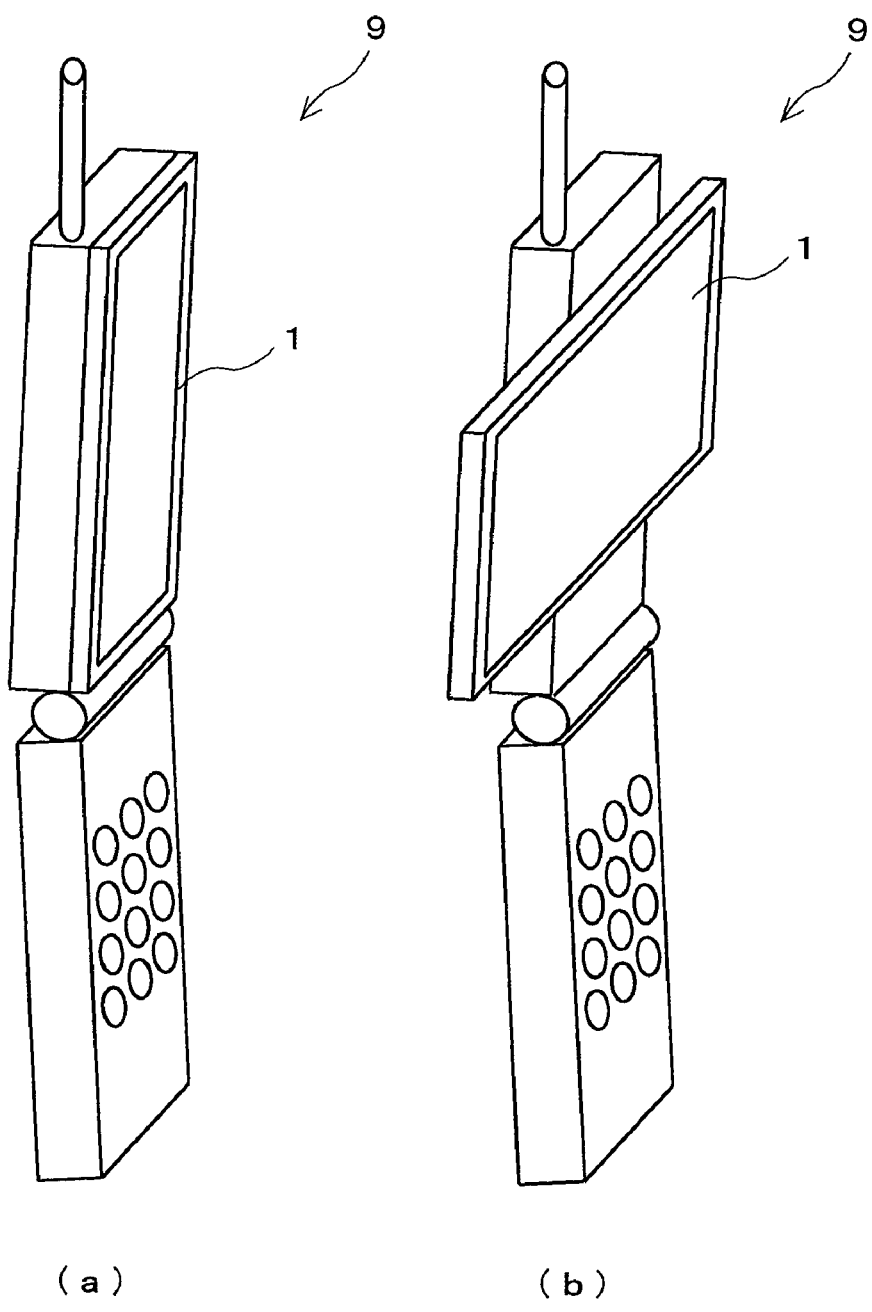
FIGS. 22A and 22B are perspective views illustrating a handheld phone according to a modification of the first embodiment.

Next, a modification of the first embodiment will be described. FIGS. 22A and 22B are perspective views illustrating a handheld phone according to a modification of the first embodiment, wherein FIG. 22A illustrates a case of using a three-dimensional image display device on a normal arrangement, and FIG. 22B illustrates a case of rotating the three-dimensional image display device by 90° prior to use. As illustrated in FIGS. 22A and 22B, with the handheld phone, a three-dimensional image display device 1 is mounted so as to be rotated. The three-dimensional image display device 1 can be disposed on a normal position (hereinafter, referred to as "vertical array") such as illustrated in FIG. 22A, and also can be disposed on a position rotated by 90° from the normal position (hereinafter, referred to as "horizontal array") such as illustrated in FIG. 22B. For example, the three-dimensional image display device 1 is connected to a main body of a handheld phone 9 by means of a rotational connecting member (not illustrated) which can be rotated while maintaining electrical connection. In addition, the handheld phone according to the present modification includes detecting unit (not illustrated) for detecting the array direction of the three-dimensional image display device 1, and switches display images based on the array direction such that the observer can visually recognize three-dimensional images.

Figure 23:
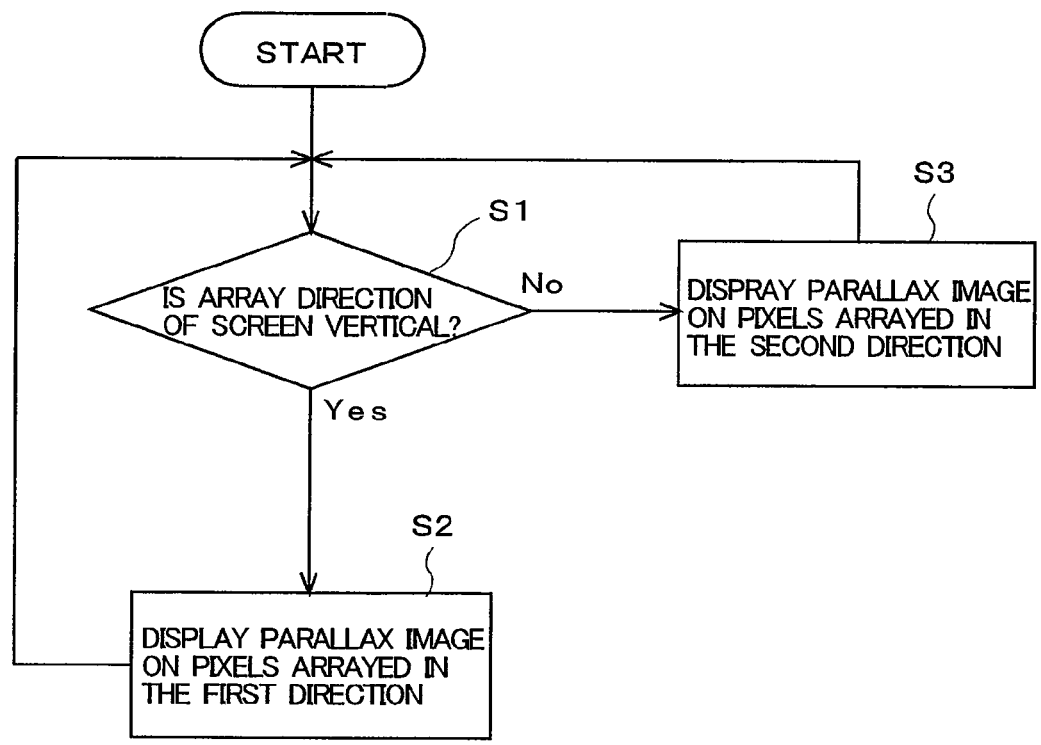
FIG. 23 is a flowchart illustrating operation for switching display images based on arrangement direction of the three-dimensional image display device according to the present modification.

Next, operation of the handheld phone according to the present modification will be described. FIG. 23 is a flowchart illustrating operation for switching display images based on array direction of the three-dimensional image display device according to the present modification. With the present modification, let us say that the direction of both eyes is the second direction 22 in the case of disposing the three-dimensional image display device vertically, and the first direction 21 in the case of disposing the three-dimensional image display device horizontally for the sake of explanation.

In the initial state, the user (observer) turns the power of the handheld phone off. Subsequently, as illustrated in Step S1 of FIG. 23, upon the power of the handheld phone turning on, the handheld phone detects the array direction of the three-dimensional image display device 1.

Subsequently, upon detection of vertical array, as illustrated in Step S2, the handheld phone displays left and right parallax images on the pixels arrayed in the second direction for each display unit of the three-dimensional image display device. Thus, the user can recognize three-dimensional images on the vertical array, following which the flow returns to Step S1.

On the other hand, in the event that the three-dimensional image display device is rotated and set to horizontal array, the handheld phone detects that the three-dimensional image display device 1 is set to horizontal array in Step S1. In this case, the flow proceeds to Step S3, the three-dimensional image display device 1 displays left and right parallax images on the pixels arrayed in the first direction for each display unit. Thus, the user can recognize three-dimensional images on the horizontal array, following which the flow returns to Step S1.

As described above, while the three-dimensional image display device displays parallax images on the pixels arrayed in the second direction at the time of vertical array, the same information should be displayed on the pixels arrayed in the first direction. Thus, even in the case of changing the observation angle in the vertical direction, a wide view angle can be obtained. Also, different information may be displayed on the pixels arrayed in the first direction. Thus, different information can be obtained by simply changing the observation angle for observing the three-dimensional image display device to the vertical direction. This is the same at the time of horizontal array.

As described above, with the present modification, the direction for displaying images can be switched by rotating the three-dimensional image display device alone without rotating the handheld phone itself. Also, the direction for displaying images can be switched by the detecting unit to detect the direction of the three-dimensional image display device in collaboration with the direction of the three-dimensional image display device.

Second Embodiment

Figure 24:
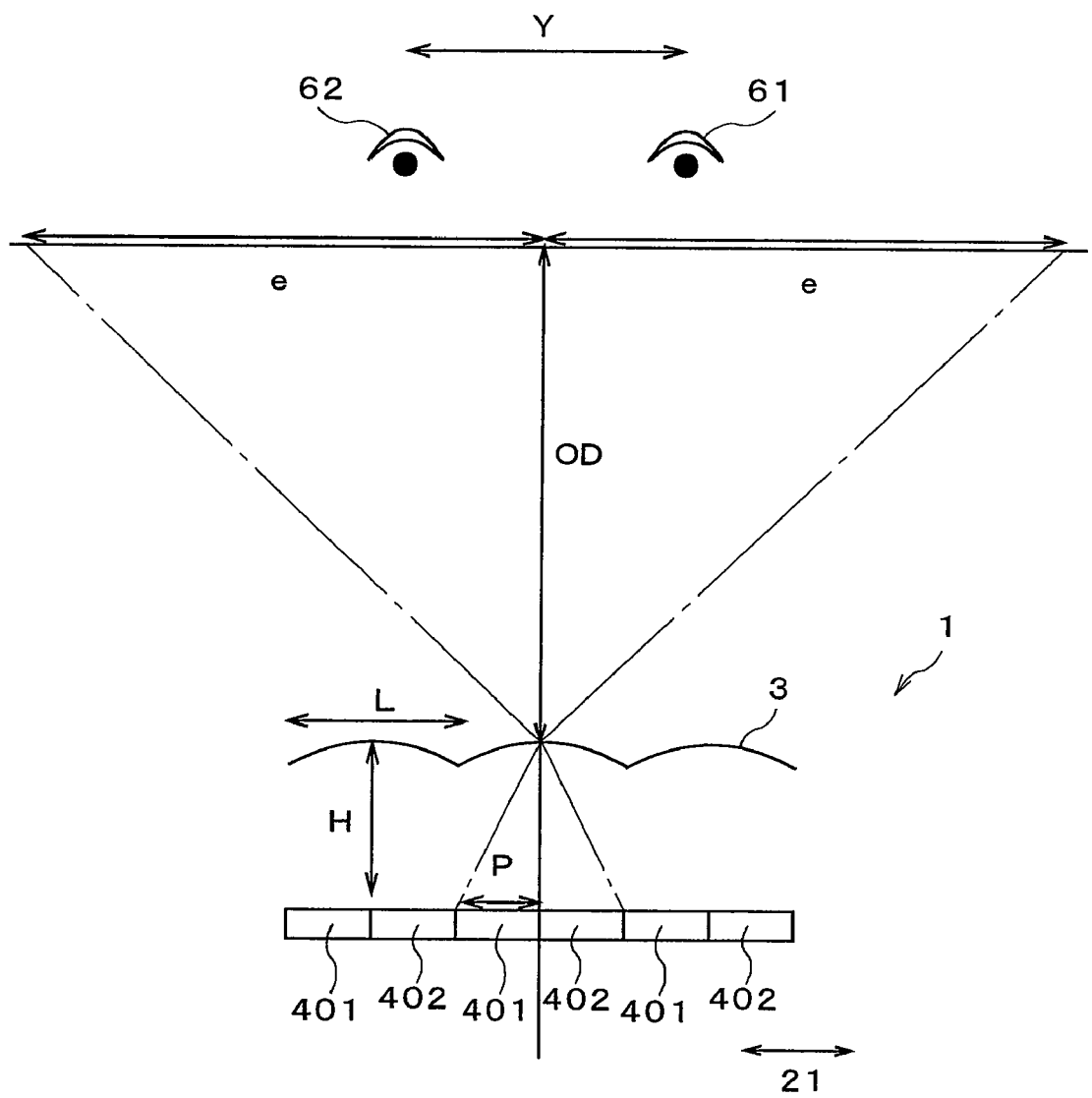
FIG. 24 is an optical model diagram in a case wherein a three-dimensional image display device according to a second embodiment of the present invention is disposed such that a first direction is the direction of both eyes of the observer.
Figure 25:
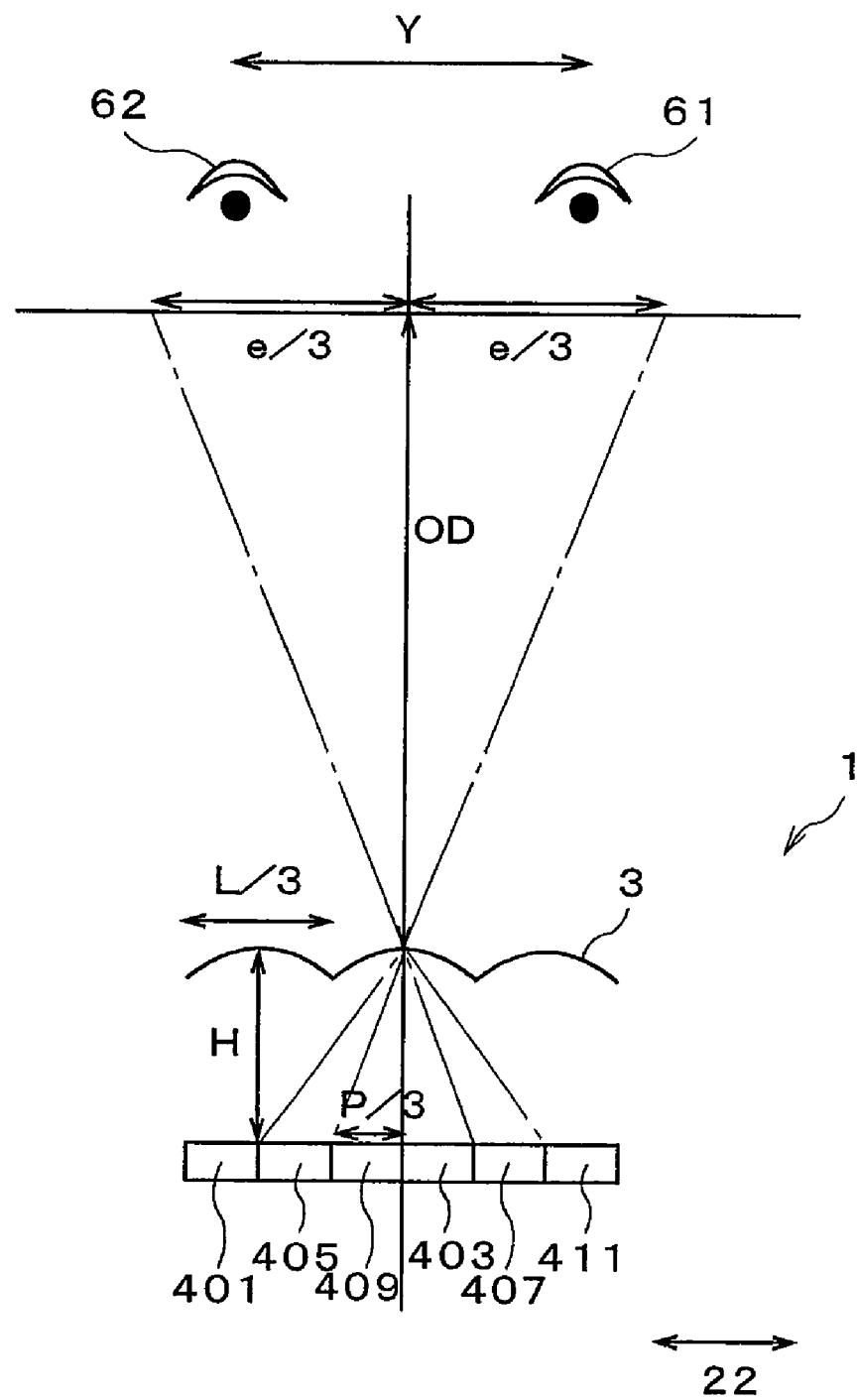
FIG. 25 is an optical model diagram in a case wherein the three-dimensional image display device according to the second embodiment of the present invention is disposed such that a second direction is the direction of both eyes of the observer.

Next, a second embodiment of the present invention will be described. FIG. 24 is an optical model diagram in a case wherein a three-dimensional image display device according to a second embodiment of the present invention is disposed such that the aforementioned first direction becomes the direction of both eyes of an observer. FIG. 25 is an optical model diagram in a case wherein the three-dimensional image display device according to the second embodiment of the present invention is disposed such that the aforementioned second direction is the direction of both eyes of the observer. The present embodiment is in a case wherein lens' power of magnifying pixels is increased compared with that in the first embodiment, the value of (e/3) is included in the range 33 in FIG. 21. In other words, the value of (e/3) satisfies the following Expression 60. In this case, in the event that the three-dimensional image display device is disposed such that the second direction 22 becomes the direction of both eyes, the number of times N for switching left and right images during the mean interpupillary distance becomes zero or 1 depending on the position of both eyes, in the event that both eyes are positioned so as to recognize three-dimensional images, N becomes 1.

$$(Y/2) < (e/3) \tag{Expression 60}$$

Also, as illustrated in FIG. 21, if the value of (e/3) is set to be identical to the intersecting point 34 between Expression 48 and Expression 51, the stereoscopic viewing probability PR in the case wherein the direction of both eyes is set to the first direction 21 is identical to the stereoscopic viewing probability PR in the case wherein the direction of both eyes is set to the second direction 22, whereby the same visibility on both vertical array and horizontal array can be obtained. From Expression 48 and Expression 51, the value of (e/3) at the intersecting point 34 becomes the value shown in the following Expression 61, and the stereoscopic viewing probability PR at that time becomes 25% in either the case wherein the direction of both eyes is the first direction 21 or the case wherein the direction of both eyes is the second direction 22. Accordingly, the value of (e/3) is preferably set to the value shown in the following Expression 61. In general, note that the following Expression 61 can be represented such as shown in the following Expression 62. The following Expression 61 is the case of k=1 in the following Expression 62. Other than the aforementioned configuration, operation and advantages, the present embodiment is the same as the first embodiment.

$$(e/3) = (Y/1.5) \tag{Expression 61}$$

$$\frac{e}{3} = \frac{Y}{3 \times (2 \times k - 1) - \frac{3}{2}} \tag{Expression 62}$$

Third Embodiment

Figure 26:
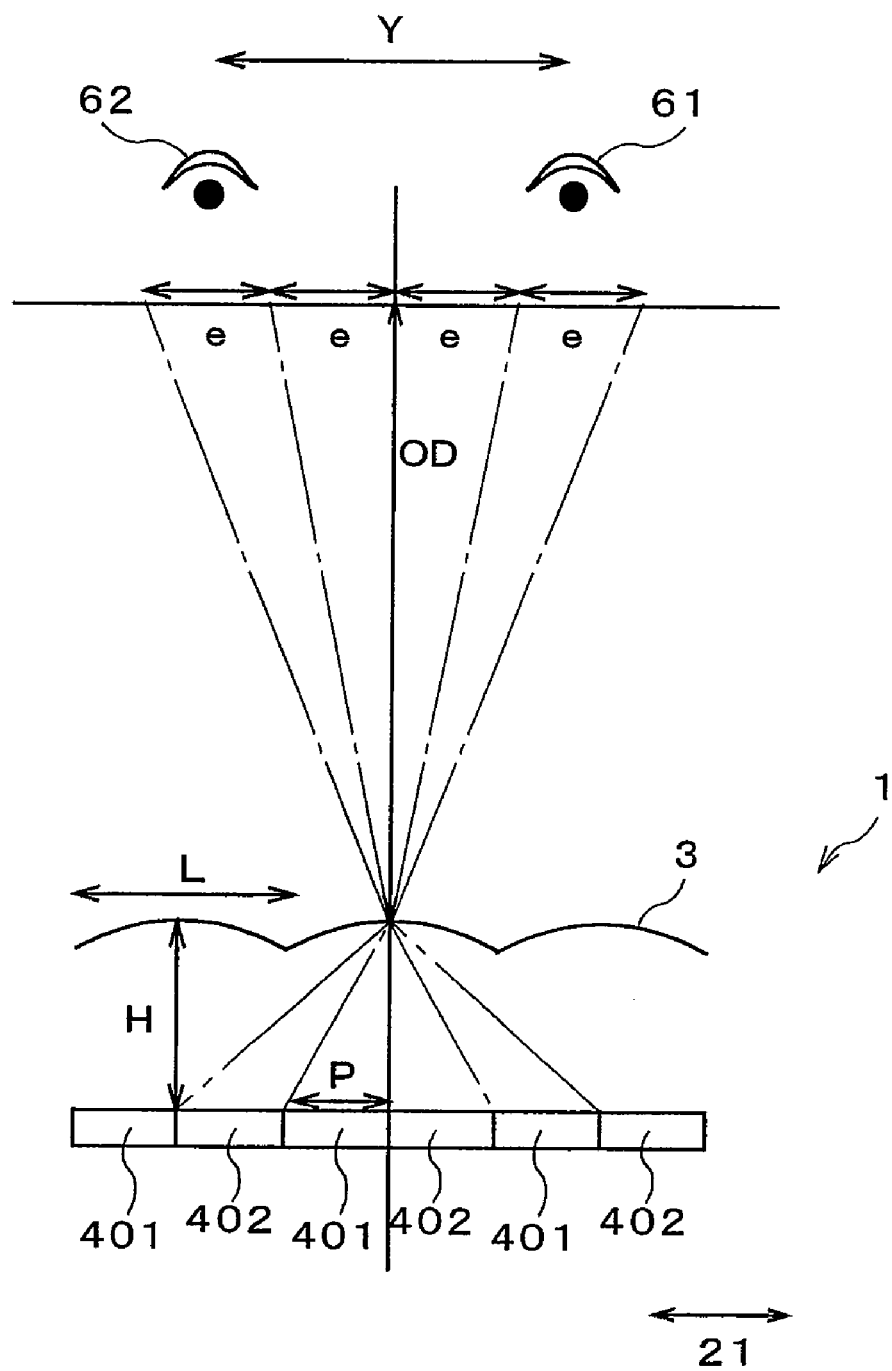
FIG. 26 is an optical model diagram in a case wherein a three-dimensional image display device according to a third embodiment of the present invention is disposed such that a first direction is the direction of both eyes of the observer.
Figure 27:
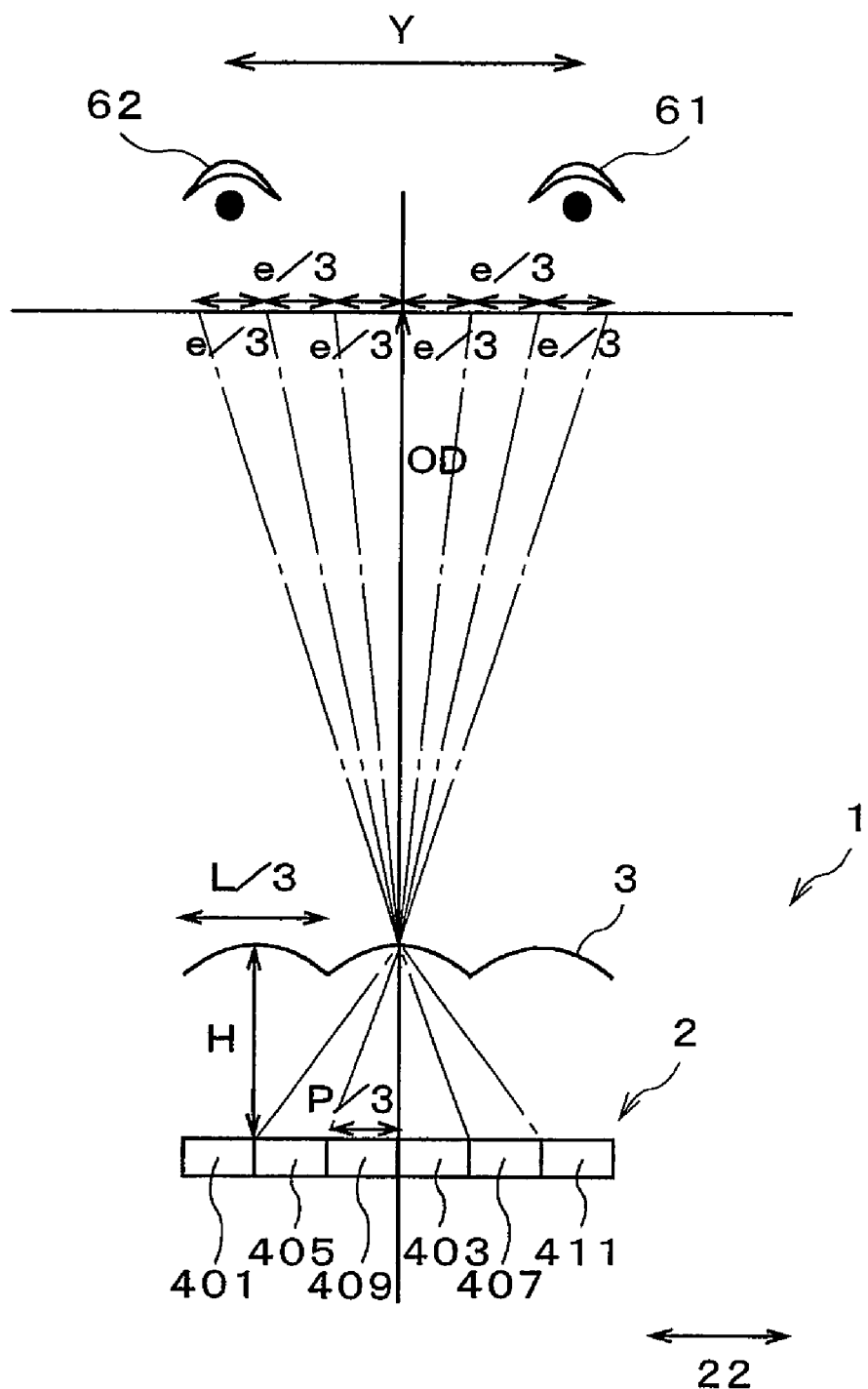
FIG. 27 is an optical model diagram in a case wherein the three-dimensional image display device according to the third embodiment of the present invention is disposed such that a second direction is the direction of both eyes of the observer.

Next, a third embodiment of the present invention will be described. FIG. 26 is an optical model diagram in a case wherein a three-dimensional image display device according to a third embodiment of the present invention is disposed such that the aforementioned first direction becomes the direction of both eyes of an observer, FIG. 27 is an optical model diagram in a case wherein the three-dimensional image display device according to the third embodiment of the present invention is disposed such that the aforementioned second direction is the direction of both eyes of the observer. The present embodiment is in a case wherein magnifying power for pixels is decreased compared with that in the first embodiment, the pixel magnifying projection width e/3 in the second direction 22 satisfies the following Expression 63 as to the mean interpupillary distance. This is equivalent to the range 35 illustrated in FIG. 21. In this case, in the event that the three-dimensional image display device is disposed such that the second direction 22 becomes the direction of both eyes, the number of times N for switching left and right images during the mean interpupillary distance of the observers becomes 4 through 6 depending on the position of both eyes, in the event that both eyes are positioned so as to recognize three-dimensional images, N becomes 5.

$$(Y/6) < (e/3) < (Y/4) \tag{Expression 63}$$

Also, as illustrated in FIG. 21, if the value of (e/3) is set to be identical to an intersecting point 36 between Expression 49 and Expression 54, the stereoscopic viewing probability PR in the case wherein the direction of both eyes is set to the first direction 21 is identical to the stereoscopic viewing probability PR in the case wherein the direction of both eyes is set to the second direction 22, whereby the same visibility on both vertical array and horizontal array can be obtained. From Expression 50 and Expression 55, the value of (e/3) at the intersecting point 36 becomes the value shown in the following Expression 64, and the stereoscopic viewing probability PR at that time becomes 25% in either the case wherein the direction of both eyes is the first direction 21 or the case wherein the direction of both eyes is the second direction 22. Accordingly, the value of (e/3) is preferably set to the value shown in the following Expression 64. In general, note that the following Expression 64 can be represented such as shown in the following Expression 65. The following Expression 64 is the case of k=1 in the following Expression 65. Other than the aforementioned configuration, operation and advantages, the present embodiment is the same as the first embodiment.

$$(e/3) = (Y/4.5) \tag{Expression 64}$$

$$\frac{e}{3} = \frac{Y}{3 \times (2 \times k - 1) + \frac{3}{2}} \tag{Expression 65}$$

Fourth Embodiment

Figure 28:
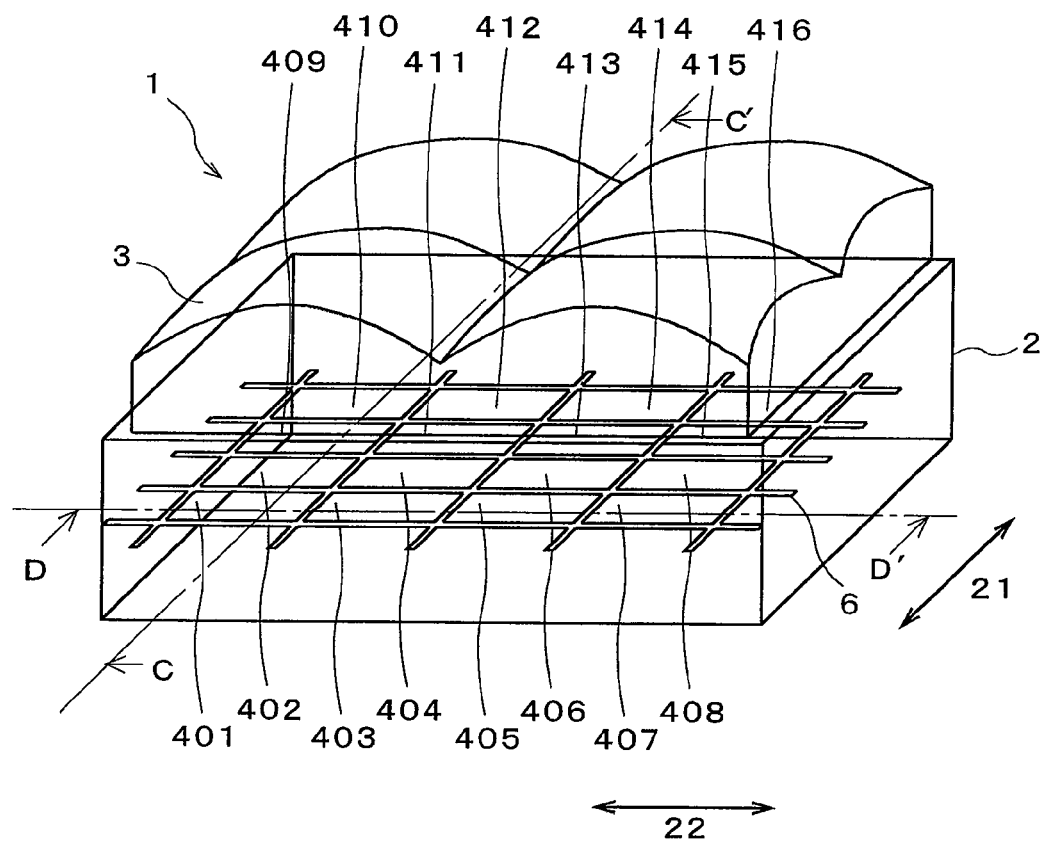
FIG. 28 is a perspective view illustrating a three-dimensional image display device according to a fourth embodiment of the present invention.
Figure 29:
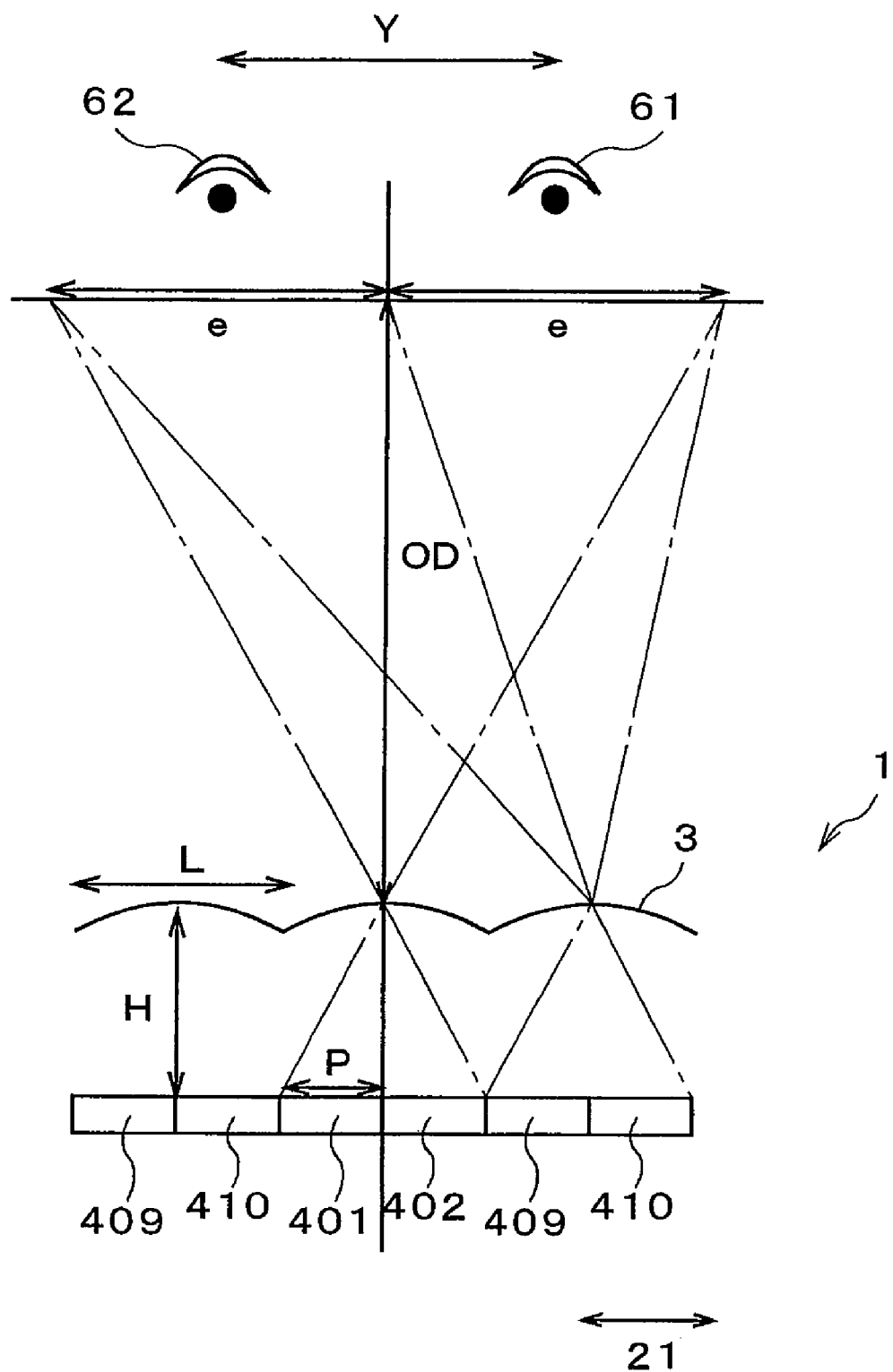
FIG. 29 is an optical model diagram illustrating a cross-section taken along line C-C' illustrated in FIG. 28.
Figure 30:
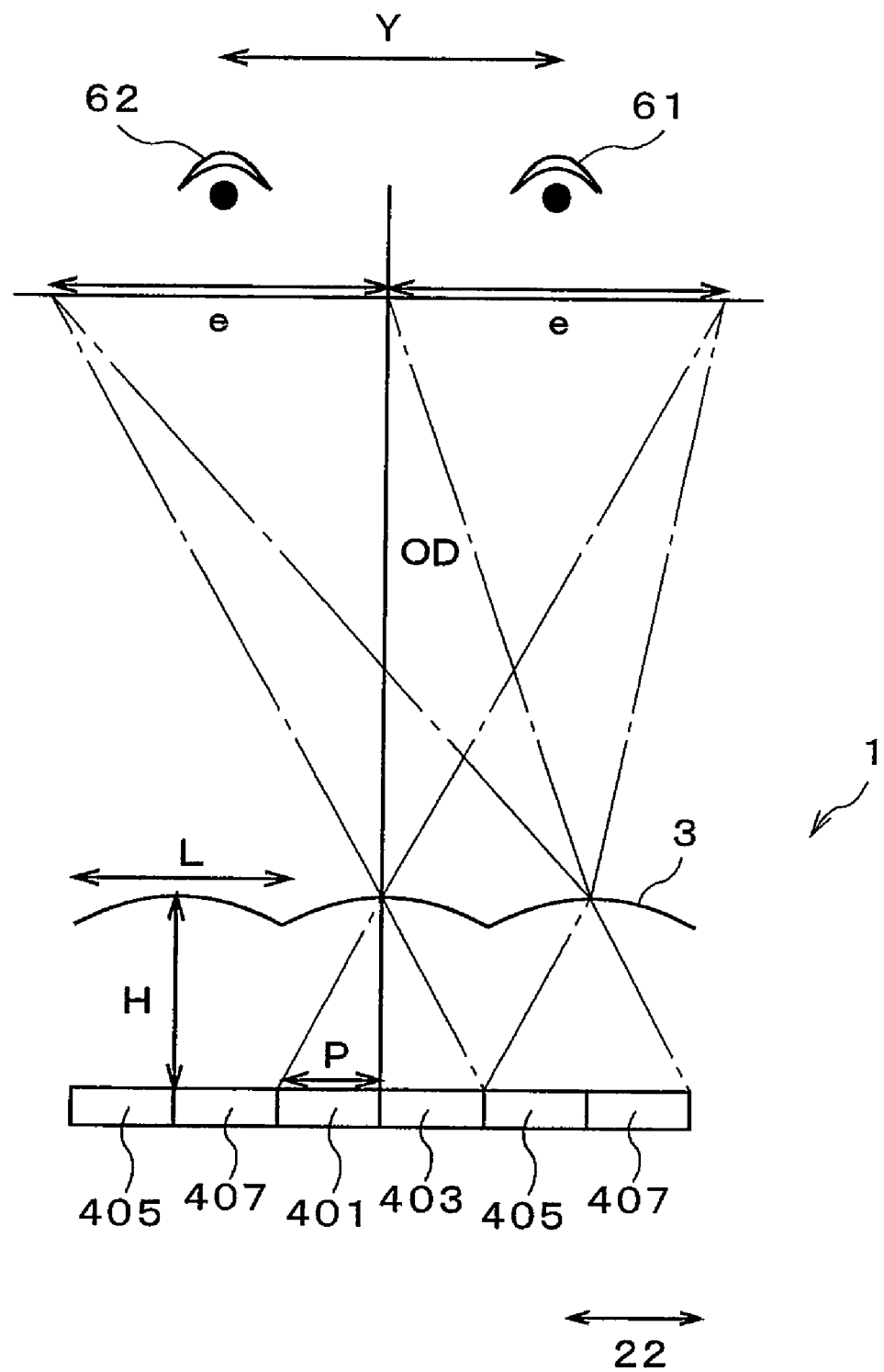
FIG. 30 is an optical model diagram illustrating a cross-section taken along line D-D' illustrated in FIG. 28.

Next, a fourth embodiment of the present invention will be described. FIG. 28 is a perspective view illustrating a three-dimensional image display device according to a fourth embodiment of the present invention, FIG. 29 is an optical model diagram illustrating a cross-section taken along line C-C' illustrated in FIG. 28, and FIG. 30 is an optical model diagram illustrating a cross-section taken along line D-D' illustrated in FIG. 28. As illustrated in FIG. 28, with the fourth embodiment, the pixels on the display panel 2 are arrayed in square formation wherein the pitch in the first direction 21 and the pitch in the second direction 22 are equal to each other. The pixels for left and right dual viewpoint in the first direction 21 and the pixels for left and right dual viewpoint in the second direction 22 are disposed in a (2×2) matrix for each display unit, thereby making up a pixel matrix. The shape of pixels is a square, and accordingly, the shape of the pixel matrix is also a square. Further, a plurality of pixel matrixes are arrayed in a matrix on the display panel 2.

Also, with the fly eye lens 3, one lens element thereof is disposed so as to correspond to one pixel matrix made up of (2×2) pixels. In other words, lens elements are arrayed in a matrix. In an illustrated example, a pixel matrix made up of the red pixel A401, red pixel B402, red pixel C403, and red pixel D404 corresponds to one lens element.

In the same way, a pixel matrix made up of the green pixel A405, green pixel B406, green pixel C407, and green pixel D408 corresponds to one lens element, a pixel matrix made up of the blue pixel A409, blue pixel B410, blue pixel C411, and blue pixel D412 corresponds to one lens element, and a pixel matrix made up of the cyan pixel A413, cyan pixel B414, cyan pixel C415, and cyan pixel D416 corresponds to one lens element. Since the shape of the pixels is a square, the lens pitch in the first direction is identical to the lens pitch in the second direction. Four pixels belonging to one pixel matrix are the same colored pixels, the color of pixels mutually differ between adjacent pixel matrixes.

Four pixel matrixes arrayed in a (2×2) matrix, i.e., 16 pixels arrayed in a (4×4) matrix, make up one display unit. Accordingly, four-colored pixels are provided for each display unit, in addition to three primary colors, red, blue, and green, cyan (this has different spectrum from green) pixels are provided.

Also, as illustrated in FIG. 29 and FIG. 30, the observation distance OD, pixel magnifying projection width e in the observation distance OD, distance H between the apex of the lens and the pixel, and pixel pitch P in the first direction are configured so as to satisfy Expressions 10 through 13. Further, the pixel pitch P in the second direction 22 is identical to the pixel pitch in the first direction. Other than the aforementioned configuration, operation and advantages, the present embodiment is the same as the first embodiment.

With the present embodiment, since the pixel pitch in the first direction 21 is identical to the pixel pitch in the second direction, the other parameters can be set to the same value as well. Accordingly, the magnifying projection width of one pixel in the same observation surface can be set to the same value in the first and second directions. Consequently, even in the event of disposing the three-dimensional image display device in either direction, visibility of three-dimensional images can be improved. Also, each pixel matrix is made up of a plurality of pixels having the same color. Thus, the same colored consecutive region on the display panel 2 can be expanded, thereby facilitating manufacture of display panels. Other than the aforementioned advantages, the present embodiment is the same as the first embodiment.

While the foregoing description has dealt with the configuration with pixels in four colors, or red, blue, green, and cyan, the present invention is not limited thereto, and may be similarly applied to the cases with any four colors other than these. Furthermore, any number of colors other than four is also applicable as well.

Modification of Fourth Embodiment

Figure 31:
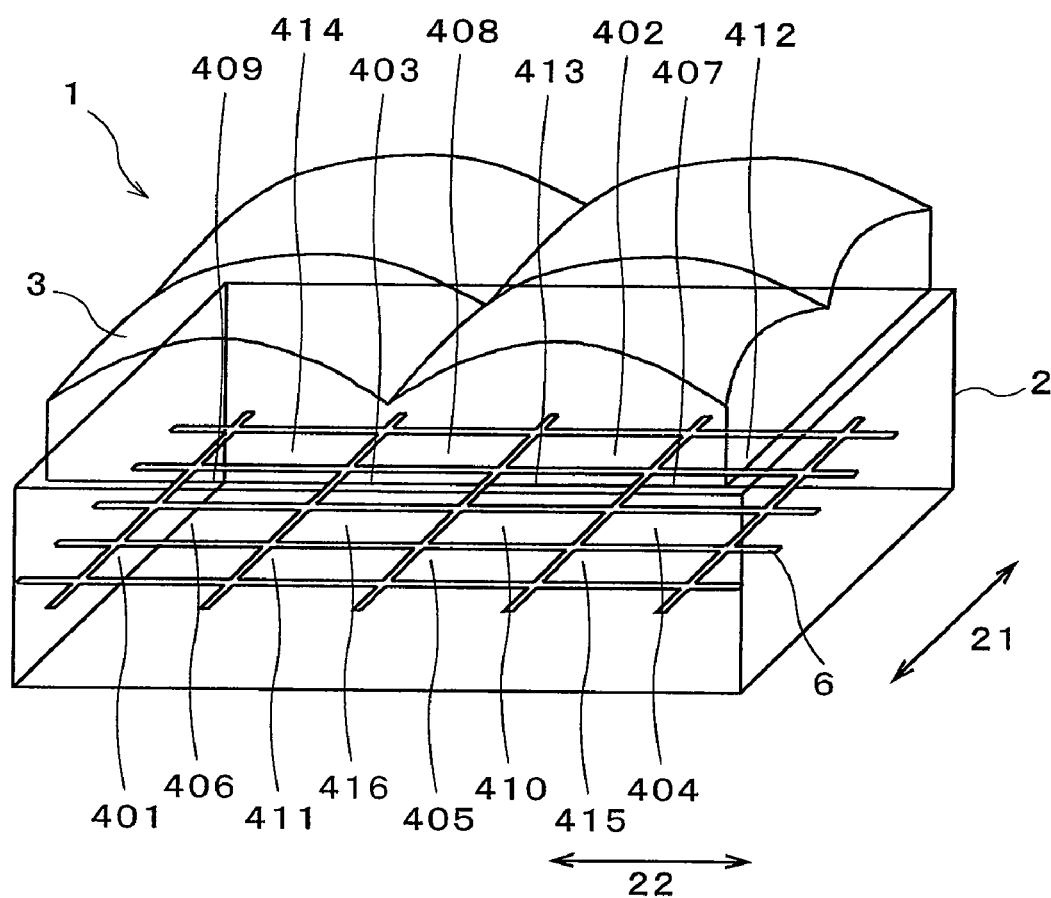
FIG. 31 is a perspective view illustrating a three-dimensional image display device according to a modification of the fourth embodiment of the present invention.

Next, a modification of the present fourth embodiment is described. While a pixel matrix corresponding to one lens element is configured of pixels having the same color in the fourth embodiment, a pixel matrix is configured of pixels having a different color in the present modification. FIG. 31 is a perspective view illustrating a three-dimensional image display device according to the present modification. As illustrated in FIG. 31, with the present modification, for example, one pixel matrix is made up of the red pixel A401, green pixel B406, blue pixel C411, and cyan pixel D416, which corresponds to one lens element. In the same way, one pixel matrix made up of the green pixel A405, blue pixel B410, cyan pixel C415, and red pixel D404, which corresponds to one lens element, one pixel matrix made up of the blue pixel A409, cyan pixel B414, red pixel C403, and green pixel D408, which corresponds to one lens element, and one pixel matrix made up of the cyan pixel A413, red pixel B402, green pixel C407, and blue pixel D412, which corresponds to one lens element. That is to say, one viewpoint is configured of different colors, and accordingly, this color array is a mosaic color array.

Accordingly, the three-dimensional image display device according to the present modification is suited for displaying images such as landscape. On the other hand, as described above, in the case of configuring one pixel matrix with pixels having the same color, the same color consecutive region can be expanded, there is an advantage in that manufacturing of display panels can be facilitated.

With the present embodiment and a modification thereof, two kinds of green pixels of which color spectrums are mutually different are employed to handle four-color pixels, thereby improving color reproduction of the three-dimensional image display device. Also, normal green and white pixels may be employed instead of two kinds of green pixels having a different color spectrum. In this case, there is an advantage wherein brightness of the three-dimensional image display device can be improved.

Fifth Embodiment

Figure 32:
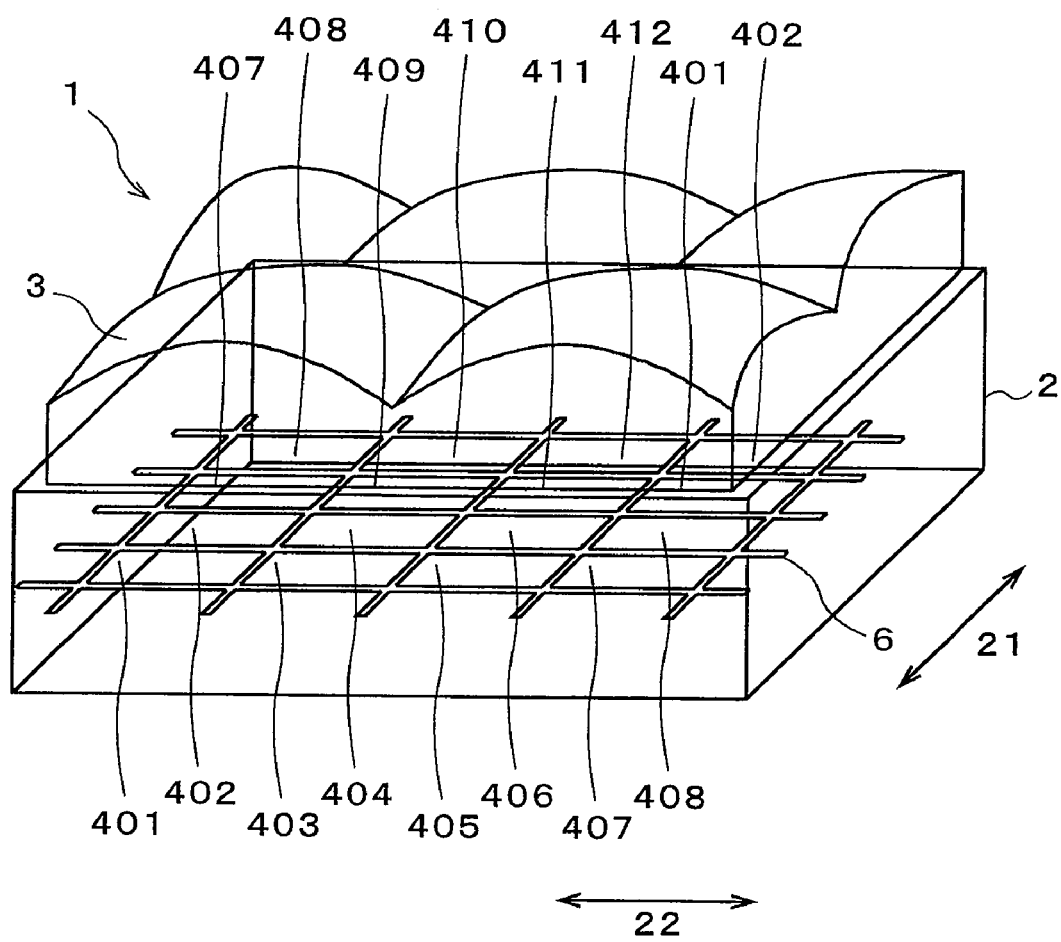
FIG. 32 is a perspective view illustrating a three-dimensional image display device according to a fifth embodiment of the present invention.

A fifth embodiment of the present invention will be described. FIG. 32 is a perspective view illustrating a three-dimensional image display device according to the fifth embodiment. The difference between the fifth embodiment and the fourth embodiment is in that the lens elements making up a fly eye lens are in a Delta array, and also pixel matrixes making up one display unit are in a delta array. The (2×2) pixels making up each pixel matrix are arrayed in a square in the same way as with the fourth embodiment, and one pixel matrix is made up of pixels having the same color. More specifically, one pixel matrix is made up of the red pixel A401, red pixel B402, red pixel C403, and red pixel D404, which corresponds to one lens element. In the same way, one pixel matrix made up of the green pixel A405, green pixel B406, green pixel C407, and green pixel D408, which corresponds to one lens element, and one pixel matrix made up of the blue pixel A409, blue pixel B410, blue pixel C411, and blue pixel D412, which corresponds to one lens element. Subsequently, the aforementioned pixels 401 through 412 make up one display unit.

With the present embodiment, the lens elements and pixel matrixes are in Delta array, and a display unit can be configured of three primary colors, red, green, and blue. Thus, visibility of three-dimensional images in the first and second directions can be improved while keeping conformity as to conventional color display. Also, landscape or the like can be suitably displayed due to a delta array.

Sixth Embodiment

Figure 33:
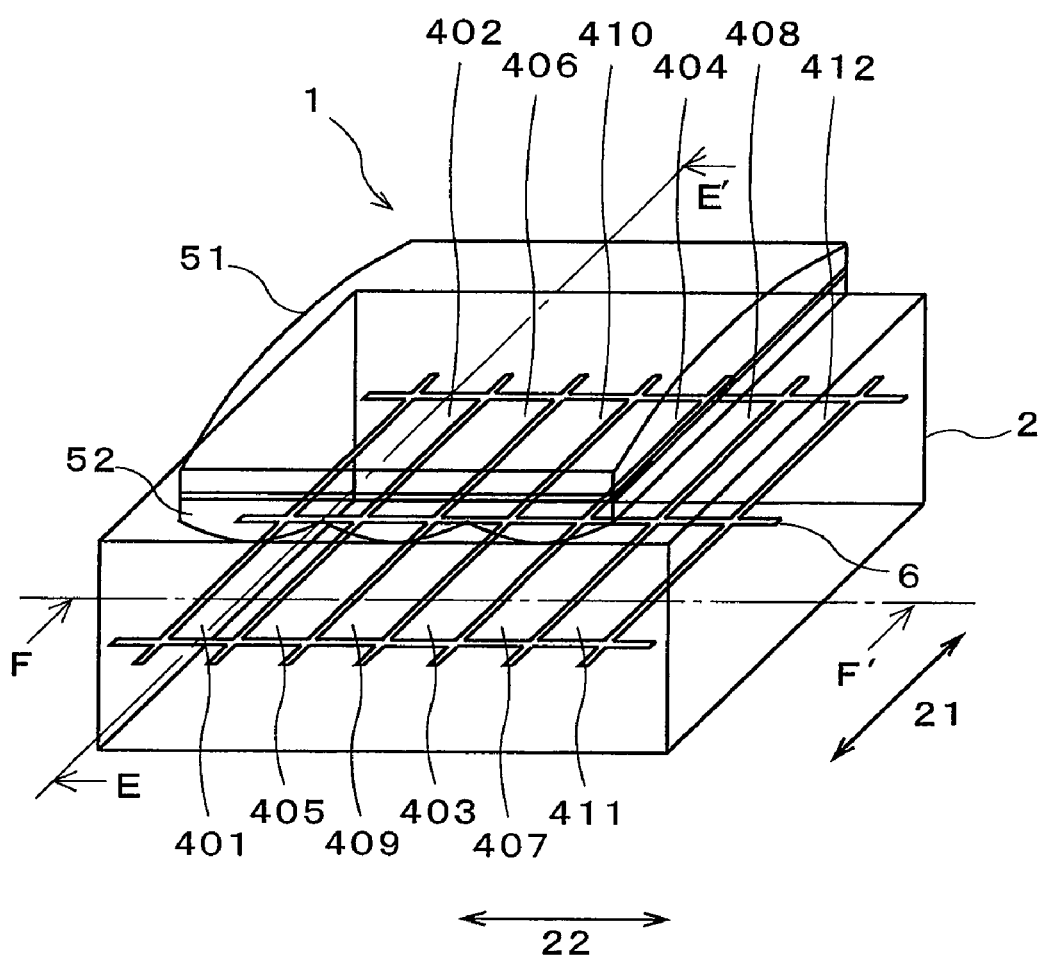
FIG. 33 is a perspective view illustrating a three-dimensional image display device according to a sixth embodiment of the present invention.
Figure 34:
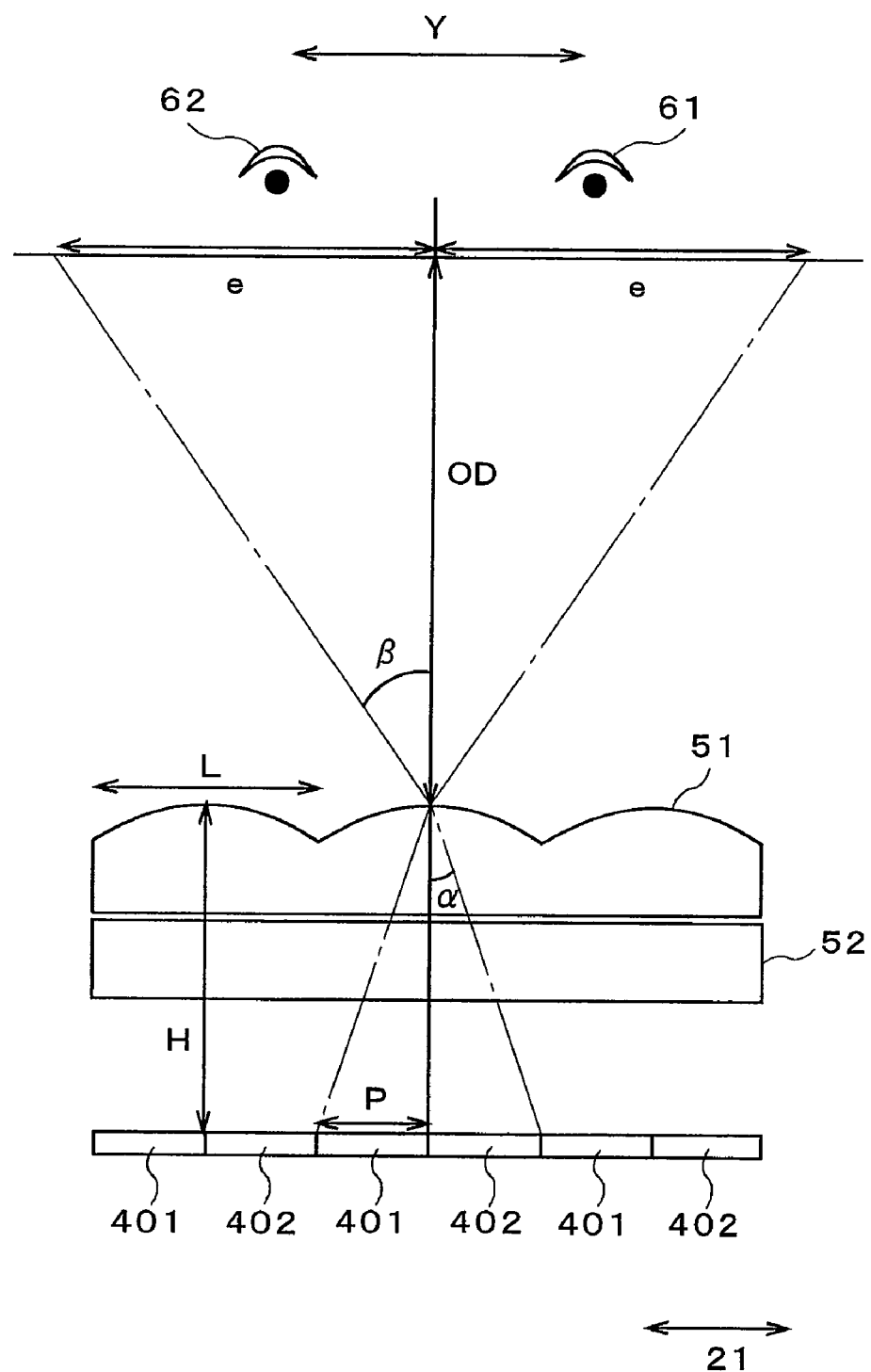
FIG. 34 is an optical model diagram illustrating a cross-section taken along line E-E' illustrated in FIG. 33.
Figure 35:
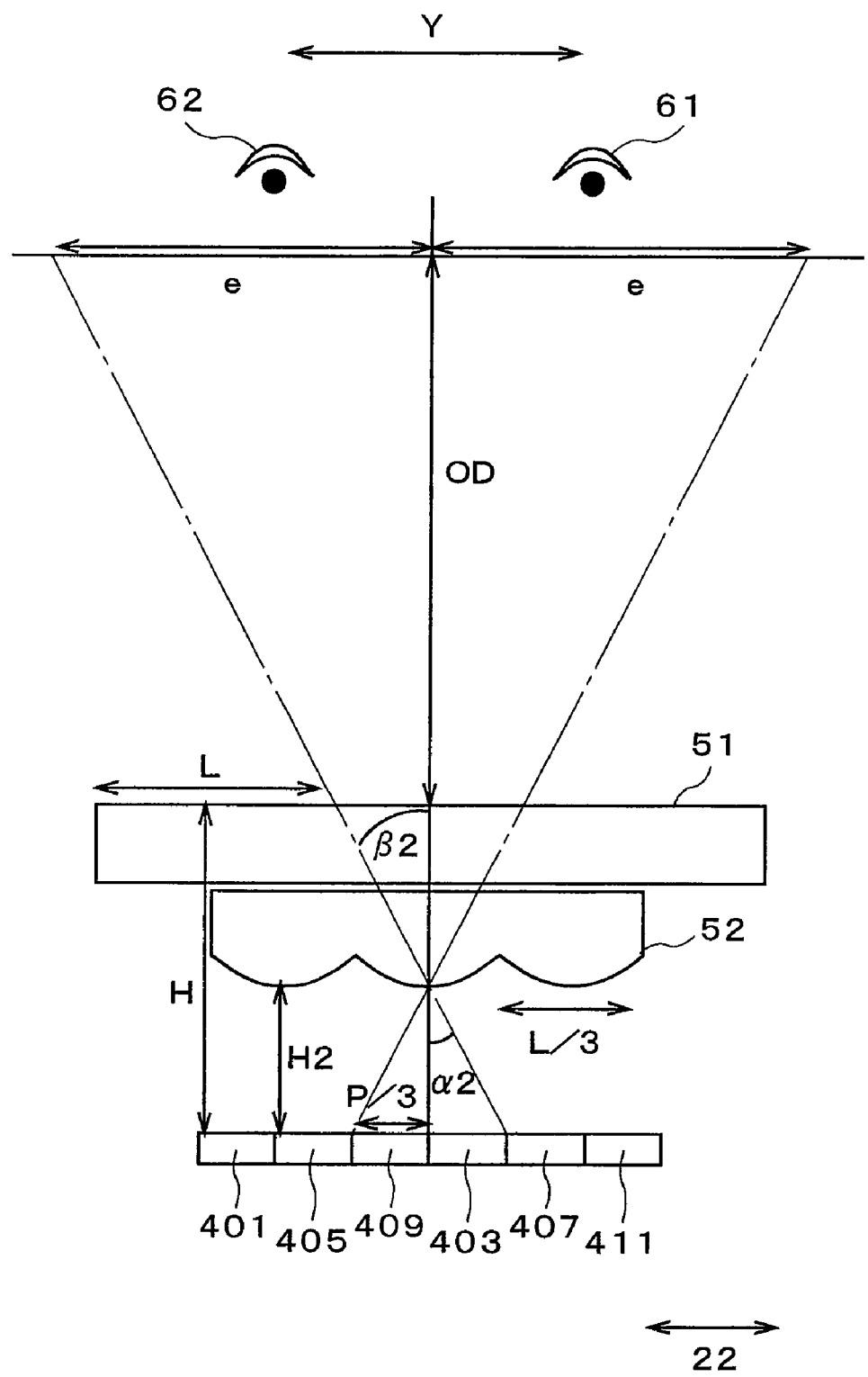
FIG. 35 is an optical model diagram illustrating a cross-section taken along line F-F' illustrated in FIG. 33.

Next, a sixth embodiment of the present invention will be described. FIG. 33 is a perspective view illustrating a three-dimensional image display device according to the sixth embodiment, FIG. 34 is an optical model diagram illustrating a cross-section taken along line E-E' illustrated in FIG. 33, and FIG. 35 is an optical model diagram illustrating a cross-section taken along line F-F' illustrated in FIG. 33. While the first embodiment employs a fly eye lens as the optical unit, the present embodiment employs two lenticular lenses as the optical unit. More specifically, as illustrated in FIG. 33, a lenticular lens 51, lenticular lens 52, display panel 2, and light source (not illustrated) are provided in the three-dimensional image display device 1 in that order from the observer side.

A plurality of cylindrical lenses making up the lenticular lens 51 of which longitudinal direction is identical to the second direction 22 are arrayed along the first direction 21. Also, a plurality of cylindrical lenses making up the lenticular lens 52 of which longitudinal direction is identical to the first direction 21 are arrayed along the second direction 22. Accordingly, the lenticular lens 51 and lenticular lens 52 are overlapped such that the longitudinal directions of the cylindrical lenses are orthogonal to each other. Further, the lenticular lens 51 is disposed of which the lens surface faces the observer (not illustrated), and the lenticular lens 52 is disposed of which the lens surface faces the display panel 2. In other words, the flat surface (the opposite surface of the lens surface) of a lens 51 faces a lens 52, and the lens surface of the lens 52 faces the display panel 2. Furthermore, the lens pitch of the lenticular lens 51 is three times wider than the lens pitch of the lenticular lens 52.

As illustrated in FIG. 34, with the observation distance OD, pixel magnifying projection width e in the observation distance OD, distance H between the apex of the lens 51 and the pixel, and pixel pitch P in the first direction 21, the following Expressions 66 through 68 are established from Expressions 1 and 2.

$n \times \sin \alpha = \sin \beta$ (Expression 66)

$OD \times \tan \beta = e$ (Expression 67)

$H \times \tan \alpha = P$ (Expression 68)

As illustrated in FIG. 35, with the observation distance OD, pixel magnifying projection width e in the observation distance OD, distance H2 between the apex of the lens 52 and the pixel, and pixel pitch (P/3) in the second direction 22, the following Expressions 69 through 71 are established.

$n \times \sin \alpha 2 = \sin \beta 2$ (Expression 69)

$(OD + H - H2) \times \tan \beta 2 = e$ (Expression 70)

$H2 \times \tan \alpha 2 = P/3$ (Expression 71)

The positions of the lenticular lenses 51 and 52 can be obtained by calculating the distance H between the lens 51 and the pixel from Expression 66 through 68, and calculating the distance H2 between the lens 52 and the pixel from Expressions 69 through 71.

Since the three-dimensional image display device according to the present embodiment can independently set the distances between the apexes of the two lenticular lenses and the pixels, a pixel magnifying projection width can be set independently in the first direction and in the second direction. Thus, the pixel magnifying projection width in the same observation surface can be set to the same value in the first direction and in the second direction. Consequently, even if the direction of both eyes is set to be identical to either the first direction 21 or the second direction 22, visibility of three-dimensional images can be improved. Also, in the case wherein three-color pixels are repeatedly arrayed along the second direction, the resolution of images in the first direction can be identical to that in the second direction mutually by setting the lens pitch of the lenticular lens 51 three times wider than the lens pitch of the lenticular lens 52. Other than the aforementioned configuration, operation and advantages, the present embodiment is the same as the first embodiment.

Note that the lens surface of the lenticular lens 52 may be disposed on the observer side, but as with the present embodiment, if the flat surface of the lens 51 and the flat surface of the lens 52 are disposed so as to face each other, the distance H2 between the lens 52 and the pixel can be set to the value of one third of the distance H between the apex of the lens 51 and the pixel, thereby enabling smaller distance H2 to be handled, and accordingly, the present invention can be applied to a highly fine panel having a small pixel pitch P. Accordingly, with the present embodiment, the lens 51 and lens 52 are disposed such that the flat surface of the lens 51 and that of the lens 52 face each other.

Also, disposing an optical film (not shown) such as a polarization plate between the lenticular lens 51 and lenticular lens 52 enables a smaller distance H2 to be handled, so this arrangement is effective regarding the fineness of the three-dimensional image display device. Further, two parallax barriers on which slits are formed may be employed instead of the two lenticular lenses 51 and 52. At this time, the longitudinal directions of the slits on the two-parallax barriers are orthogonal to each other. Subsequently, one of the parallax barriers wherein the longitudinal direction of the slits is the second direction, and the array direction of the slits is the first direction, is preferably disposed on a position far away from the display panel compared to the other parallax barrier, and the array pitch of the slits on the aforementioned one of the parallax barriers is preferably set three times wider than that of the other parallax barrier.

Moreover, while the foregoing description has dealt with the configuration with pixels in three colors, or red, blue, and green, the present invention is not limited thereto, and may be similarly applied to the cases with any number of colors other than three. Given the number of colors Z, it is preferable that the aforementioned one of the lenticular lenses be given a lens pitch Z times that of the other lenticular lens. The same holds for the parallax barriers. That is, it is preferable that the aforementioned one of the parallax barriers be given an array pitch of the slits Z times that of the other parallax barrier.

Seventh Embodiment

Next, a seventh embodiment of the present invention will be described. FIG. 36 is a perspective view illustrating a three-dimensional image display device according to the seventh embodiment. As illustrated in FIG. 36, the difference between the present embodiment and the first embodiment is in that a parallax barrier 7 is provided instead of the fly eye lens 3 on the observer's side of the display panel 2. Further, pinholes 8 are formed in a matrix on the parallax barrier 7.

The present embodiment is the same as the first embodiment except for the aforementioned configuration.

With the present embodiment, a barrier is provided instead of a lens, thereby preventing striping due to the surface reflection of a lens from occurrence, and further preventing display quality due to this striping from deterioration. The present embodiment is the same as the first embodiment except for the aforementioned advantages.

Note that the parallax barrier 7 may be provided on the rear surface side of the display panel 2. In this case, this barrier is not conspicuous when the observer observes images, thereby improving visibility. Alternatively, with the sixth embodiment, one of the two lenticular lenses may be substituted with a parallax barrier on which slits are formed. Further, the pinholes or the slits formed on the parallax barrier have a limited size, and accordingly, a pixel magnifying projection image is blurred and expanded into a large width. In this case, the present invention can be applied to such an image by applying the value of the pixel magnifying projection width e to the width of this blurred image. While expanding the slit width increases cross-talk between left and right images, high-luminance display can be realized. Furthermore, the seventh embodiment is an example wherein a parallax barrier is employed instead of a fly eye lens employed in the first embodiment, in the same way, with the second through fifth embodiments, a parallax barrier on which pinhole slits are formed may be employed instead of a fly eye lens as well.

What is claimed is:

1. A three-dimensional image display device comprising:
    a display panel on which a plurality of pixels are arrayed in matrix fashion;
    a first lenticular lens on which a plurality of cylindrical lenses of which the longitudinal direction extends in a first direction are arrayed in a second direction orthogonal to said first direction; and
    a second lenticular lens disposed on a position sandwiching said first lenticular lens against said display panel, on which a plurality of cylindrical lenses of which the longitudinal direction extends in said second direction are arrayed in said first direction, wherein:
    an array pitch of said cylindrical lenses in said second lenticular lens is wider than an array pitch of said cylindrical lenses in said first lenticular lens;
    pixels for said display panel are colored in Z number of colors wherein number of colors wherein Z represents a natural number greater than 2;
    pixels having the same color are arrayed consecutively along said first direction, said pixels having different colors are arrayed alternately along said second direction, and an array pitch of said pixels along said first direction is wider than an array pitch of said pixels along said second direction;
    when the plurality of pixels alternately display right-eye images and left-eye images along said first direction, pixels for displaying right-eye images and pixels for displaying left-eye images correspond to the cylindrical lenses in said second lenticular lens; and
    when the plurality of pixels alternately display right-eye images and left-eye images along said second direction, pixels for displaying right-eye images and pixels for displaying left-eye images correspond to the cylindrical in said first lenticular lens.

2. A three-dimensional image display device according to claim 1, wherein the lens pitch of said second lenticular lens is Z times wider than the lens pitch of said first lenticular lens.

3. A three-dimensional image display device according to claim 1, wherein said number of colors Z is three.

4. A three-dimensional image display device according to claim 1, further comprising an optical film disposed between said first lenticular lens and said second lenticular lens.

5. A three-dimensional image display according to claim 4, wherein the optical film is a polarizer.

6. A three-dimensional image display device comprising:
    a display panel on which a plurality of pixels are arrayed in a matrix;
    a first lenticular lens on which a plurality of cylindrical lenses of which the longitudinal direction extends in a first direction are arrayed in a second direction orthogonal to said first direction, the plurality of cylindrical lenses of the first lenticular lens facing the display panel; and
    a second lenticular lens disposed on a position sandwiching said first lenticular lens against said display panel, on which a plurality of cylindrical lenses of which the longitudinal direction extends in said second direction are arrayed in said first direction, wherein:
    an array pitch of said cylindrical lenses in said second lenticular lens is wider than an array pitch of said cylindrical lenses in said first lenticular lens;
    the plurality of cylindrical lenses of the second lenticular lens faces away from the first lenticular lens;
    pixels for said display panel are colored in Z number of colors wherein Z represents a natural number greater than 2;
    pixels having the same color are arrayed consecutively along said first direction, said pixels having different colors are arrayed alternately along said second direction, and an array pitch of said pixels along said first direction is wider than an array pitch of said pixels along said second direction;
    when the plurality of pixels alternately display right-eye images and left-eye images along said first direction, pixels for displaying right-eye images and pixels for displaying left-eye images correspond to the cylindrical lenses in said second lenticular lens; and
    when the plurality of pixels alternately display right-eye images and left-eye images along said second direction, pixels for displaying right-eye images and pixels for displaying left-eye images correspond to the cylindrical in said first lenticular lens.

* * * * *